(12) United States Patent
Nakajima

(10) Patent No.: US 9,098,200 B2
(45) Date of Patent: Aug. 4, 2015

(54) STORAGE SYSTEM WITH VIRTUAL VOLUME HAVING DATA ARRANGED ASTRIDE STORAGE DEVICES, AND VOLUME MANAGEMENT METHOD

(75) Inventor: Akio Nakajima, Yokohama (JP)

(73) Assignee: HITACHI, LTD., Tokyo (JP)

( * ) Notice: Subject to any disclaimer, the term of this patent is extended or adjusted under 35 U.S.C. 154(b) by 275 days.

(21) Appl. No.: 13/391,477

(22) PCT Filed: Feb. 10, 2012

(86) PCT No.: PCT/JP2012/000922
§ 371 (c)(1),
(2), (4) Date: Feb. 21, 2012

(87) PCT Pub. No.: WO2013/118194
PCT Pub. Date: Aug. 15, 2013

(65) Prior Publication Data
US 2013/0212345 A1    Aug. 15, 2013

(51) Int. Cl.
*G06F 12/00* (2006.01)
*G06F 3/06* (2006.01)

(52) U.S. Cl.
CPC .............. *G06F 3/0605* (2013.01); *G06F 3/067* (2013.01); *G06F 3/0617* (2013.01); *G06F 3/0647* (2013.01); *G06F 3/0664* (2013.01); *G06F 3/0637* (2013.01)

(58) Field of Classification Search
USPC .......................................................... 711/156
See application file for complete search history.

(56) References Cited

U.S. PATENT DOCUMENTS

| | | | |
|---|---|---|---|
| 5,875,481 A * | 2/1999 | Ashton et al. ................ | 711/165 |
| 7,478,221 B1 | 1/2009 | Karr et al. | |
| 7,707,151 B1 * | 4/2010 | Blumenau et al. ........... | 711/165 |
| 8,032,701 B1 | 10/2011 | Glade et al. | |
| 8,566,549 B1 * | 10/2013 | Burke et al. ................. | 711/168 |
| 2003/0115439 A1 | 6/2003 | Mahalingam et al. | |
| 2007/0150590 A1 * | 6/2007 | Shinohara .................... | 709/225 |

(Continued)

FOREIGN PATENT DOCUMENTS

| EP | 1717688 | 11/2006 |
|---|---|---|
| WO | 2010084522 | 7/2010 |

OTHER PUBLICATIONS

International Search Report in PCT Application No. PCT/JP2012/000922, dated Jul. 6, 2012.

(Continued)

*Primary Examiner* — Charles Rones
*Assistant Examiner* — Nanci Wong
(74) *Attorney, Agent, or Firm* — Mattingly & Malur, PC

(57) ABSTRACT

A virtual LU astride a plurality of storage devices is a virtual volume composed of a plurality of partial volumes. Functions of the storage system, Zoning information of a SAN and a host group information of the virtual volume are inherited to a partial volume created for each physical device. When a page granularity data migration is executed, volume or data are migrated to other storage devices without depending on the relationship between a physical port and the physical device. When a host IO request is received when migration is on-going, response processing is performed by synchronizing storage devices within the range of migration data. The host IO request related to the page being migrated sends a partial complete response including information for re-routing the request to a path of the appropriate data migration destination device capable of issuing the IO.

20 Claims, 74 Drawing Sheets

(56) References Cited

U.S. PATENT DOCUMENTS

| | | |
|---|---|---|
| 2008/0177947 A1* | 7/2008 | Eguchi et al. .................. 711/114 |
| 2009/0019157 A1 | 1/2009 | Suman et al. |
| 2009/0150639 A1* | 6/2009 | Ohata ........................... 711/172 |
| 2009/0177837 A1* | 7/2009 | Kaneda ......................... 711/112 |
| 2009/0216986 A1 | 8/2009 | Sakurai et al. |
| 2010/0057985 A1* | 3/2010 | Kaneda et al. ................. 711/114 |
| 2010/0153767 A1 | 6/2010 | Fredin et al. |
| 2010/0251267 A1* | 9/2010 | Zwisler et al. ................ 719/326 |
| 2012/0084510 A1* | 4/2012 | Kurashige ..................... 711/119 |
| 2012/0124286 A1* | 5/2012 | Galloway et al. .............. 711/114 |
| 2012/0290802 A1* | 11/2012 | Wade et al. ................... 711/162 |

OTHER PUBLICATIONS

International Search Report in PCT Application No. PCT/JP2012/000924, dated Jul. 6, 2012.

C. DeSanti, "FC-GS-7 Peer Zoning Specification", INCITS Technical Committee T11 Document No. 11-411v3, Dec. 2011, ftp://ftp.t10.org/t11/document.11/11-411v3.pdf.

\* cited by examiner

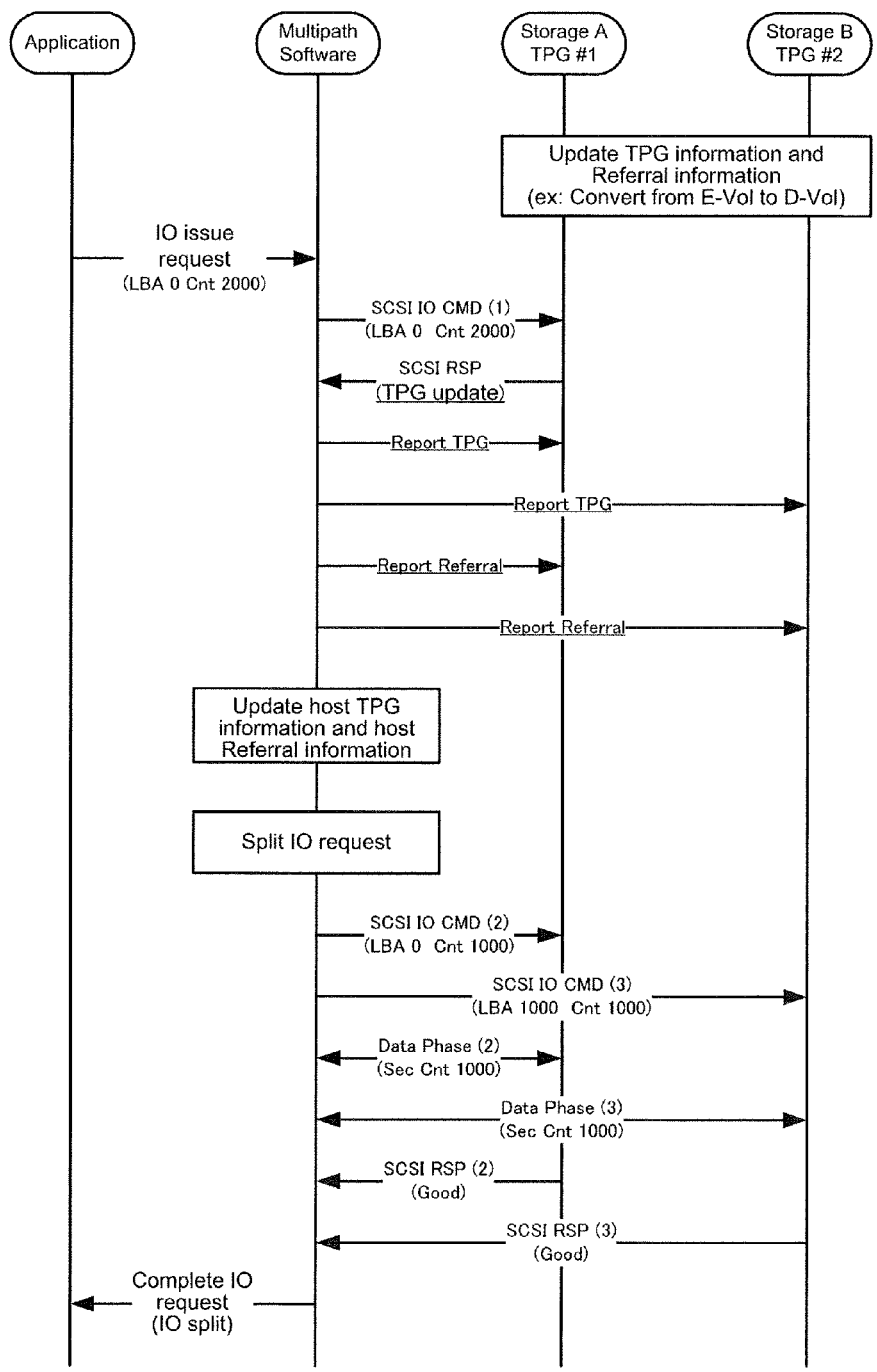

Fig.12A

Volume Type / Name — 1104
(Global)

| Int. LUN | Volume Type | LU Name | pointer to volume (Global LUN) | Global Physical Storage ID |
|---|---|---|---|---|
| 0000 | Entity Volume | AAAA_AAAA | N/A | Phy Storage #0 |
| 0001 | Distributed Virtual Volume | BBBB_BBBB | N/A | N/A |
| 0002 | Virtual Volume | [ AAAA_AAAA] | 0000 | Phy Storage #0 |
| 0003 | Partial Volume | [ BBBB_BBBB ] | 0001 | Phy Storage #0 |
| 0004 | Partial Volume | [ BBBB_BBBB ] | 0001 | Phy Storage #1 |
| ... | ... | ... | ... | ... |

Fig.12B

Distributed Virtual Volume — 1105
(Global)

| D-Vol Int. LUN | Volume Type | p-Vol Int. LUN | Global Physical Storage ID |
|---|---|---|---|
| 0001 | Partial Volume | 0003 | Phy Storage #0 |
| | Partial Volume | 0004 | Phy Storage #1 |
| ... | ... | ... | ... |

Fig.12C

Storage Function Table — 1116
(Global)

| Int. LUN | Function Enable Flags | inheritance Int. LUN |
|---|---|---|
| 0000 | Page Provisioning = 1 Volume Copy = 1, ··· | N/A |
| 0001 | Snap Shot = 1, Page Provisioning = 1 De-duplication = 1, ··· | N/A |
| 0003 | Snap Shot = 1, Page Provisioning = 1 De-duplication = 1, ··· | 0001 (D-Vol) |

Fig.13A

Host Group (per Target Port local) — 1109

| Host Group | Storage Target Port WWPN | Host Initiator Port WWPN | Host LUN | Global Int. LUN | Attribute index |
|---|---|---|---|---|---|
| AAAA0000 | 5006_0E80_AAAA_0001 | 2001_0011_2233_4455 | 0000 | 0001 | 2 |
| AAAA0001 | 5006_0E80_AAAA_0001 | 2001_AA22_3344_4455 | 0000 | 0002 | 1 |
| BBBB0000 | 5006_0E80_BBBB_0001 | 2001_BB22_3344_8899 | 0002 | 0003 | 1 |
| BBBB0001 | 5006_0E80_BBBB_0002 | 2001_CC22_7788_AA00 | 0000 | 0001 | 3 |
| CCCC0000 | 5006_0E80_CCCC_0001 | 2001_DD22_AA00_FF11 | 0004 | 0004 | 1 |
| ... | ... | ... | ... | ... | ... |

Fig.13B

Host Group Attribute Table (Global) — 1110

| Attribute index | Host OS Type | Host MPIO Type | Auto Data Migration | Policy |
|---|---|---|---|---|
| 1 | Vender A OS A | SPC-3 ALUA | Volume | Archive (SATA) |
| 2 | Vender A OS B | SPC-4/SBC-3 ALUA & Referral | Volume / Page | High Transaction (SSD) |
| 3 | Vender B OS C | SPC-4/SBC-3 ALUA & Referral | Volume / Page | Mixed (SATA/SSD) |
| 4 | Vender C OS D | SPC-4/SBC-3 ALUA & Referral | Volume / Page | High Throughput (Port) |
| 5 | Vender D OS E | SPC-5 ALUA enhance | Disable | N/A |
| ... | ... | ... | ... | ... |

Fig.14A

Host / Peer Zone (storage local) — 1111

| Storage Target Port WWPN | Mode | Num of Initiator Port | Host Initiator Port WWPN | Host Group |
|---|---|---|---|---|
| 5006_0E80_AAAA_0001 | Fabric | 2 | 2001_0011_2233_4455 | AAAA0000 |
| | | | 2001_AA22_3344_4455 | AAAA0001 |
| 5006_0E80_BBBB_0001 | Fabric | 1 | 2001_BB22_3344_8899 | BBBB0000 |
| 5006_0E80_BBBB_0002 | Fabric | 1 | 2001_CC22_7788_AA00 | BBBB0001 |
| 5006_0E80_CCCC_0001 | P2P | 1 | 2001_DD22_AA00_FF11 | CCCC0000 |
| ... | ... | ... | ... | ... |

Fig.14B

Communication Path / Peer Zone (storage local) — 1102

| Storage Target Port WWPN | Mode | Num of Initiator Port | Storage Initiator Port WWPN | Global Physical Storage ID |
|---|---|---|---|---|
| 5006_0E80_AAAA_0001 | Fabric | 3 | 5006_0E80_BBBB_0001 | Phy Storage #1 |
| | | | 5006_0E80_BBBB_0002 | Phy Storage #1 |
| | | | 5006_0E80_CCCC_0001 | Phy Storage #2 |
| 5006_0E80_BBBB_0001 | Fabric | 1 | 5006_0E80_AAAA_0001 | Phy Storage #0 |
| 5006_0E80_BBBB_0002 | P2P | 1 | 5006_0E80_CCCC_0001 | Phy Storage #2 |
| ... | ... | ... | ... | ... |

Fig.15A

Target Port Group (Global) — 1113

| Target Port Group | AAS | num RTPI | Relative Target Port Identifier | Storage Target Port WWPN |
|---|---|---|---|---|
| 0A01 | Act/Opt | 1 | 0A01 | 5006_0E80_AAAA_0001 |
| 0A02 | Offline | 1 | 0A02 | 5006_0E80_AAAA_0002 |
| 0B01 | Unavailable | 1 | 0B01 | 5006_0E80_BBBB_0001 |
| 0B02 | LBD | 1 | 0B02 | 5006_0E80_BBBB_0002 |
| 0C01 | LBD | 1 | 0C01 | 5006_0E80_CCCC_0001 |
| ... | ... | ... | ... | ... |

Fig.15B

Referral table (per D-Vol) — 1114

| D-Vol Int. LUN | p-Vol Int. LUN | Start / End LBA | num TPG | TPG [0] AAS [0] | TPG [1] AAS [1] |
|---|---|---|---|---|---|
| 0001 | 0003 | 0000 / 0999 | 2 | 0A01 Act/Opt | 0A02 Act/UnOpt |
| | | 4000 / 4999 | 2 | 0A01 Act/Opt | 0A02 Act/UnOpt |
| | | 8000 / 9999 | 2 | 0A01 Act/Opt | 0A02 Act/UnOpt |
| | 0004 | 1000 / 3999 | 2 | 0B01 Act/Opt | 0B02 Act/UnOpt |
| | | 5000 / 7999 | 2 | 0B01 Act/Opt | 0B02 Act/UnOpt |
| ... | ... | ... | ... | ... | ... |

Fig.16A

Target Port Group (per Volume) — 1113

| Int. LUN | Host Group | TPG | num RTPI | RTPI | Storage Target Port WWPN | AAS |
|---|---|---|---|---|---|---|
| 0001 (D-Vol) | AAAA0000 | 0001 | 1 | 0000 | 5006_0E80_AAAA_0001 | LBD |
| | AAAA0001 | 0002 | 1 | 0001 | 5006_0E80_AAAA_0001 | LBD |
| | BBBB0000 | 0003 | 1 | 0002 | 5006_0E80_BBBB_0001 | LBD |
| | BBBB0001 | 0004 | 1 | 0003 | 5006_0E80_BBBB_0002 | LBD |
| 0002 (V-Vol) | CCCC0000 | 0001 | 1 | 0000 | 5006_0E80_CCCC_0001 | Act/Opt |
| ... | ... | ... | ... | ... | ... | ... |

Fig.16B

Referral table (per Host Group / D-Vol pair) — 1114

| D-Vol Int. LUN | p-Vol Int. LUN | Host Group | UDS# (Start / End LBA) | num TPG | TPG [0] AAS [0] | TPG [1] AAS [1] |
|---|---|---|---|---|---|---|
| 0001 | 0003 | AAAA0000 AAAA0001 ... | #0 0000 / 0999 | 2 | 0001 Act/Opt | 0002 Act/UnOpt |
| | | | #2 4000 / 4999 | 2 | 0001 Act/Opt | 0002 Act/UnOpt |
| | | | #4 8000 / 9999 | 2 | 0001 Act/Opt | 0002 Act/UnOpt |
| | 0004 | BBBB0000 BBBB0001 ... | #1 1000 / 3999 | 2 | 0003 Act/Opt | 0004 Act/UnOpt |
| | | | #3 5000 / 7999 | 2 | 0003 Act/Opt | 0004 Act/UnOpt |
| ... | ... | ... | ... | ... | ... | ... |

Fig.18A

TPG table (Host memory) — 172

| Storage Target Port WWPN | Num LU | LUN | Vender / Device / LU Name | RTPI | TPG AAS | ALUA Support |
|---|---|---|---|---|---|---|
| 5006_0E80_ AAAA_0001 | 2 | 0000 | Vender / Device / BBBB_BBBB | 0000 | 0001 LBD | ALUA =01 R_SUP = 1 |
| | | 0001 | Vender / Device / AAAA_AAAA | 0000 | 0001 Act/Opt | ALUA =01 R_SUP = 0 |
| 5006_0E80_ AAAA_0002 | 1 | 0000 | Vender / Device / BBBB_BBBB | 0001 | 0002 LBD | ALUA =01 R_SUP = 1 |
| 5006_0E80_ BBBB_0001 | 1 | 0000 | Vender / Device / BBBB_BBBB | 0002 | 0003 LBD | ALUA =01 R_SUP = 1 |
| 5006_0E80_ BBBB_0002 | 1 | 0000 | Vender / Device / BBBB_BBBB | 0003 | 0004 LBD | ALUA =01 R_SUP = 1 |
| ... | ... | ... | ... | ... | ... | ... |

Fig.18B

Referral table (Host memory) — 173

| LUN | Start / End LBA | num TPG | TPG [0] AAS [0] | TPG [1] AAS [1] |
|---|---|---|---|---|
| 0000 | 0000 / 0999 | 2 | 0001 Act/Opt | 0002 Act/UnOpt |
| | 1000 / 3999 | 2 | 0003 Act/Opt | 0004 Act/UnOpt |
| | 4000 / 4999 | 2 | 0001 Act/Opt | 0002 Act/UnOpt |
| | 5000 / 7999 | 2 | 0003 Act/Opt | 0004 Act/UnOpt |
| | 8000 / 9999 | 2 | 0001 Act/Opt | 0002 Act/UnOpt |
| ... | ... | ... | ... | ... |

Fig.19A

Referral Hit/Miss History table — 174
(Host memory)

| LUN | Start / End LBA | num TPG | TPG [0] | Hit/Miss | TPG [1] | Hit/Miss |
|---|---|---|---|---|---|---|
| 0000 | 0000 / 0999 | 1 | 0001 | Hit | | |
| | 1000 / 1999 | 2 | 0003 | Miss | 0001 | Hit |
| | 2000 / 2999 | 1 | 0003 | Hit | | |
| | 3000 / 3999 | 2 | 0003 | Miss | 0001 | Hit |
| | 4000 / 9999 | 2 | 0001 | Hit | 0003 | Miss |
| | ... | ... | ... | ... | ... | ... |

Fig.19B

Name server Query Table — 176
(Host memory)

| Host Initiator Port WWPN | Num of Target Port | Storage Target Port WWPN | FC-4 Type / Feature | Array Vender / Phys Storage |
|---|---|---|---|---|
| 2001_0011_ 2233_4455 | 2 | 5006_0E80_ AAAA_0001 | SCSI-FCP Target | Vender / Phys. Storage A |
| | | 5006_0E80_ AAAA_0002 | SCSI-FCP Target | Vender / Phys. Storage A |
| 2001_AA22_ 3344_4455 | 2 | 5006_0E80_ BBBB_0001 | SCSI-FCP Target | Vender / Phys. Storage B |
| | | 5006_0E80_ BBBB_0002 | SCSI-FCP Target | Vender / Phys. Storage B |
| ... | ... | ... | ... | ... |
| | | ... | ... | ... |

Fig.21A

Name server D.B. table
(SAN Switch memory) — 202

| N_Port ID | Port WWPN | FC-4 Type / Feature | Array Vender / Phys Storage | FDMI (Host HBA) |
|---|---|---|---|---|
| 010100 | 2001_0011_ 2233_4455 | SCSI-FCP Initiator | | HBA Vender / Host Name / ··· |
| 010200 | 2001_AA22_ 3344_4455 | SCSI-FCP Initiator | | HBA Vender / Host Name / ··· |
| 0A0100 | 5006_0E80_ AAAA_0001 | SCSI-FCP Both | Vender / Phys. Storage A | |
| 0A0200 | 5006_0E80_ AAAA_0002 | SCSI-FCP Both | Vender / Phys. Storage A | |
| 0B0100 | 5006_0E80_ BBBB_0001 | SCSI-FCP Both | Vender / Phys. Storage B | |
| ... | ... | ... | ... | ... |

Fig.21B

Zone D.B. table
(SAN Switch memory) — 205

| Zoneset (ASCII) | Zone Name (ASCII Code) | num | Port WWPN [0] | Port WWPN [n] | Attribute |
|---|---|---|---|---|---|
| Cfg_A | HostA_port0 | 3 | 5006_0E80_ AAAA_0001 | 2001_0011_ 2233_4455 | WWPN zone |
| | HostA_port1 | 2 | 5006_0E80_ AAAA_0002 | 2001_AA22_ 3344_4455 | WWPN zone |
| | ... | ... | ... | ... | ... |
| Cfg_B | ... | n | WWPN[0] | WWPN [n] | ... |
| | ... | ... | ... | ... | ... |
| ... | ... | ... | ... | ... | ... |

Fig.22

Active Zone Set table
(SAN Switch memory) — 206

| Zoneset | Zone Name (ASCII Code) | num | Port WWPN [0] | Port WWPN [n] | Attribute |
|---|---|---|---|---|---|
| Active Zone Set | HostA_port0 | 3 | 5006_0E80_AAAA_0001 | 2001_0011_2233_4455 | WWPN zone |
| | HostA_port1 | 2 | 5006_0E80_AAAA_0002 | 2001_AA22_3344_4455 | WWPN zone |
| | x0_5006_0E80_BBBB_0001 | 2 | 5006_0E80_BBBB_0001 | 2001_0011_2233_4455 | Peer Zone |
| | x0_5006_0E80_BBBB_0002 | 2 | 5006_0E80_BBBB_0002 | 2001_0011_2233_4455 | Peer Zone |
| | x0_5006_0E80_CCCC_0001 | 2 | 5006_0E80_CCCC_0001 | ... | Peer Zone |
| | ... | n | WWPN[0] | WWPN [n] | ... |

Fig.28

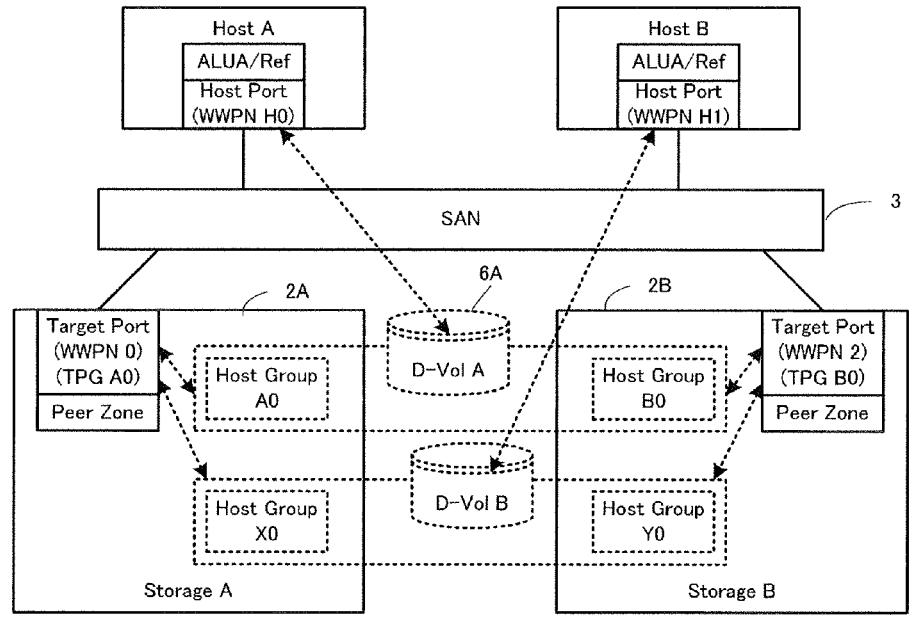

Referral Table (Host Memory A)

| LU Name | LBA | TPG/AAS |
|---|---|---|
| AAAA_AAAA (D-VolA) | 0-99 | A0 / ActO |
| | 100-199 | B0 / ActO |

Peer Zone (Storage A)

| Target | Mode | Host |
|---|---|---|
| WWPN 0 | Fabric | WWPN H0 |
| | | WWPN H1 |

Host Group (Storage A)

| HG | Target | Host | Host LUN |
|---|---|---|---|
| A0 | WWPN 0 | WWPN H0 | 0000 |
| X0 | WWPN 0 | WWPN H1 | 0000 |

TPG Table (Storage Global)

| Vol | HG | Target | TPG | TPG/AAS |
|---|---|---|---|---|
| D-VolA | A0 | WWPN 0 | A0 | A0 / LBD |
| | B0 | WWPN 2 | B0 | B0 / LBD |
| D-VolB | X0 | WWPN 0 | A0 | A0 / LBD |
| | Y0 | WWPN 2 | B0 | B0 / LBD |

Referral Table (Host Memory B)

| LU Name | LBA | TPG/AAS |
|---|---|---|
| BBBB_BBBB (D-VolB) | 0-199 | A0 / ActO |
| | 200-599 | B0 / ActO |

Peer Zone (Storage B)

| Target | Mode | Host |
|---|---|---|
| WWPN 2 | Fabric | WWPN H0 |
| | | WWPN H1 |

Host Group (Storage B)

| HG | Target | Host | Host LUN |
|---|---|---|---|
| B0 | WWPN 2 | WWPN H0 | 0000 |
| Y0 | WWPN 2 | WWPN H1 | 0000 |

Referral Table (Storage Global)

| Vol | HG | LBA | TPG/AAS |
|---|---|---|---|
| D-VolA | A0 | 0-99 | A0 / ActO |
| | B0 | 100-199 | B0 / ActO |
| D-VolB | X0 | 0-199 | A0 / ActO |
| | Y0 | 200-599 | B0 / ActO |

Fig.34

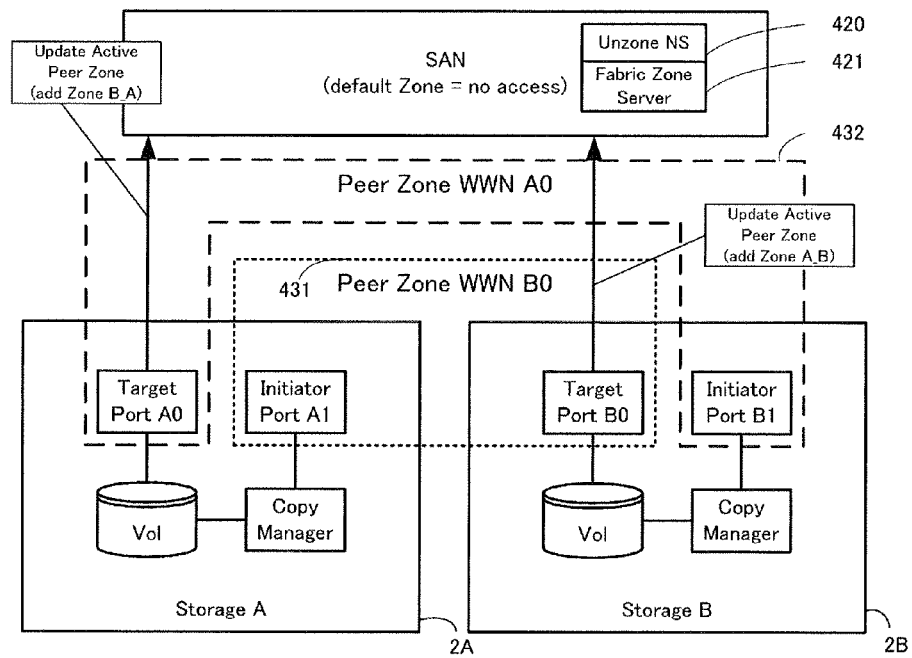

Query Unzone Name Server

| N_Port | WWPN | FC-4 Type / Feature | Array Vender (SPN) |
|---|---|---|---|
| A0 | WWN A0 | FCP / Target | Vender / Storage A |
| A1 | WWN A1 | FCP / Initiator | Vender / Storage A |
| B0 | WWN B0 | FCP / Target | Vender / Storage B |
| B1 | WWN B1 | FCP / Initiator | Vender / Storage B |

Peer Zone (Storage A)

| Target | Mode | Host |
|---|---|---|
| WWN A0 | Fabric | WWN B1 |

Peer Zone (Storage B)

| Target | Mode | Host |
|---|---|---|
| WWN B0 | Fabric | WWN A1 |

Query Name Server (Storage A)

| N_Port | WWPN | FC-4 Type / Feature |
|---|---|---|
| A0 | WWN A0 | FCP / Target |
| B1 | WWN B1 | FCP / Initiator |

Query Name Server (Storage B)

| N_Port | WWPN | FC-4 Type / Feature |
|---|---|---|
| A1 | WWN A1 | FCP / Initiator |
| B0 | WWN B0 | FCP / Target |

TPG Table (Host Memory)

| LU Name | TPG/AAS |
|---|---|
| AAAA_AAAA | A / ActO |

Peer Zone (Storage A)

| Target | Mode | Host |
|---|---|---|
| WWPN 0 | Fabric | WWPN H |

Host Group (Storage A)

| HG | Target | Host | Host LUN |
|---|---|---|---|
| A | WWPN 0 | WWPN H | 0000 |

TPG Table (Storage Global)

| Vol | HG | Target | TPG | TPG/AAS |
|---|---|---|---|---|
| E-VolA | A | WWPN 0 | A | A / ActO |

Referral Table (Host Memory)

N/A

Peer Zone (Storage B)

N/A

Host Group (Storage B)

N/A

Referral Table (Storage Global)

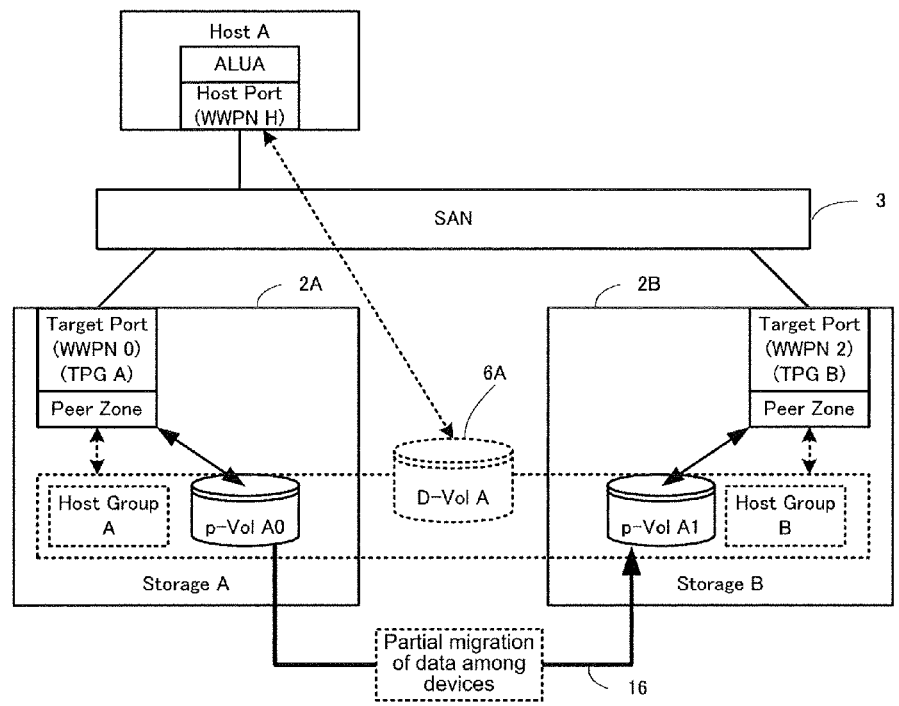

TPG Table (Host Memory)

| LU Name | TPG/AAS |
|---|---|
| AAAA_AAAA | A / LBD |
| | B / LBD |

Peer Zone (Storage A)

| Target | Mode | Host |
|---|---|---|
| WWPN 0 | Fabric | WWPN H |

Host Group (Storage A)

| HG | Target | Host | Host LUN |
|---|---|---|---|
| A | WWPN 0 | WWPN H | 0000 |

TPG Table (Storage Global)

| Vol | HG | Target | TPG | TPG/AAS |
|---|---|---|---|---|
| D-VolA | A | WWPN 0 | A | A / LBD |
| | B | WWPN 2 | B | B / LBD |

Referral Table (Host Memory)

| LU Name | LBA | TPG/AAS |
|---|---|---|
| AAAA_AAAA | 0-199 | A / ActO |
| | 200-599 | B / ActO |

Peer Zone (Storage B)

| Target | Mode | Host |
|---|---|---|
| WWPN 2 | Fabric | WWPN H |

Host Group (Storage B)

| HG | Target | Host | Host LUN |
|---|---|---|---|
| B | WWPN 2 | WWPN H | 0000 |

Referral Table (Storage Global)

| Vol | HG | LBA | TPG/AAS |
|---|---|---|---|
| D-VolA | A | 0-199 | A / ActO |
| | B | 200-599 | B / ActO |

Update Referral information every time data portion is migrated

Fig.41

Page table (Storage memory) — 1106

| Physical Storage # | Pool # | Media Type | Page # | move flag | Page Address (Start / End LBA) | internal LUN | UDS # (Start / End LBA) |
|---|---|---|---|---|---|---|---|
| Physical Storage #1 | 0 | SSD | 0 | 0 | 0000 - 0099 | D-Vol 0001 | 0 (0000-0099) |
| | | | 1 | 0 | 0100 - 0199 | D-Vol 0002 | 0 (0000-0099) |
| | | | 2 | 0 | 0200 - 0299 | D-Vol 0001 | 0 (0100-0199) |
| | | | 3 | 0 | 0300 - 0399 | ... | ... |
| | | | ... | ... | ... | ... | ... |
| | 1 | SATA | 0 | 0 | 0000 - 1999 | D-Vol 0001 | 3 (2200-3199) |
| | | | | | | D-Vol 0001 | 4 (3200-4199) |
| | | | 1 | 0 | 2000 - 3999 | D-Vol 0002 | 2 (2100-4099) |
| | | | ... | ... | ... | ... | ... |
| Physical Storage #2 | 0 | SAS | 0 | 0 | 0000 - 0999 | D-Vol 0001 | 5 (4200-5199) |
| | | | 1 | move | 1000 - 1999 | D-Vol 0001 | 5 (5200-6199) |
| | | | 2 | 0 | 2000 - 2999 | D-Vol 0002 | 1 (0100-2099) |
| | | | 3 | 0 | 3000 - 3999 | ... | ... |
| | | | ... | ... | ... | ... | ... |
| | 1 | SATA | 0 | 0 | 0000 - 1999 | D-Vol 0001 | 1 (0200-1199) |
| | | | | | | D-Vol 0001 | 2 (1200-2199) |
| | | | 1 | 0 | 2000 - 3999 | D-Vol 0002 | 3 (4100-6099) |
| | | | ... | ... | ... | ... | ... |

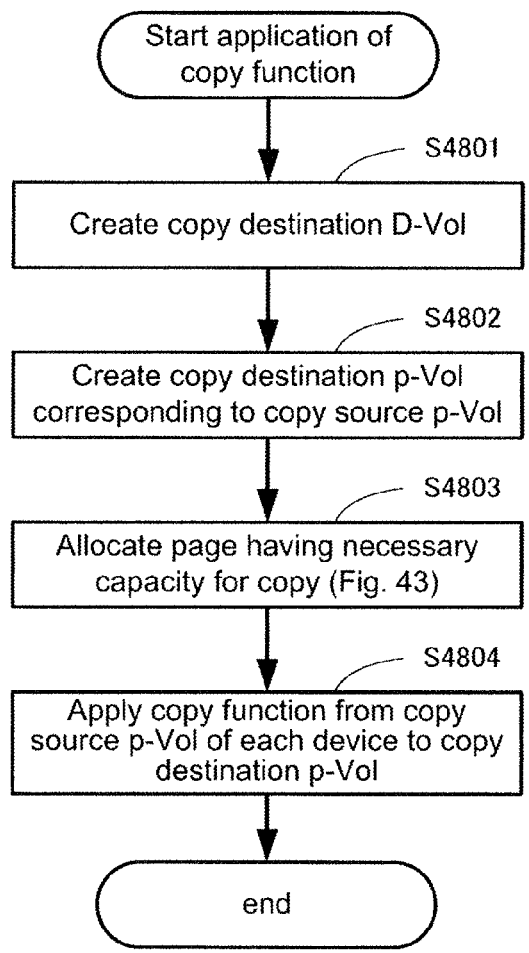

hash table  — 82
(Storage memory)

| data hash value | data store int. LUN | data store physical storage # | data store Address (Start / End LBA) | Address List (Start / End LBA) |
|---|---|---|---|---|
| AABBCCDD | Vol 1001 | Physical Storage #1 | 0000 - 0099 | 0000-0099 4000-4099 |
| AABBCCDE | Vol 1001 | Physical Storage #1 | 0300 - 0399 | 1300 - 1399 |
| 11223344 | Vol 1001 | Physical Storage #1 | 0400 - 0499 | 1400 - 1499 1600 - 1699 |
| ... | Vol 1002 | Physical Storage #2 | 0000 - 0099 | 0100 - 0199 |
| ... | ... | ... | ... | ... |

Fig.58
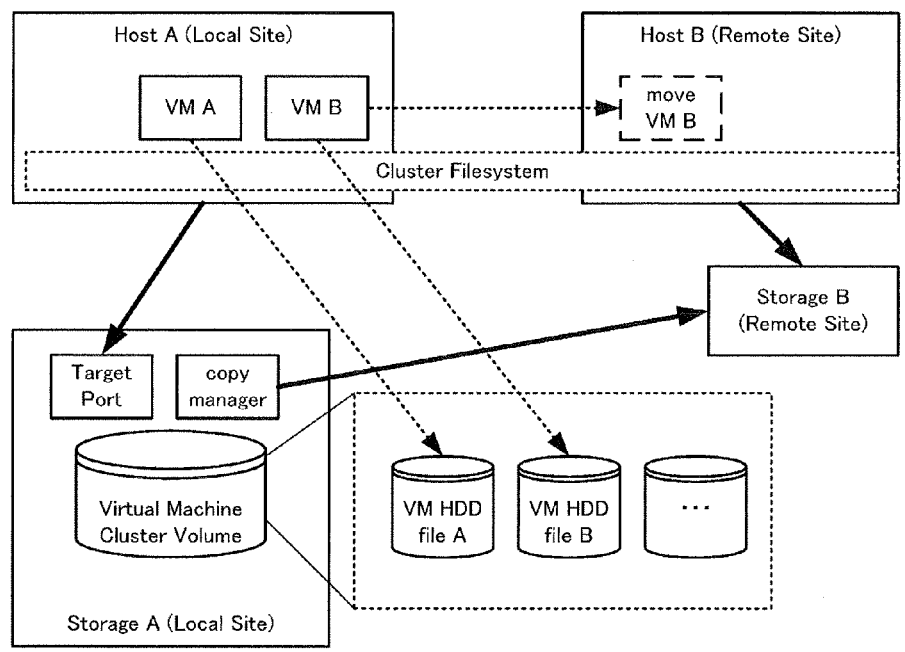
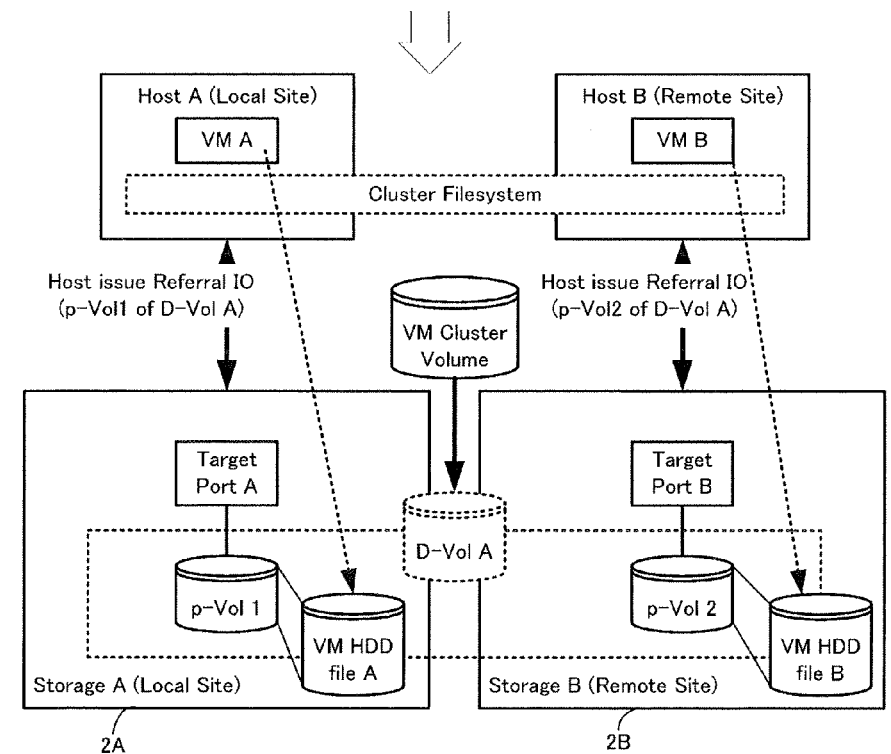

STORAGE SYSTEM WITH VIRTUAL VOLUME HAVING DATA ARRANGED ASTRIDE STORAGE DEVICES, AND VOLUME MANAGEMENT METHOD

TECHNICAL FIELD

The technical field of the present invention relates to hosts, storage devices, a network coupling the hosts and storage devices, and a communication protocol of block storages.

BACKGROUND ART

In large-scale computer systems and virtual machine environments, storage devices are required to have extremely high system IO performances using a large amount of volume, and in order to perform parallel analysis of large-capacity data, the storage devices are required to have an extremely high throughput performance exceeding normal performances of a storage device. Further, the required functions of recent storage devices have differed from conventional storage devices. Conventionally, storage devices were required to have data copy (volume copy, snapshot) functions and page-granularity data control (Thin Provisioning, data location control in tiers of storage media) functions. However, along with the enhancement in functions, the storage devices are now required to implement data computation (such as hash value calculation for data de-duplication, calculation for data compression, data search etc.) within the storage device and to reduce the actual amount of capacity or reduce the offload of host computation.

However, costs are increased by designing a large-scale storage device having a highly-functional dedicated processing engine to meet these demands. To overcome this problem, a plurality of inexpensive storage devices are arranged in a row to form the system, but in such arrangement, it is important to bring out performances of mutual storage devices and to distribute the load of data copy and data calculation processes among the plurality of storage devices.

It is even more preferable to suppress the management load of the administrator accompanying the change of settings of the hosts and network or the migration of existing volumes among storage devices, or to clear away the restrictions or dependent relationship of storage devices related to calculation resources which becomes the bottleneck of the performance.

Further, one example of a system in which load distribution is executed is a cluster file system in which a plurality of hosts issue IO requests to a logical volume. The virtual machine of a host is migrated to a different host so as to distribute the load applied on the host.

Another method for distributing the load of disk IO is a method adopting a RAID (Redundant Array of Independent Disks) structure in which data is distributed and stored in a plurality of HDDs (Hard Disk Drives). Another possible method relates to uniting a plurality of HDDs or a plurality of physical volumes provided by the storage devices as a logical volume via logical volume manager (LVM) mounted in a file system of the OS (Operation System). This method enables to perform load distribution astride a plurality of disk array devices.

In addition, according to a prior art technique, it is possible to set up a plurality of disk array devices so that they are recognized as a storage device via a storage virtualization device or a virtualization system of a disk array device. Furthermore, performance optimization within the storage devices or the virtualization system is enabled via tier management in which data is migrated to a volume having an appropriate performance.

Moreover, a load distribution method using a plurality of controllers is taught as prior art technique in the following patent literatures.

CITATION LIST

Patent Literature

PTL 1: US Patent Application Publication No. 2010/0153767
PTL 2: US Patent Application Publication No. 2009/0019157

SUMMARY OF INVENTION

Technical Problem

The above-mentioned prior arts had drawbacks in that when performance bottleneck occurred in a virtual system including a plurality of disk array devices, it was difficult to perform load distribution without stopping the operation of the host while migrating a portion of the data within the volume in order to solve the problem of performance bottleneck of the disk array devices speedily.

In order to show a plurality of volumes astride systems as a logical volume via the LVM of the host OS, it is necessary to suspend the operation temporarily to set up the LVM. Further, in order to improve the performance, the administrator must create volumes and to migrate data among storage devices. In other words, the administrator must manage a plurality of separated storage devices, according to which the management of the correspondence of volumes of storages and a SAN (Storage Area Network) or OS becomes complex.

In a cluster storage taught in patent literature 1, there is no consideration on a Host Group setting associating volumes with host ports and target ports that must be set up for each physical storage device, or a LUN Masking setting.

In addition, when a volume is created in a cluster storage to realize load distribution of volumes in a SAN coupled system, the SAN administrator must perform Zone settings of the SAN in advance by comprehending in advance which volume is to be associated with a certain target port of a certain storage controller to perform load distribution. In order to create a storage device, setting of the SAN is required in association with ports astride a plurality of storage device.

When a node is added to the cluster storage, the SAN administrator must set up the Zoning by consulting with virtual machine operation administrators and storage administrators regarding which volume should be associated with a certain target port, which host accesses a certain volume, and which storage target port must be provided with an access permission of a host port, so the management load of setting the Zoning of the SAN in a cluster storage is increased.

A cluster storage device taught in patent literature 2 may also be provided with an access control (ACL: Access Control List) similar to an IP network. Recently, an environment has become popular in which a large number of virtual machines including a plurality of tenants are operated, and similar to the FC SAN Zoning, the change of access control is required also in an IP SAN configuration from the viewpoint of security.

In both patent literatures, there is no teachings related to additional functions operating in the storage, such as snapshot functions and volume copy functions. Actually, there is no teachings related to high-function data processing such as data de-duplication processing, especially on the load distribution method and IO transmission and reception method when a cluster storage structure is adopted. When identical data is written by data de-duplication processing, the table denoting the identical data is rewritten. At this time, actual data is not always stored in the storage device having received the IO. Therefore, at the time of reading of data, if IO is not issued to the storage device storing the actual data, the communication traffic between storage clusters may be increased.

Solution to Problem

In order to solve the problems mentioned above, the present invention provides a means for virtualizing a logical volume as a distributed virtual volume via a plurality of storage devices and to perform load distribution of the IO from the host.

The present invention also provides a means for setting up Zoning and for migrating volumes for distribution to respective storage devices upon migrating the normally operated logical volume to distributed virtual volumes.

The present invention also provides a means for constituting distributed virtual volumes among storage devices without influencing the operations of the storage device functions.

Advantageous Effects of Invention

In a computer system having a large-scale host computer where the performance of the storage device becomes the bottleneck, the present invention enables to provide a system having an enhanced performance and realizing load distribution which was not possible in a storage device without having to stop the operation of the host, that is, without the administrator explicitly stopping the IO issue request to the storage devices.

According further to the present invention, the storage administrator adds a storage device, provides physical wiring thereto and includes the same in the cluster storage without having to consult with host administrators and network administrators, so that a logical volume having insufficient performance can have data distributed and arranged in a plurality of storage devices, according to which the performance of the logical volume itself can be enhance and the management work can be cut down.

Actually, it becomes possible to migrate only a part of the logical volume data included in a logical volume created in a storage device to another storage device, to thereby improve the logical volume performance of the storage device via scale out without having to migrate the whole data stored in the logical volume to another storage device.

Further according to the present invention, it is not necessary to design the performance of volumes in advance via LVM, create a plurality of volumes, instruct generation of volumes of multiple storages, or design the capacity management of respective storage devices, and when high performance becomes necessary, the present invention arranges a logical volume in a plurality of storage devices and the necessary access ports are selected to set up a storage network.

Moreover, even in a case where a plurality of host computers issue an IO request to the logical volume of a cluster file system, the load distribution of the logical volume of the storage device can be realized without having to stop all the operations of the host computer.

Furthermore, the performance of the storage device may be deteriorated due to the programs operated within the storage device, calculation related to data processing (copy function or snapshot function of logical volume, de-duplication, compression, encryption, data search and the like) or data copy processing. In response thereto, by distributing volumes in a plurality of storage devices and activating the program in distributed manner in the respective storage devices, it becomes possible to distribute the load of performance of the programs within storage devices operated within a volume.

BRIEF DESCRIPTION OF DRAWINGS

FIG. 3A is a ladder chart illustrating an IO procedure for distributed virtual volumes.

FIG. 12A is a table showing the information related to a volume.

FIG. 12B is a table showing the information related to a volume.

FIG. 12C is a table showing the information related to a volume.

FIG. 13A is a table showing the information related to host groups.

FIG. 13B is a table showing the information related to host groups.

FIG. 14A is a table showing the information related to Zone setting.

FIG. 14B is a table showing the information related to Zone setting.

FIG. 15A is a table showing one example of TPG information and Referral information of the storage device.

FIG. 15B is a table showing one example of TPG information and Referral information of the storage device.

FIG. 16A is a table showing one example of TPG information and Referral information of the storage device.

FIG. 16B is a table showing one example of TPG information and Referral information of the storage device.

FIG. 18A is a table showing one example of TPG information and Referral information of the host.

FIG. 18B is a table showing one example of TPG information and Referral information of the host.

FIG. 19A is a table showing a Referral Hit/Miss information and name server query information of the host.

FIG. 19B is a table showing a Referral Hit/Miss information and name server query information of the host.

FIG. 21A is a table showing name server database information and zone database information of the SAN switch.

FIG. 21B is a table showing name server database information and zone database information of the SAN switch.

FIG. 22 is a table showing an active zone information of the SAN switch.

FIG. 28 is a block diagram illustrating one example of configuration of the virtual storage device and management information.

FIG. 34 is a block diagram illustrating one example of configuration of the virtual storage device and management information.

FIG. 38C is a block diagram illustrating one example of configuration of volume migration among virtual storage devices and the management information.

FIG. 41 is a table showing the page management information.

FIG. 48A is a flowchart illustrating the processing of a distributed virtual volume having applied the volume copy function or the snapshot function.

FIG. 58 is a block diagram showing a configuration of a virtual storage device receiving simultaneous accesses from a plurality of hosts.

DESCRIPTION OF EMBODIMENTS

Now, the preferred embodiments of the present invention will be described with reference to the drawings.

Figure 1:
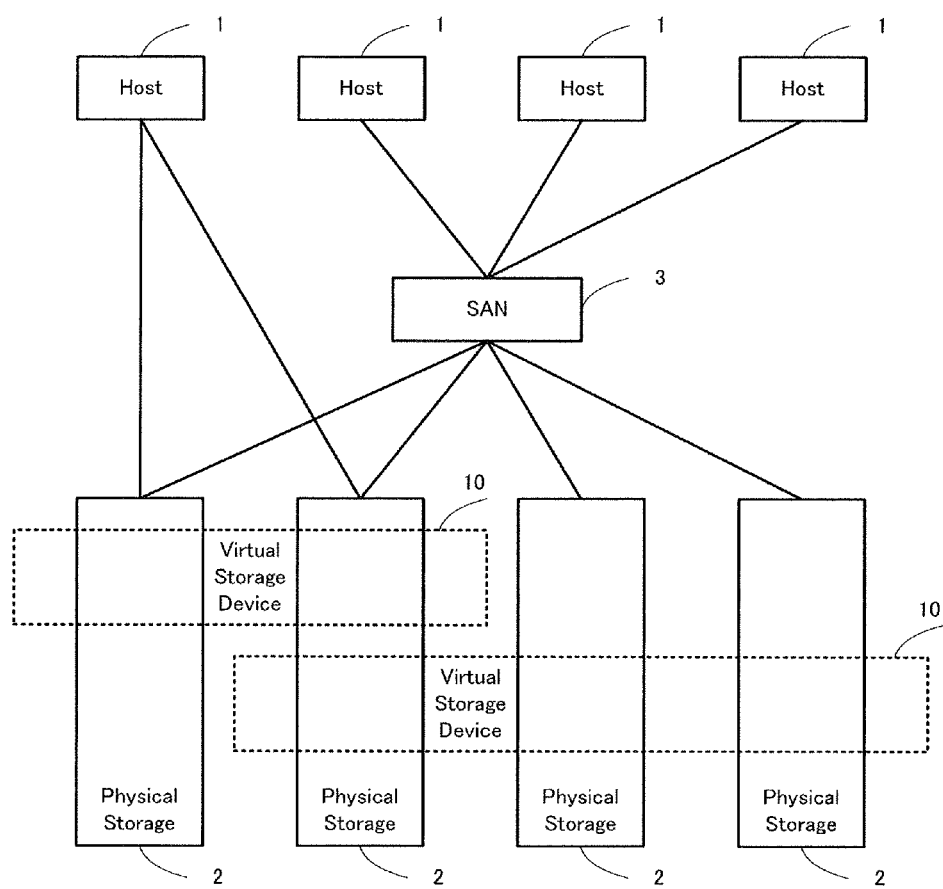
FIG. 1 is a block diagram illustrating a whole computer system.

FIG. 1 is a view showing an overall configuration of a computer system according to the present invention. One or more hosts 1 and two or more physical storage devices 2 are coupled to a storage area network (SAN) 3. A virtual storage device 10 is composed astride two or more physical storage devices 2.

In the present embodiment, the storage network 3 does not adopt a redundant configuration. However, it is possible to adopt a redundant network configuration having removed a point of failure. In a network configuration having redundancy, recovery processing becomes possible even if failure occurs during volume migration among storage devices.

According to another embodiment in which a storage network 3 is not intervened, a similar virtual storage device 10 can be composed by directly coupling the host 1 with two or more physical storage devices 2. Such arrangement will be described in detail later.

Figure 2:
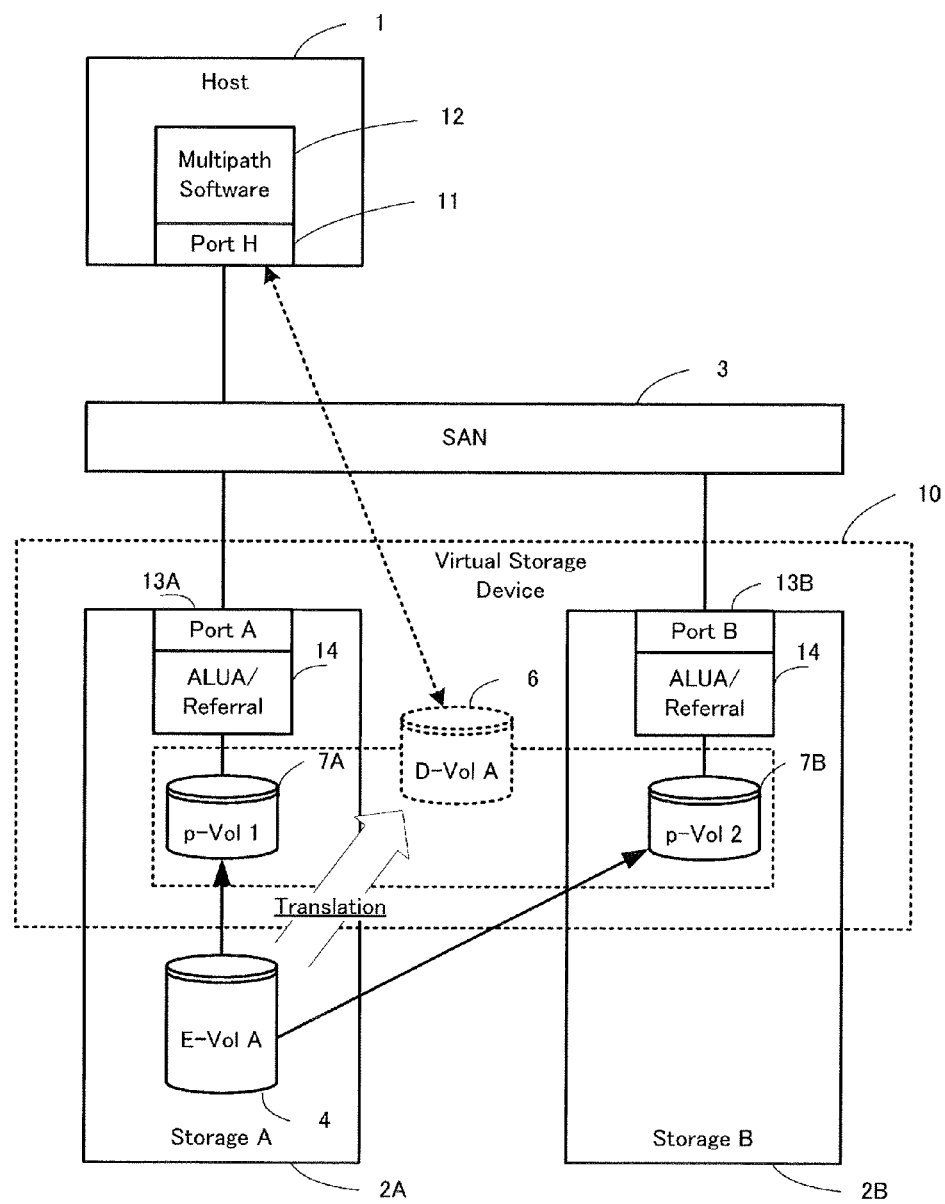
FIG. 2 is a block diagram illustrating one example of a configuration of a virtual storage device.

FIG. 2 illustrates a system configuration of a virtual storage device 10 formed astride storage devices 2A and 2B, and the change from an entity volume to a distributed virtual volume. The host has one or more ports 11. The host has a multipath software 12 capable of issuing an IO with respect to a plurality of logical paths. The multipath software of the host switches the path of the IO issue destination in granularity of UDS (User Data Segment) which is a granularity of the LBA (Logical Block Address) range using SCSI Referrals which is an extended function of ALUA based on SBC-3 (SCSI Block Command set version 3) and SPC-4 (SCSI Primary Command set version 4) standards.

The distributed virtual volume (D-Volume) 6 is formed as a complete volume when seen from host 1 by handling two or more partial volumes (P-Volume) 7A and 7B as a volume via Referral information. A partial volume 7 is an incomplete volume that stores data of a plurality of UDS out of all the UDS data of the distributed virtual volume 6, and a partial volume does not store all the data within the volume.

The conventional storage devices manage the application or non-application of a function in volume granularities. The partial volume constituting the distributed virtual volume of the virtual storage device stores information for activating the storage functions, similar to conventional volumes. The functions applied to the distributed virtual volume are inherited to respective partial volumes. The distributed virtual volume formed astride storage devices is a volume capable of realizing storage functions, similar to volumes of normal physical storage devices.

The procedure for activating the functions of the storage device via the distributed virtual volume will be described late in detail with respect to each storage function (such as a volume copy, a snapshot, a remote copy, a volume data compression, a volume data de-duplication, a tier arrangement control and a capacity allocation).

The multipath software 12 of the host may be realized through a switching scheme software unique to the storage device vender so as to perform control that is out of the standard range. The present embodiment illustrates a case where control is performed in conformity with the standards.

A procedure for the storage administrator to create a distributed virtual volume 6 and a procedure for setting up a Host Group information that must be set for the ports 13A and 13B of each physical storage device so as to enable the ports to be coupled with the host will be described in detail later.

The procedure for creating Zoning in connection with the creation of the distributed virtual volume 6 or the addition of the number of storage devices constituting the distributed virtual volume 6 for setting a Zoning ACL of the SAN by the storage device that does not require linkage accompanying the change of settings to the SAN administrator upon creating a distributed virtual volume 6 will be described in detail later.

According to another embodiment of the present invention adopting an arrangement in which the host and each storage devices are directly coupled and the communication paths are directly coupled to each storage device, and where a SAN does not exist and the setting of Zoning ACL is not necessary, the procedure for automating the steps for setting up the distributed virtual volume 6 with respect to each physical storage device will be described in detail later.

The outline of the processing of the virtual storage device for transiting from an entity volume to a distributed virtual volume will be described with reference to FIG. 2. In the initial state, the system only includes a physical storage device A, a SAN and a host. The physical storage device A has an entity volume 4 which is a conventional entity volume that is not formed astride storage devices. When the storage administrator adds a physical storage device B, the virtual storage device converts the entity volume to a distributed virtual volume 6 formed astride physical storage devices A and B according to the required performance of the entity volume 4 or the lack of capacity of the capacity allocation pool.

The steps of the transition processing of the volume will be described. First, the virtual storage device performs transferring of management information and changing of volume type. The data stored in partial volume 7A belonging to the distributed virtual volume 6 denotes the whole data stored in the migration source entity volume 4.

Next, the virtual storage device 10 assigns a partial volume 7B and a target port to the physical storage device 2B. The virtual storage device 10 updates the information of distributed virtual volume 6 and adds partial volume 7B to the distributed virtual volume 6. The partial volume 7B at this time is a volume that does not retain data and having unassigned data area. Thereafter, the virtual storage device 10 notifies the host multipath software that the target port is increased.

Next, the virtual storage device migrates data stored in partial volume 7A storing all the data of the entity volume 4 to partial volume 7B via a communication path 16 (described later) coupling physical storage devices A and B. The virtual storage device controls the consistency of cache control in migrated page granularity.

Whenever migration of data is completed, the virtual storage device updates the Referral information which is information managing the correspondence of the associated target port and the UDS (User Data Segment, which is described later) of the distributed virtual volume. The storage device notifies the Referral information to the host either in synchronization with or not in synchronization with the host IO, and updates the Referral information of the host.

The detailed processes required in a virtual storage device for transiting an entity volume to a distributed virtual volume, such as adding a partial volume, adding or deleting a target port, setting up a host group for each target port, setting of SAN Zoning in SAN connection, data migration method in page granularity, and inheriting of storage functions will be described later with reference to flowcharts that appear later (shown in FIGS. 35 through 46).

Figure 3B:
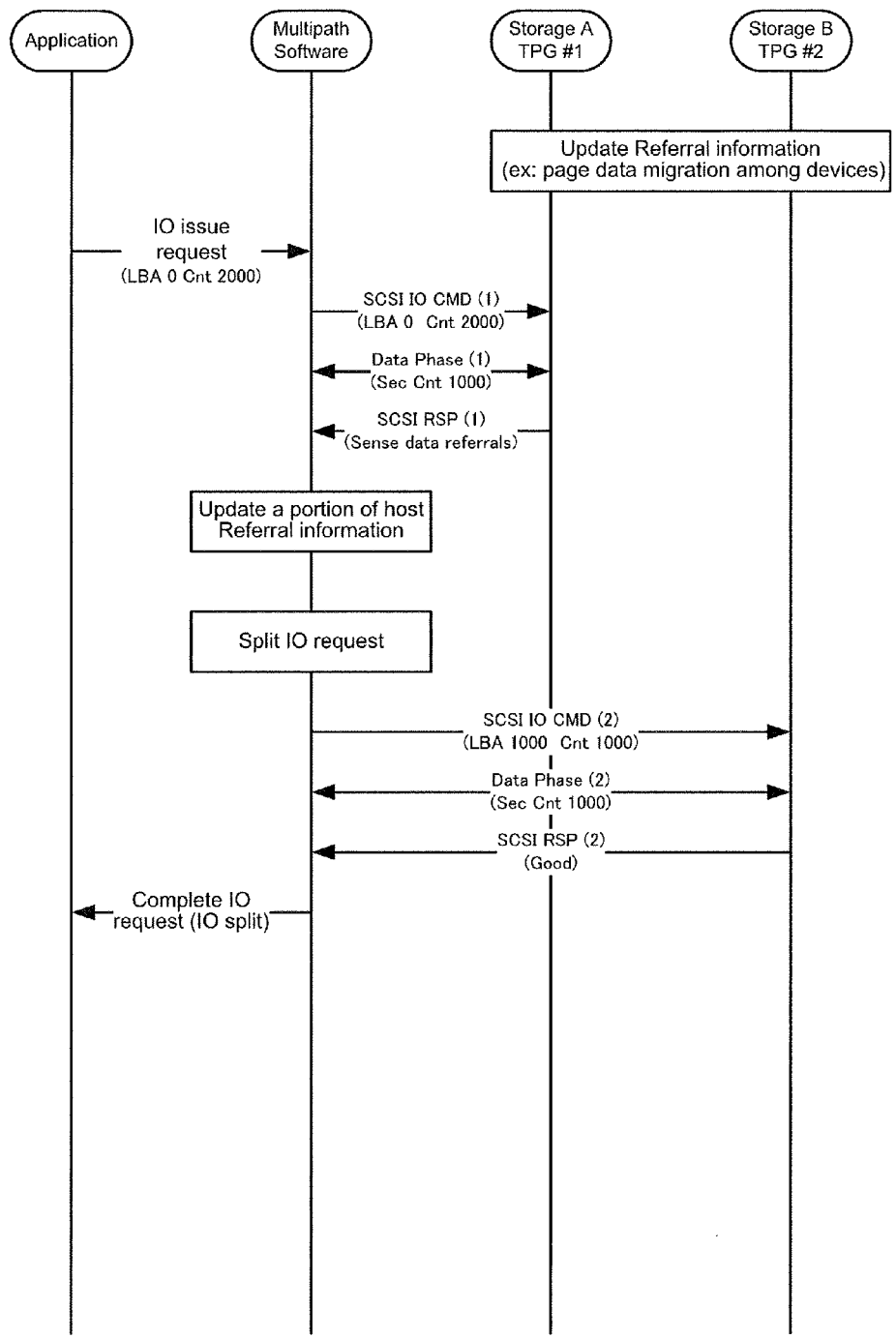
FIG. 3B is a ladder chart illustrating an IO procedure for distributed virtual volumes.
Figure 3C:
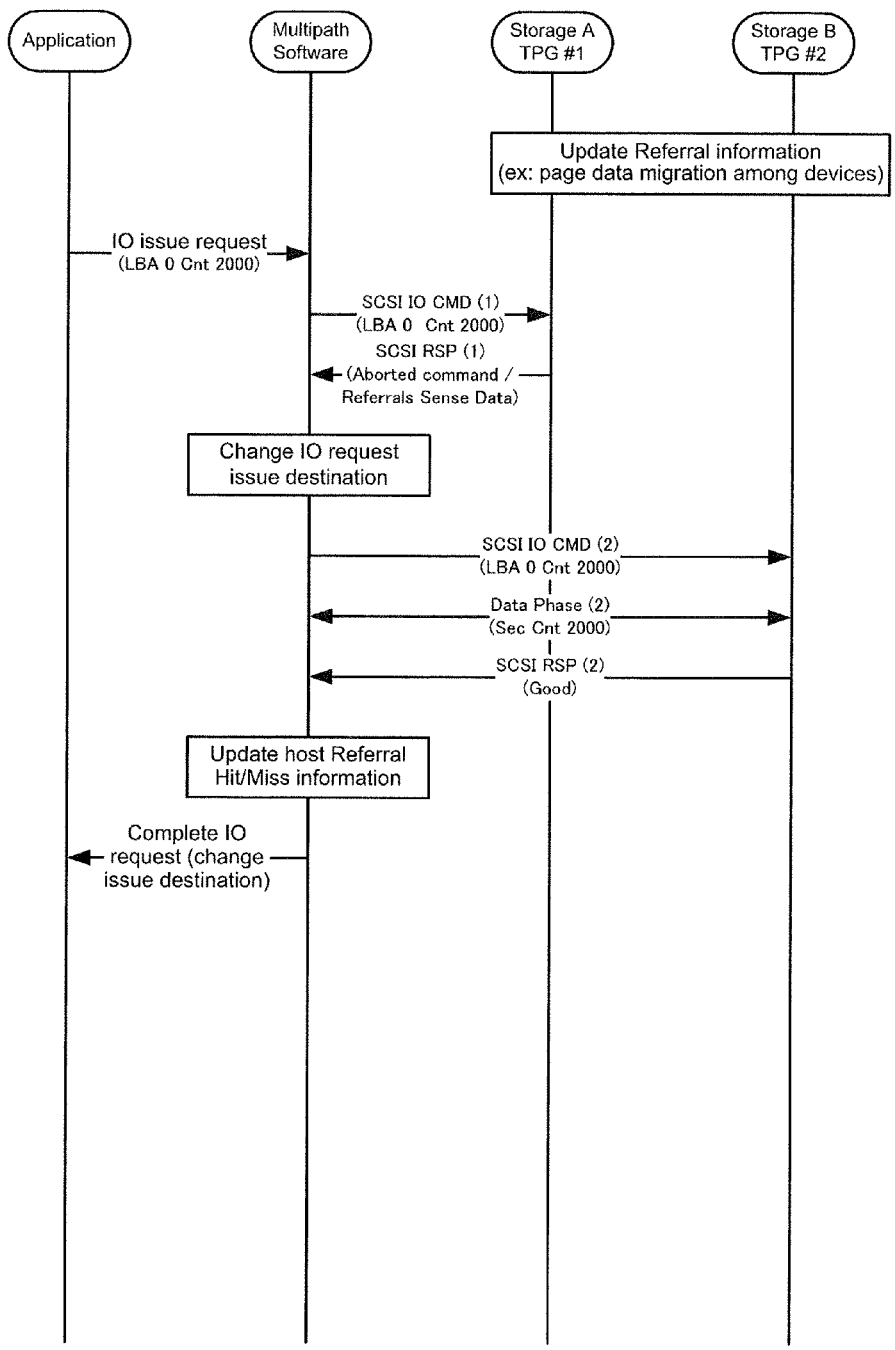
FIG. 3C is a ladder chart illustrating an IO procedure for distributed virtual volumes.

FIGS. 3A through 3C are ladder charts showing a process of the host for issuing an IO to the distributed virtual volume 6 accompanying the transition of data in page granularity among physical storage devices. In the present embodiment, for easier description, an example is illustrated in which a IO request (from LBA start address 0 to a transfer length of 2000 sectors) is received.

With reference to FIG. 3A, a procedure is described in which the storage device notifies the host that the whole Referral information has been updated in a non-synchronized manner. At first, the virtual storage device converts an entity volume to a distributed virtual volume. The virtual storage device updates the port status (AAS: Asymmetric Access State) of the TPG (Target Port Group) information (described later) from Active/Optimized to LBD (Logical Block Dependence). When the AAS of the TPG information is LBD, the virtual storage device sends a notification either in synchronization or in non-synchronization with the host IO regarding the update of the Referral information stored for each LU (described later). If the AAS of the TPG information is LBD, the host must refer to the updated Referral information and re-issue the IO. The Referral information divides a volume into multiple UDS. Therefore, if necessary, the multipath program of the host must divide the IO request into one or more IO requests for each UDS. This splitting of IO transfer is called IO Split transfer.

In the present embodiment, it is assumed that after converting the entity volume into a distributed virtual volume, a distributed virtual volume is formed in which LBA 0 through 999 are associated with TPG #1 of the storage device A and LBA 1000 through 1999 are associated with TPG #2 of the storage device B.

TPG information is a list storing pairs of target ports and target port statuses (AAS) corresponding to the volume storing the TPG information. Further, the Referral information is a list stored for each UDS which port is capable of accessing the relevant UDS (User Data Segment). The Referral information manages the correspondence of distributed virtual volumes and partial volumes and the correspondence of partial volumes and UDS, which are configuration information of the distributed virtual volume.

The virtual storage device sends a Unit Attention response notifying update of the TPG information (activation of Referral information) with respect to the IO issue request from the multipath software of the host. Upon receiving the notification, the multipath software 12 of the host sends a SCSI Report TPG command to the virtual storage device and acquires the TPG information, and the multipath software 12 of the host recognizes that the AAS of the TPG is updated to LBD. Thereby, the host recognizes that the volume has been transited to a distributed virtual volume 6 in the virtual storage device.

Next, the host sends a Report Referral command to the storage device and acquires the Referral information. This operation is also performed in the respective pairs of initiator ports and target ports. If a target port has been added accompanying the addition of a physical storage device, this operation can be recognized by the addition of entry of a target port in the TPG information. The TPG information and the Referral information acquired from the virtual storage device is retained in the storage area of the host as host TPG information and host Referral information. The detailed process will be described with reference to FIGS. 36 and 37.

The multipath software of the host splits the IO request for each UDS using the host Referral information, sorts and issues the split IO request to appropriate target ports. According to the embodiment of FIG. 3A, the IO request (sector number 2000) from the original application is split into two IO requests (SCSI CMD 2, 3), and each request is issued to the target port belonging to TPG #1 of the physical storage device A and the target port belonging to TPG #2 of the physical storage device B. Lastly, the multipath software of the host receives a good response of the IO request having been split and transferred to the respective physical storage devices, and collectively notifies completion of the IO request from the application.

With reference to FIG. 3B, an example is described in which the storage device notifies the host that the whole Referral information has been updated non-synchronously. The differences between the present procedure and that of FIG. 3A will be described. In FIG. 3B, the virtual storage device forms a distributed virtual volume arranged astride physical storage devices A and B. It is assumed that a partial volume is formed in each physical storage device and the SAN access control setting is already performed. Furthermore, it is assumed that the multipath software of the host has already acquired the TPG information. Moreover, it is assumed that the multipath software of the host has already acquired the initial state Referral information, and has already stored the same as host Referral information.

At first, the data from LBA 1000 through 1999 is subjected to inter-device page granularity data migration to a partial volume of the physical storage device B. Along with the inter-system data migration, the Referral information is updated. In the present example, page data migration is performed among storage devices in a distributed virtual volume. Further, it is assumed that a distributed virtual volume is composed in which the TPG #1 of storage device A is in charge of LBA 0 through 999 and the TPG #2 of storage device B is in charge of LBA 1000 through 1999.

Unlike FIG. 3A, FIG. 3B notifies only the changed portion of the Referral information to the host in synchronization with the IO. In other words, the host Referral information may temporarily store information that differs from the Referral information of the storage device.

When the multipath software of the host receives the IO request including the migrated area, the multipath software of the host refers to the host Referral information of the initial state and issues an IO request to TPG #1 of the physical storage device A without performing IO split. At this time, the physical storage device A processes only the IO transfer of LBA 0 through 999. The physical storage device A returns a SCSI Check response with an unprocessed remaining count 1000 (Residual Count=1000 Sectors) as a response to IO request 1. The Check response does not return an aborted command (Sense Key=Aborted Command) but returns an Inspect Referrals Sense Descriptors response of a command completed (Sense Key=Completed) response. The sense data of this response stores the Referral Sense Data, storing the whole or a portion of the Referral information that must issue the remaining IO request. Since the Sense Data has a limitation of 252 bytes, there is a limit in the number of UDS to be returned with respect to a response, and the physical storage device stores a portion of the Referral information corresponding to the remaining IO request to the Sense Data with respect to the multipath software of the host. The multipath software of the host updates the entries of the host Referral information with respect to the UDS of the Referral Sense Data of the halfway completion response regarding the IO request.

Next, the IO request is split using the updated host Referral information. Since the IO request regarding the UDS arranged in the physical storage device A is completed, the remaining IO request (SCSI CMD 2) regarding storage device B subjected to data migration among physical storage devices is executed. The multipath software of the host completes response of the two split IO requests and the application receives completion of the IO request.

With reference to FIG. 3C, a procedure is described in which the storage device notifies the host that the entire Referral information has been updated in a non-synchronized manner. Now, if it is assumed that the Referral information must retain the start point and end point of the LBA and the port information of the two systems, a entry (1 UDS) requires 32 bytes. If the smallest particle size of UDS is managed as a 4 MB segment, the Referral information required for a distributed virtual volume of 1 TB is, at maximum, 8 MB. This is a sufficiently small capacity stored by the multipath software of the host.

On the other hand, if the smallest particle size of the UDS is set to a very fine segment as small as 4 kB, the Referral information required for a 1 TB distributed virtual volume becomes 8 Giga Bytes at maximum. This is an extremely large capacity with respect to the current memory of the host (approximately a few tens of gigabytes to a hundred gigabytes), and the information cannot be stored by the host. In this case, since the Referral information exceeds the maximum capacity of the Referral information manageable by the host, an art of reducing the Referral information notified to the host by limiting the UDS to those having high access frequencies or a management information (Referral Hit/Miss information) for correcting erroneous determination of port selection using the Referral information with respect to the UDS having a high access frequency is required since the storage stores only a portion of the complete Referral information.

FIG. 3C illustrates partial data migration among storage devices and issuing of the IO requests, similar to FIG. 3B. In the example of FIG. 3B, the host stored the host Referral information, but in FIG. 3C, the host does not have a Referral information, and instead, stores a host Referral Hit/Miss information. The Referral Hit/Miss information is information storing the frequency of IO split transfer and issue destination when the issue destination is not correct regarding the segment having a high issue frequency of the host IO request. The host Referral Hit/Miss information is information for suppressing the failure occurrence rate which occurs when the frequency of IO request is high and the Sense Data issues a retry of the issued IO.

At first, the data from LBA 0 through 1999 is migrated in page granularity among storage devices to the partial volume of the physical storage device B. Along with the inter-device data migration, the Referral information is updated. In response to the IO request from the application, the multipath software of the host splits and issues one or more IO requests to the storage device A based on the history of the prior host Referral Hit/Miss information. If a prior history is retained in the host Referral Hit/Miss information, the multipath software of the host determines the physical storage device having a high success hit rate or the TPG having the youngest number as the representative storage device and issues the IO request. However, in the present embodiment, the IO request data has already been migrated to physical storage device B and is associated with physical storage device B, so that the physical storage device A returns an Inspect Referrals Sense Descriptors response for aborted command (Sense Key=Aborted Command) together with the Referral Sense Data.

In response to the Referral Sense Data included in the aforementioned response, the multipath software of the host splits one or more IO requests to one or more destinations. In the embodiment of FIG. 3C, the issue destination is changed to TPG #2 of the physical storage device B. The physical storage device B normally completes the request processing being reissued from the host. Thereafter, the multipath software of the host updates the Referral Hit/Miss information stored in the host by the received good response, and updates the prior history. If no entry exists, an entry is added and the history is updated.

Thus, the multipath software of the host retains the history of result of response to the IO request for each LBA area of the issued IO having a high frequency. Thereby, the number of IO issue retries due to aborted command can be reduced without the host having to retain and manage the whole Referral information stored in the distributed virtual volume of the virtual storage device.

Figure 4:
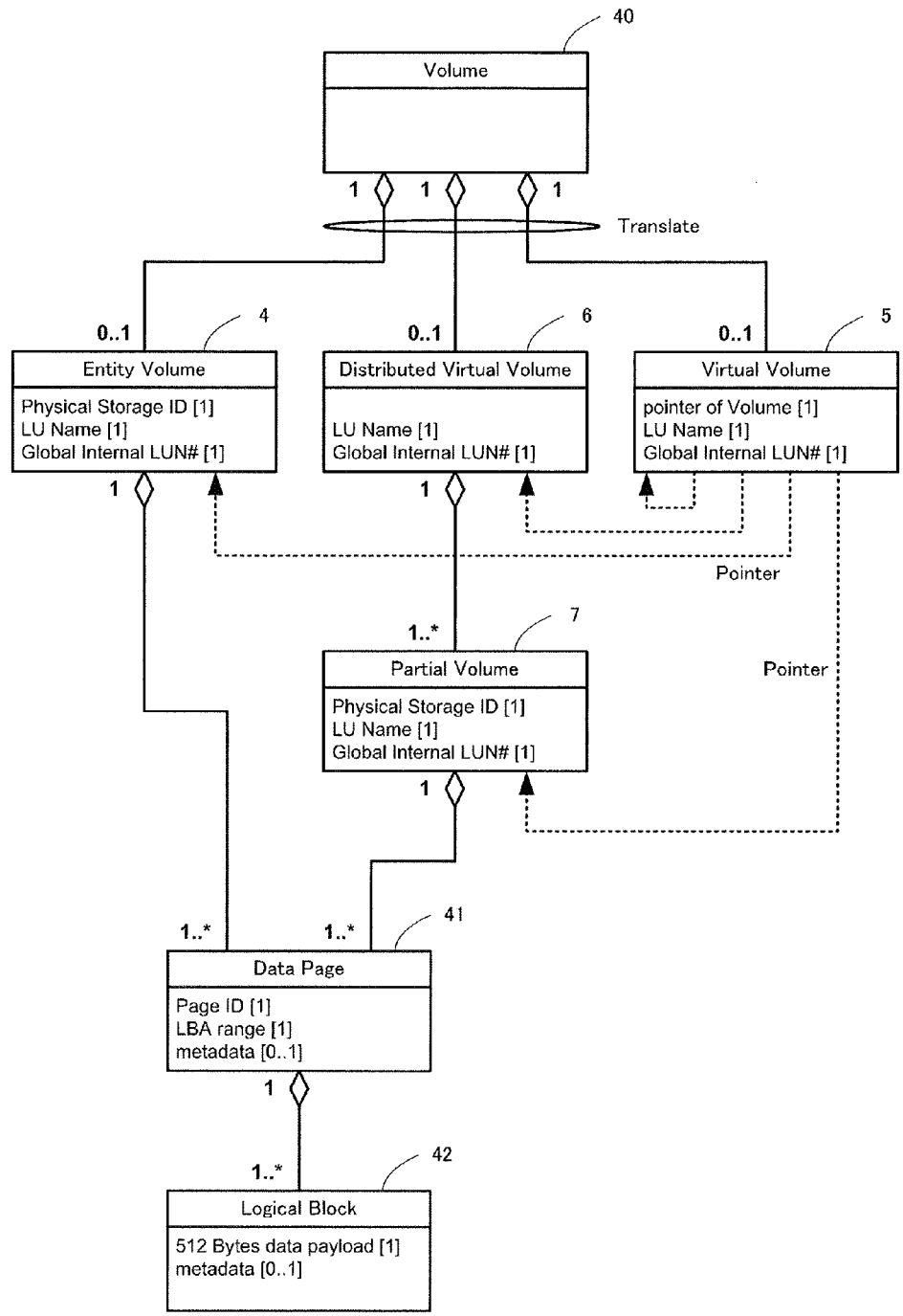
FIG. 4 is a diagram illustrating various volume types and the relationship thereof.

FIG. 4 is a drawing illustrating the types of volumes capable of being created by the storage device 2 and the relationship thereof. The storage device has a plurality of volumes 40. The volume 40 has one attribute selected from three types of volumes, a real volume 4, a distributed virtual volume 6 and a virtual volume 5, as a volume that can be accessed from the host. The partial volume 7 cannot be directly accessed from the host. The partial volume 7 is a special type of volume managed via the virtual storage device.

A real volume 4 has one or more data pages 41 and stores data as real data. The real volume 4 has an LU Name as a volume identifier required for the host to recognize the volume. The real volume 4 includes a global internal LUN (LU Number) as a unique LU identification number for internal management of the virtual storage device.

A distributed virtual volume 6 is a virtual volume for distributing and arranging one or more partial volumes 7 astride one or more physical storage devices. The real data that the distributed virtual volume has is stored in the partial volume 7. The distributed virtual volume 6 stores a table that associates the partial volumes 7 and the identifiers of the storage devices so as to store the information on which storage device corresponds to the partial volumes. Details thereof will be described later.

A virtual volume 5 is a volume that does not store data and that does not have a data page 41. The virtual volume can mount an entity volume 4, a distributed virtual volume 6, other virtual volumes 5 or a partial volume 7 within the storage device or among storage devices. Since the virtual volume 5 performs routing of the host IO processing to the mount destination volume, it becomes possible to handle a real data page 41 that is not actually migrated as a migrated page.

A partial volume 7 has one or more data pages 41 and stores data as real data. The partial volume 7 has a unique LUN (LU Number) among a plurality of storage devices, but it does not need an LU Name. The reason for this is because the distributed virtual volume 6 has an identifier capable of binding one or more partial volumes 7 and responding as representative to the host. In other words, the partial volume 7 is a volume that is hidden within the virtual storage device and that cannot be directly accessed from the host.

The data page 41 is split into granularity that can be easily handled by the program operating within the storage device.

The program operating within the storage device can use, for example, Thin Provisioning granularity, capacity reduction (de-duplication, compression) granularity, snapshot copy granularity, and data migration granularity for tier control for migration within the device. Depending on the type of the program, the number of logical blocks 42 included in a page can differ. Further, the size can be different or the same with the size of the User Data Segment of the SCSI Referral described with reference to FIGS. 14A and 14B. The reason for this is because a page granularity that is easily handled as a program within the storage device is not always equal to the granularity of a User Data Segment for determining the IO path in storage device granularity. The data page 41 includes a page identifier, a start offset of a continuous LBA range, and a metadata mapped to its own data page. The details of the page information will be described later with reference to FIG. 41.

The logical block 42 stores real data of 512 Bytes, which is a typical SCSI block size, for example. Further, the logical block has metadata.

Figure 5:
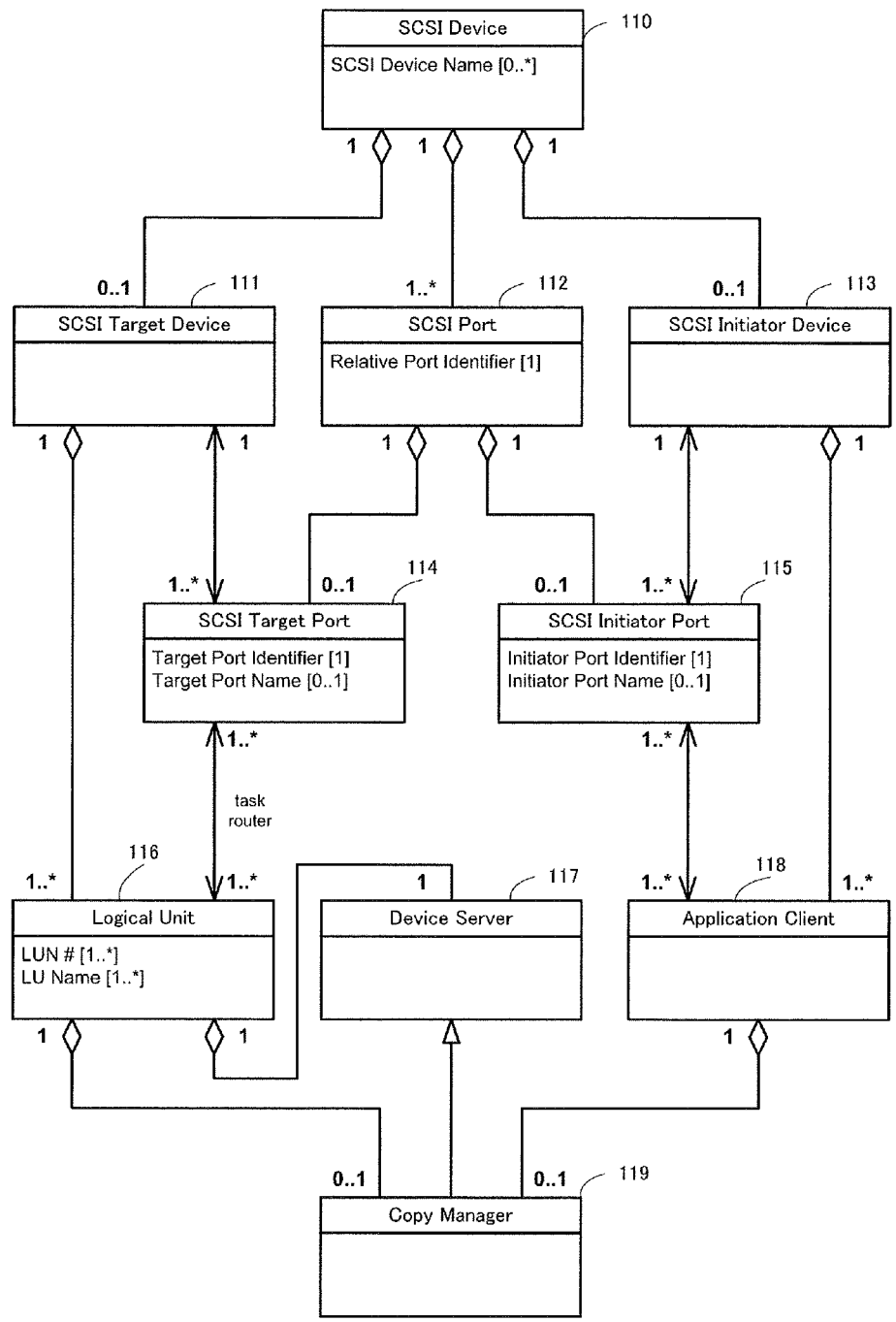
FIG. 5 is a diagram showing components constituting the storage device and the relationship thereof.
Figure 6:
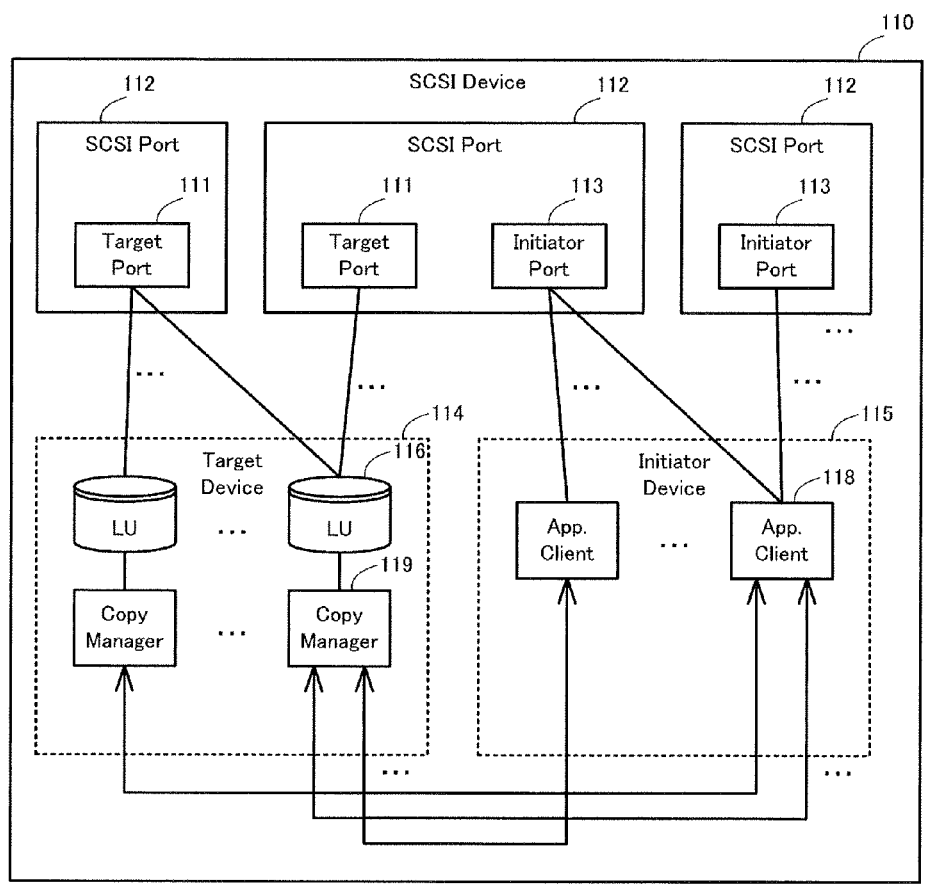
FIG. 6 is a block diagram illustrating an example of components.
Figure 7:
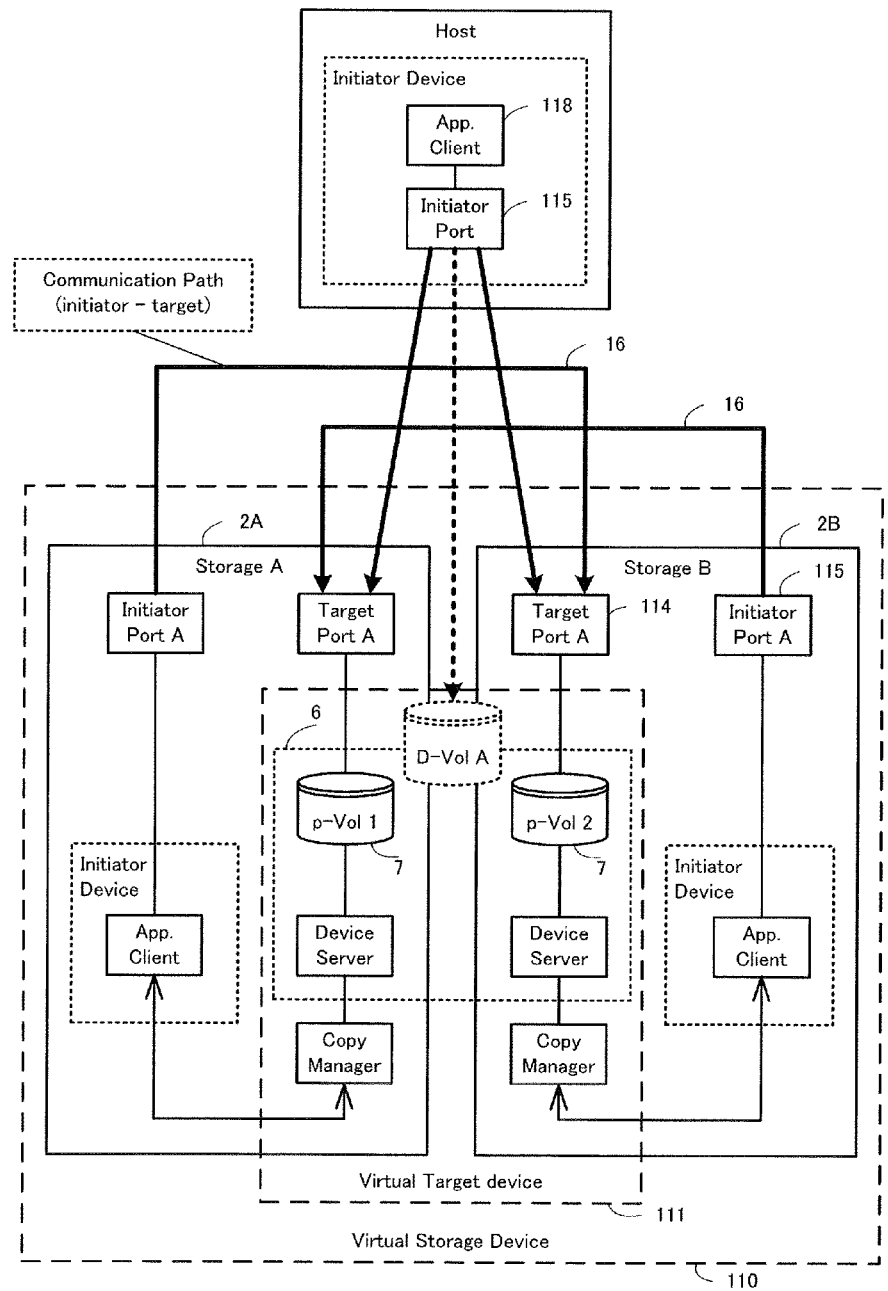
FIG. 7 is a block diagram illustrating an example of arrangement of distributed virtual volumes.

FIG. 5 is a drawing showing the components of a storage device and the relationship thereof. One example is illustrated in FIGS. 6 and 7, but the present invention is not restricted to the configuration of FIGS. 6 and 7 and can be composed within the range illustrated in FIG. 5.

A SCSI Device 110 includes one or more SCSI Ports 112. Further, a SCSI Device 110 has either or both a SCSI Target Device 111 and/or a SCSI Initiator Device 113.

In the present embodiment, upon migrating a volume to another storage device, it is necessary to migrate the data of a volume via a copy manager 119 mentioned later. Therefore, a volume (Logical Unit) has the attributes of both initiator and target. A SCSI Port 112 has an attribute of either or both a SCSI Target Port 114 and/or a SCSI Initiator Port 115.

If a SCSI Device has both the SCSI Target Device 111 and the SCSI Initiator Device 113, a SCSI Port 112 having both attributes of the SCSI Target Port 114 and the SCSI Initiator Port 115 exists, or a plurality of SCSI Ports 112 each has the attribute of the SCSI Target Port 114 or the attribute of the SCSI Initiator Port 115.

A SCSI Target Device 111 has one or more logical units 116. A SCSI Initiator Device 113 has one or more application clients 118. A SCSI Target Device 111 has a plurality of SCSI Target Ports. Further, a SCSI Target Port belongs to a SCSI Target Device. Similarly, a SCSI Initiator Device 113 has a plurality of SCSI Initiator Ports. Further, a SCSI Initiator Port belongs to a SCSI Initiator Device.

A SCSI Target Port is associated with a plurality of logical units. This means that a SCSI Target Port is capable of communicating with a plurality of volumes. Further, a logical unit can be accessed from a plurality of SCSI Target Ports. This means that a multipath structure is adopted in which a plurality of ports can access a volume.

A SCSI Initiator Port is associated with a plurality of application clients. This shows that a SCSI Initiator Port issues a command from a plurality of application clients. Further, an application client can be accessed from a plurality of SCSI Initiator Ports. This means that a multipath structure is adopted in which a plurality of ports can access an application client.

A logical unit has a device server 117. The command issued from an application client 118 is sent via a SCSI Initiator Port 115 to a SCSI Target Port 114, which is then routed via a task router (not shown in the drawing) to a logical unit 116. The device server 117 processes the received command.

A copy manager 119 which constitutes a portion of the device server 117 can send data of the logical unit 116 via an application 118 to another SCSI Device 110 and receive data therefrom.

Although not shown in the drawing, when a plurality of SCSI Devices 110 exist, a SCSI Port 112 can be associated with two or more SCSI Devices 110. For example, if there are two SCSI Devices 110, two different SCSI Ports can be assigned to each SCSI Device or a SCSI Port can be shared by the two SCSI Devices. This is described in detail later in the description of a Host Group information.

A SCSI Port 112 has a Relative Port ID which is an identifier of itself. This identifier is used as an identifier of ALUA described with reference to FIGS. 15A and 16A. The Relative Port ID must be unique within the SCSI Device since it is used for a multipath port identification. However, in the exterior of the SCSI Device where the namespace differs, the same Relative Port ID can be used.

The SCSI Target Port and the SCSI Initiator Port must each have a port ID. Further, the SCSI Target Port and the SCSI Initiator Port must each have a port name identifier. The port ID and the port name identifier must be distinguished with other ports, and must be unique.

In the case of a Fiber Channel protocol, the port ID corresponds to a 3 Bytes N_Port ID (Node Port Identification) assigned from a name server of a fabric upon logging into a fabric. The port name identifier corresponds to an 8 Bytes WWPN (World Wide Port Name) of the N_Port (Node Port). In the case of another communication protocol, the relationship between the port ID and the port name is changed, but a similar arrangement is enabled when it is replaced with a corresponding relationship via the SCSI protocol.

The logical unit 116 has one or more logical unit numbers as identifiers thereof and one or more logical unit names. These identifiers must be distinguished from other volumes and must be unique. If a SCSI Device formed astride a plurality of storages is defined as a virtual SCSI Device, the identifiers must be unique within a same namespace among a plurality of storage devices. In order to realize the same, the identifier must be taken over within the same namespace among storage devices. The logical unit 116 refers to the volume 40 illustrated in FIG. 4.

FIG. 6 shows one example of the components illustrated in FIG. 5. The SCSI Port of FIG. 6 can have only one of or both the attributes of a Target Port and/or an initiator port. The Target Port is associated with one or more LUs. An LU is associated with a plurality of Target Ports, by which a multipath configuration is realized. An LU has a copy manager and is associated with an application client of one or more initiator devices. The LU copy manager outputs an instruction to the initiator device and enables data to be copied or migrated between the initiator port and LUs of other Target Ports.

FIG. 7 illustrates a mounting example of a copy manager when a distributed virtual volume is arranged in a plurality of storage devices. The target port of each storage device is associated with a partial volume 7 of the distributed virtual volume. The copy manager of each storage device is capable of communicating with a target port of both storage devices via an initiator device.

Now, the storage device defines a new partial volume 7, and by ensuring a data storage destination, the real data of the partial volume can be migrated to different storages. Further, the data of a different storage can be migrated to the internal storage device. Thus, a remote copy function is realized in which a volume between storage devices is migrated to another storage device as mentioned in detail later.

Figure 8:
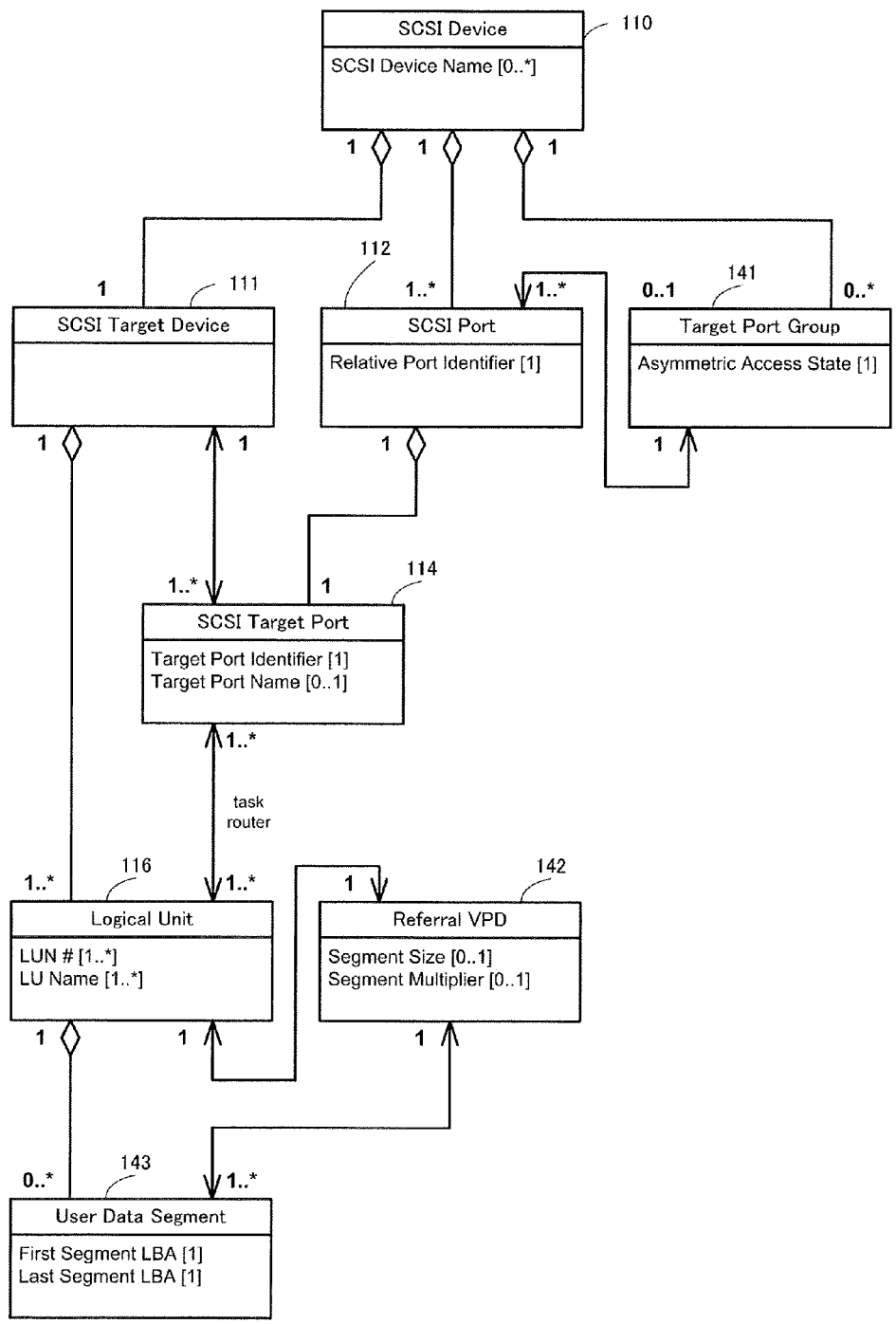
FIG. 8 is a diagram showing components constituting the storage device and the relationship thereof.

FIG. 8 is a partial view of FIG. 5, illustrating a relationship diagram having added the information related to ALUA and Referral of the Target Port. The portion of FIG. 5 related to the Initiator is omitted from the drawing. The SCSI Device 110 stores a number of zero or greater as the Target Port Group 141. A device that does not have even a Target Port Group 141 does not correspond to a multipath of ALUA standard, so according to the present embodiment, the device is set to include at least one or more Target Port Group s 141.

The Target Port Group 141 has a port status AAS (Asymmetric Access State). The AAS maintains the status of the TPG. The TPG has one or more SCSI Ports 112. The SCSI Port includes at least the attribute of a SCSI Target Port 114. A TPG 141 is associated with one or more SCSI Ports via a Relative Port ID. Therefore, when the AAS of the TPG 141 is varied, the status of all the SCSI Target Ports 114 associated with the TPG is changed.

The host issues a command to the logical unit 116. Typical commands issued by the host to acquire and set up information related to the multipath or recognition of the volume are a SCSI Report Target Port Group command which is a command for acquiring the AAS of the TPG, a SCSI Set Target Port Group command which is a command for setting the AAS, and a SCSI Inquiry command which is a command for acquiring the VPD (Vital Product Data) of the logical unit 116.

By virtualizing the SCSI Device and associating a SCSI Target Port with a plurality of SCSI Devices, it becomes possible to virtualize the namespace of the TPG. In other words, by separating the namespace of the SCSI Device via the Host Groups described in detail later, the AAS of the TPG which is the state of the SCSI Target Port can be changed for each LU. This arrangement is illustrated in FIG. 28.

If it corresponds to Referral, the Logical Unit 116 holds a Referral VPD information 142. The Referral VPD information 142 stores segment size and segment multiplier. When these values are set, the Referral stores the state of the TPG corresponding to a double number of the segment multiplier via an alignment set via segment size. If the segment multiplier is set to zero, the User Data Segment 143 can arbitrarily set the association between the segment information and the TPG information based on the description of the Referral descriptor according to the Report Referral command, and each UDS can have a segment size set arbitrarily. The details of these information will be described in detail later with reference to FIGS. 15B and 16B. A logical unit 116 has a plurality of User Data Segments 143. The boundaries of the segments 143 follow the information of the Referral descriptor.

Figure 9:
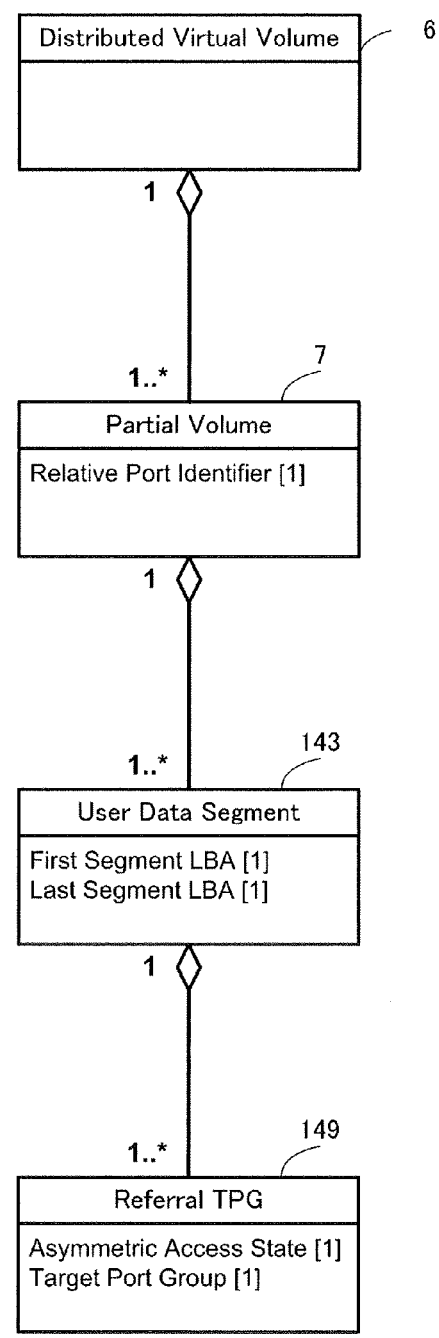
FIG. 9 is a diagram illustrating a configuration of a distributed virtual volume.

FIG. 9 is a drawing illustrating the structure of a distributed virtual volume (D-Volume) 6. The distributed virtual volume 6 includes one or more partial volumes 7. If the distributed virtual volume is defined to be formed astride a plurality of storage devices, the number of partial volumes corresponds to the number of storage devices. A storage device can have one or more partial volumes 7 constituting the distributed virtual volume 6. The partial volume 7 has one or more UDS 143. The UDS 143 has a first segment LBA and a last segment LBA. Further, the UDS 143 has one or more Referral TPG 149. A Referral TPG 149 has only one pair of AAS and TPG number. The port information for accessing the UDS 143 is selected according to the Referral TPG 149. The details of these information will be described later.

Through use of the ALUA, the host can search the port of a usable storage device, update the relationship of usable target ports for the host to access the LU and update the path information of the ALUA so as to enable communication with the storage device via an arbitrary usable target port. Further, when failure of the ALUA occurs with respect to the port, the storage device can replace the port with a usable substitute port and update the path information of the ALUA, so as to enable the ports to be replaced without having to update all Referral information.

Figure 10:
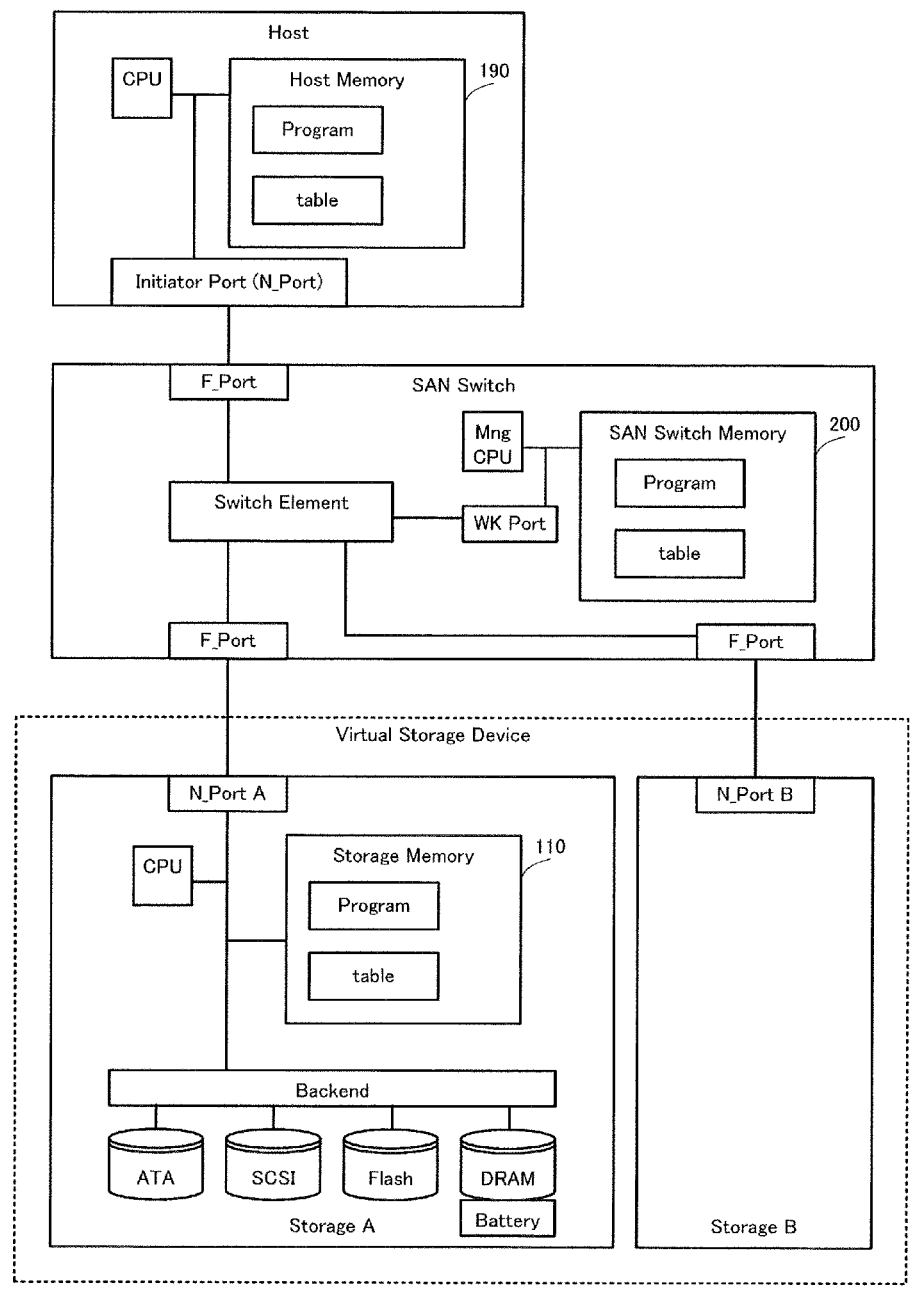
FIG. 10 is a block diagram illustrating an internal configuration of a system.

FIG. 10 is a view illustrating an internal configuration of the storage device according to the system configuration illustrated in FIG. 2. The host, switch and physical storage device illustrated in FIG. 10 each comprises an arrangement for performing processing as an information processing apparatus, such as a CPU, a memory unit and an input/output unit, and the processing performed by each unit is performed in linkage via the respective hardware.

Further, each processing can be formed as an integrated circuit or the like and realized via the respective hardware functioning as a processing unit thereof. The operation mainly performed by the storage device is executed by the CPU of the storage device functioning as a control unit based on a program developed in a memory and referring to the information stored in a memory and the like.

Figure 11:
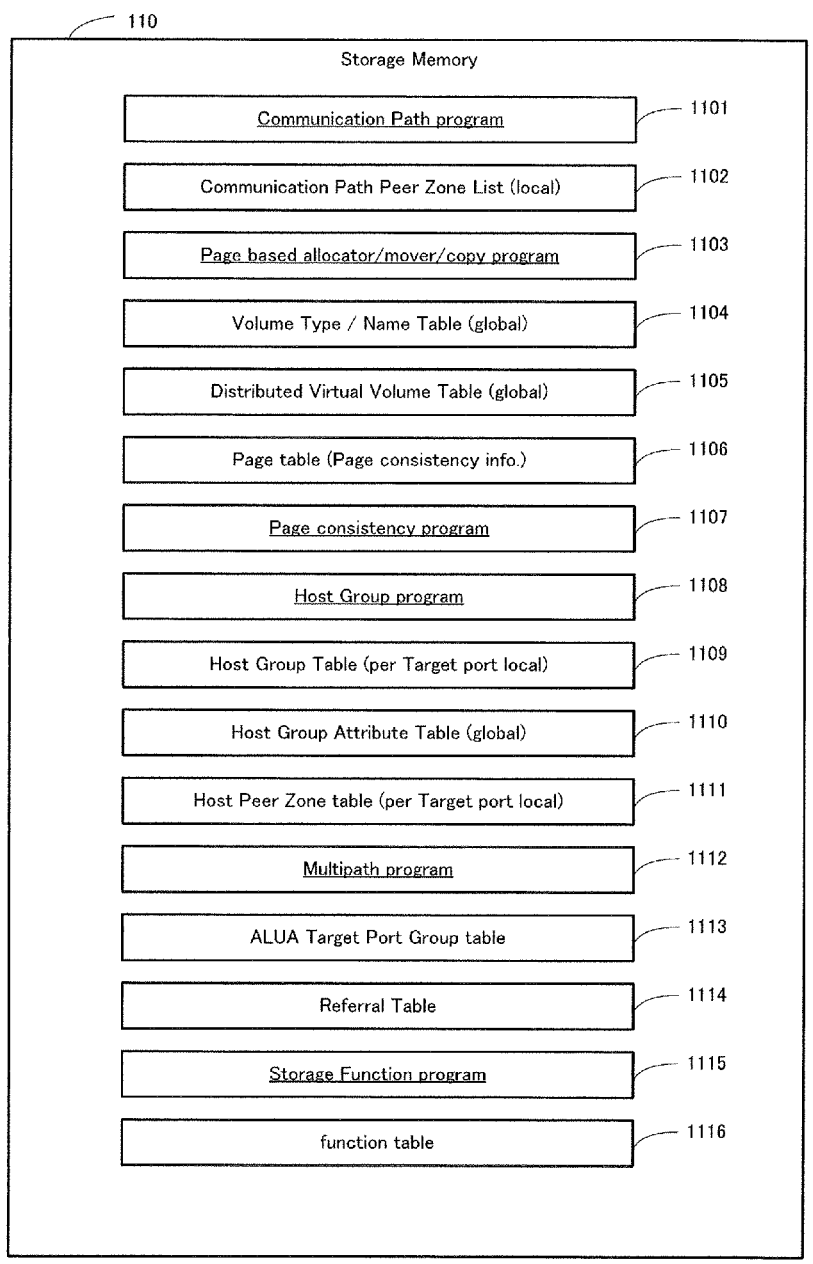
FIG. 11 is a block diagram illustrating information in a memory of the storage device.

FIG. 11 shows the details of a program and information that the physical storage device illustrated in FIG. 10 stores. These information are information and program stored in a memory 110 of the physical storage device illustrated in FIG. 10. The respective information and programs will be described in detail with reference to the subsequent drawings.

FIG. 12A is a volume type table 1104. This table 1104 is information shared among all storage devices within the system configuration illustrated in FIG. 1. Information of a volume type table 1104 is shared for example using a communication path 16 illustrated in FIG. 7 or a communication path for a management terminal (such as an Ethernet (Registered Trademark)). Further, the present embodiment refers to the information as a table, but the form of data structure is not limited thereto, and can be other structures such as a list.

The volume type table 1104 stores fields including volume type, unique LU name, internal LU number which is a pointer to a volume, and a physical storage device number unique among storage devices with respect to each entry storing a unique internal LU number.

The internal LU number is a number for identifying a volume. According to the system configuration illustrated in FIG. 1, the internal LU number must be unique, but since the number is determined by shortening the LU Name, it is not required to be unique worldwide. For example, a unique internal LU number should be assigned within the data center in the system illustrated in FIG. 1 or within a virtual data center having connected a plurality of data centers together.

The volume type includes the entity volume 4, the distributed virtual volume 6, the virtual volume 5 and the partial volume 7 illustrated in FIG. 4.

The LU name is a unique identifier for identifying volumes. It can be a number assigned uniquely within the system configuration of FIG. 1 or can be a WWULN (World Wide Unique LU Name). However, as for the distributed virtual volume 6 and the virtual volume 5, the LU name of the internal LU number being the pointer to the volume is taken over. FIG. 12A shows such status using brackets.

The internal LU number as pointer to a volume is a number showing a pointer pointing to a parent volume of the virtual volume 5 or the partial volume 7. For example, in FIG. 12A, the internal LU number 0002 is a virtual volume, and denotes a volume 0000 (LU name AAAA_AAAA). Similarly, the internal LU numbers 0003 and 0004 are partial volumes 7 constituting distributed virtual volume 6 having an internal LU number 0001. Each partial volume denotes the same LU name (BBBB_BBBB).

A physical storage device number is a serial number assigned during shipping, or the number can be assigned uniquely within the system configuration illustrated in FIG. 1. In the example of FIG. 12A, each partial volume is arranged in physical storages #0 and #1, so that a structure is adopted in which the partial volumes are arranged in distributed manner among physical storages.

FIG. 12B is a table 1105 extracting the structure of a distributed virtual volume according to FIG. 12A. The relationship between the distributed virtual volume and two partial volumes will not be explained here, since it is already explained in FIG. 12A. FIG. 12C shows a function information 1116 for managing the functions of the storage device per each volume. This information is stored in the virtual storage device and shared among respective physical storage devices.

Regarding the entry of the internal LU number, fields including a flag information showing activated functions within the storage device and an internal LU number of the distributed virtual volumes inheriting the functions are provided. Based on these information, the functions of the partial volume belonging to a distributed virtual volume is inherited from a distributed virtual volume. A page granularity allocation program 1103 for managing allocation of volumes or for allocation of data allocated to the UDS in granularity of data page 41 formed within the volume is used to manage the information of FIGS. 12A through 12C.

Now, if the information on volumes of FIGS. 12A through 12C is stored in a management terminal, and if failure occurs to the management terminal, it becomes possible to acquire basic information for accessing the volumes in addition to the creation of volumes. In distributed virtual volumes, a failure may occur by which the position of partial volumes may become unclear and access to data becomes impossible. These information are extremely important information, so that they should preferably be stored in a memory of a device having redundancy and with a high availability, such as a memory within a physical storage device.

Further, the management network (not shown in FIG. 1 or 10) of a virtual storage device management terminal for collectively managing a plurality of physical storage devices has a low communication reliability, since the network is not redundant, and in the case of the Ethernet (Registered Trademark), packet loss or congestion occurs. Therefore, considering the low reliability of the management network, it is preferable for the communication path to utilize a dedicated path or a path using a SAN.

FIG. 13A is a view illustrating a host group information 1109. A host group information refers to the information used for determining a target port of a storage device given permission to access a volume for each host. This information is managed via a host group program 1108. The host group information 1109 is created based on the information of FIGS. 12A through 12C, so it can be information stored in target port granularity of the physical storage device or can be information shared among the respective physical storage devices of the system illustrated in FIG. 1.

The host group information stores for each entry of the host group number a WWPN of the target port, a WWPN of the host port, a host LU number, an internal LU number and an attribute number. The host group number refers to an abbreviated number assigned for convenience of the program, which is a number used by the other tables for referring to the present table 1108. If the host group number is information stored in target port granularity in the physical storage device, a unique host group number within the target port is assigned. If the information is shared among all physical storage devices in the system illustrated in FIG. 1, the host group number should be unique within the whole system.

The target port WWPN is a WWPN of the target port of the physical storage device given the permission to access the relevant internal LU number. The host initiator port WWPN is a WWPN of the host port given the permission to access the relevant internal LU number.

The host LU number is an LU number seen from the host for mapping the internal LU number managed within the storage device to a different number with respect to a specific host given the access permission. If a multipath configuration or a distributed virtual volume configuration is adopted, it is necessary to assign the same number as the host LU number and to perform settings so that the same LU number is seen from the host.

The attribute number is an index number for referring to the table of FIG. 13B. The details of the meaning of attribute will be described with reference to FIG. 13B. In the case of a distributed virtual volume, the internal LU number corresponds to the partial volume. As for the host LU number, the same number must be seen from the host. The attribute of the distributed virtual volume is confirmed using the information of FIGS. 12A through 12C, and the host group program 1108 performs appropriate management thereof. As can be recognized from the following explanation, the distributed virtual volume must have consistency for all the settings of the target ports for accessing the partial volumes, but the settings thereof are performed consistently via a host group program. Thus, there is no need for the storage administrator to perform settings for each partial volume granularity. Regarding the settings of the host group, regardless of the existence of a SAN, by performing the settings of access control in granularity of host and volume pairs so as not to enable the host to see all the volumes when the volumes are created, it becomes possible to prevent erroneous accesses.

Figure 35:
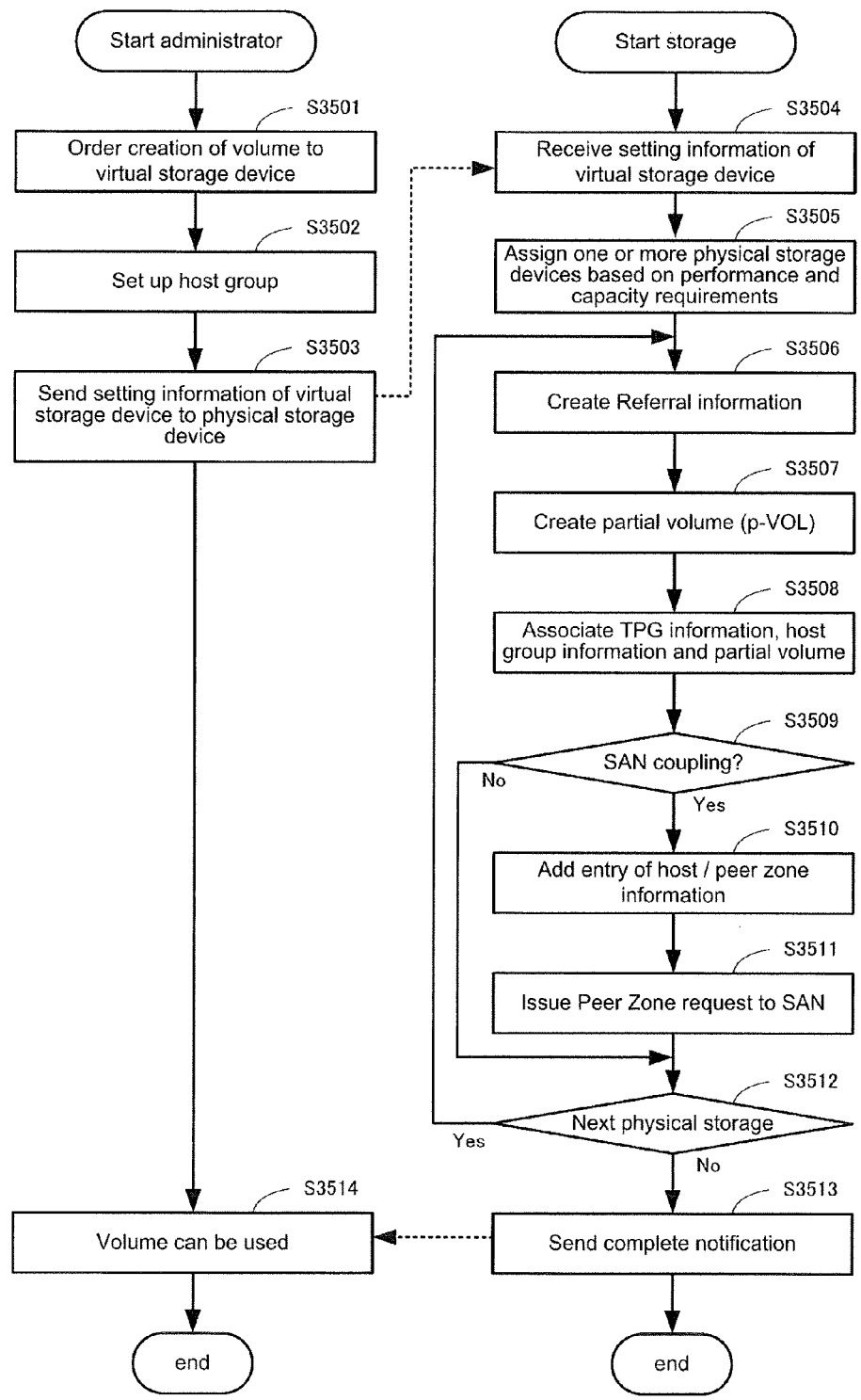
FIG. 35 is a flowchart showing the processing for creating a distributed virtual volume.

Similarly, as for the Zoning ACL of the SAN, a complex setting is required since the zoning must be set in partial volume granularity, that is, if the physical storage device is formed astride N number of volumes, zoning must be set with respect to N number of target ports. Further, if a redundant path (multipath) is formed between the physical storage devices and host systems such as according to the structure of a redundant SAN, the administrator of the storage device must set up 2×N paths when forming a distributed virtual volume, and the SAN administrator must set up a zoning of 2×N paths. Regarding the process of hiding the settings and simplifying the same in partial volume granularity during creation of volumes will be described in detail with respect to the processing of volume creation (FIG. 35).

FIG. 13B is a host group attribute table 1110. The host group attribute table 1110 is managed by the host group program and constitutes a set with the host group information 1109. The host group attribute table 1110 is information shared among physical storage devices in the system of FIG. 1 and used by the administrator managing the virtual storage device.

The host group attribute table 1110 is a selection table providing attributes, wherein the storage device administrator initially sets up the table as a setup template when setting a policy selected during creation of a volume, and the table can be reused when creating another volume. The host group attribute table 1110 has fields of a host OS (Operation System) type, a host multipath software type, an automatic data migration variation, and policy for selecting ports of the physical storage device or for switching ports, for each entry of attribute number.

Now, the respective fields of the host group attribute table 1110 will be described. The host OS type field is a field in which the storage administrator sets up and stores the OS vender and the OS name of the host, the version of the OS and so on. Based on this information, the multipath operation of the ALUA and Referral are controlled from the side of the storage device so as to absorb the difference of implementation of OS venders in a multipath of a standard ALUA. For example, it is possible that the behavior of the multipath software may vary according to the version of the OS.

The host multipath software type is a field for storing the standard version number of the host multipath software set by the storage administrator. According to the prior art standard, there is no rule regarding the operation for sorting the IO to target ports in UDS granularity by Referral. Therefore, in order to maintain the connection compatibility with the prior art hosts, the storage administrator sets up this type for connection with a specific old host. Choices such as the prior art standard SPC-3 ALUA, the SPC-4/SBC-3 Referral or future standards can be stored. As for future standards, it is possible to realize connection with a future host multipath software by updating the storage control program. The automatic migration type field is a field for retaining the policy set by the administrator on whether the virtual storage device should perform addition or deletion of a partial volume of the distributed virtual volume based on the addition of a physical device or the lack of performance or capacity required in the distributed virtual volume.

The policy field for selecting ports of the physical storage device or port switching is a field for setting a performance policy for suppressing influences with respect to other volumes when selecting a target port of the physical storage device. For example, the storage administrator sets up the policy so that a port requiring a high transaction performance is assigned to a port in an exclusive manner with other volumes requiring throughput performance, or so that a port is selected to prioritize the transaction performance.

FIG. 14A is information 1111 related to setting up a peer zone of hosts and target ports of storage devices. Upon creating distributed virtual volumes, the number of ports for setting a Zoning ACL of the SAN is proportional to the number of physical storage devices, so the information is used to set the zone of the SAN from each physical storage device regarding target ports belonging to distributed virtual volumes. A host/peer zone information 1111 is automatically generated for each target port by referring to the host group information, and is managed via a host group program 1108.

The peer zone information is information managed in target port granularity. The information is obtained by referring to the aforementioned host group information, searching all information of the same target port within the physical storage device from the respective host group information, and recreating the data for each target port granularity. As shown in FIG. 14A, it is also possible to share the peer zone information as an information of all the physical storage devices.

A host/peer zone information 1111 has, with respect to the entry of a storage target port WWPN of the physical storage device, fields of a coupling mode, an initiator port number, a host initiator port WWPN and a list of pairs of host group numbers.

The respective fields of the host/peer zone information 1111 will be described below. The target port WWPN of the physical storage device is a field for storing a WWPN of a target port to which the host is given permission to access.

One or more hosts accesses a volume via a target port. If there are a plurality of volumes corresponding to a target port as shown in FIGS. 5 and 6, a plurality of volumes and a plurality of hosts are associated to a target port.

The coupling mode field is a field for storing whether the coupling is a fabric (FC or FCoE switch coupling) coupling, a Point to Point (P2P) mode in which the target port is coupled directly with the host, or a FCoE MP (Fiber Channel over Ethernet Multipoint) in which the host and target port are coupled via the Ethernet (Registered Trademark). In the case of P2P or FCoE MP, the host and target port are directly coupled without a SAN switch, so that there is no need to set up a Zone. Therefore, the storage device does not need to perform a Peer Zone registration operation.

There is no need for the storage device administrator to set up this field in a FC. The physical storage device can perform automatic detection at the time of login to check whether the login is a Port Login or a Fabric Login. However, as for FCoE, it is not possible to automatically determine whether the coupling is a Fabric coupling or a P2P/FCoE MP coupling, so the storage device administrator must set and store values in advance whether the coupling is Fabric or FCoE P2P/MP. If the host coupling interface is a different SCSI transfer protocol such as an iSCSI (internet SCSI) or a SAS (Serial Attached SCSI) and the like, the transfer mode of such protocol is adopted. In the case of an iSCSI, there is no concept of fabric and SAN Zoning, so that there is no need to register a peer zone. If an access control of Ethernet (Registered Trademark) is performed, the settings for following the access control are performed in a similar function as the peer zone. In the case of a SAS, the zone management command set in an SAS is defined as a management protocol for setting the Zoning, such as a Configure Zone Permission Table SMP (Serial Management Protocol) function and the like, so the host/peer zone information 1111 can be applied by replacing these command sets from the Peer Zone of the FC.

The present embodiment mainly describes the FC and FCoE which are the mainstream of interface for coupling the storages and hosts, and a SCSI command set. The number of initiator ports refers to the number of the initiator ports given permission to access one or more volumes via a target port. The entries described hereafter are information stored in pairs corresponding to the number of initiator ports.

The host initiator port WWPN is a field for storing the host initiator port WWPN given the access permission to a target port of the corresponding entry. The host group information is a number associated with the table of FIG. 13A. Thereby, it becomes possible to recognize which volume the information is associated with.

Based on a host/peer zone information created by rearranging the host group information 1109 via a target port, the host group program 1108 issues an Add/Update Active Peer Zone CT (Common Transport) Request from the relevant target port to a Fabric Zone Server (CT_type=0x03) program of the Management Server port of the SAN switch (port ID is a Well Known Address 0xFFFFFA).

The SAN switch program updates the Active Zone Set with respect to the received Update Active Peer Zone CT Request, and updates and reflects the zone of the whole fabric. The Active Zone Set refers to the validated Zone information of the plurality of Zone sets of the SAN switch, and the Active Zone Set is stored in a volatile memory of the SAN switch.

For example, when the host initiator port number related to the target port is set to zero, such as when all the volumes are deleted, a Remove Active Peer Zone CT Request is issued to delete the relevant Peer Zone registered to the Active Zone Set of the SAN switch.

The commands related to Peer Zoning (Add/Update Active Peer Zone, Remove Active Peer Zone) are commands for changing the Active Zone Set information stored in the volatile memory of the switch. Therefore, when a status change of switch occurs (such as the failure of a switch), the setting information of the Peer Zone set from the target port of the storage device will be lost from the volatile memory.

Therefore, when the target port of the storage device detects the status change of the switch by receiving a message of link-down or RSCN (Register State Change Notification), and a get Active Peer Zone CT request is issued to a Management Server port of the SAN switch to acquire the information of the Peer Zone of the relevant target port from the SAN switch.

If the information of the Peer Zone of the target port stored in the physical storage device is inconsistent with the Peer Zone information acquired from the SAN switch via the Get Active Peer Zone CT Request, registration is performed again by the Add/Update Active Peer Zone CT Request. According to this procedure, the storage device acquires the information of the Peer Zone stored only in a volatile memory and compares the same with the host Peer Zone information 1111 that must be registered, and the storage device can check whether the necessary Zone is constantly registered in the SAN switch. The configuration of the Peer Zone of the SAN switch, the Zone Database and the Active Zone Set will be described later with reference to FIGS. 20 through 22.

FIG. 14B is a communication path/peer zone information 1102. The communication path/peer zone information 1102 is information necessary for automating on the storage device side the setting of the SAN Zoning ACL of the communication path 16 which is the communication path set up between initiator ports and target ports of storage devices.

When the number of physical storage devices is N, the number of Zones required to establish a mutual communication path as illustrated in FIG. 7 is n×(n−1), and in the case of a redundant network, the necessary number of zones is 2×n×(n−1). As the number of storage devices increases, the number is increased in the order of n^2 (n×n), so the management load of the storage administrator requesting registration to the SAN administrator increases as the number of storage devices increases.

The communication path/peer zone info nation 1102 is information required for automating the zone registration of the communication path 16. The communication path/peer zone information 1102 is managed via a communication path program 1101. The communication path/peer zone information 1102 is crated based on the communication path program 1101 sending a query to an Unzone Name Server included in the Management Server of the SAN switch and searching the communication port of the storage device, which differs from the creation of the host group information of FIG. 14A. The Unzone Name Server of the SAN switch will be described in detail in FIG. 20.

Now, the respective fields of the communication path/peer zone information 1102 will be described. However, the present table is very similar to the table of FIG. 14A, so the structure thereof will be described briefly.

The coupling mode field is a field showing whether the communication path port is a fabric coupling is a P2P coupling. When the mode field is P2P or FCoE MP, the storage devices are directly coupled, so that there is no need to set up the Zoning for the SAN switch. The field of initiator port number refers to the WWPN of the initiator port of the storage device and the number of lists storing the entries having united the physical storage devices.

The field of storage initiator port WWPN is a field for storing the WWPN of the initiator port given access permission as a communication path with the counterpart storage device. The field of physical storage device ID is a field for identifying the physical storage device that the initiator port WWPN belongs to. The storage device ID utilizes the ID in the same namespace as the physical storage device ID of FIG. 12A.

FIG. 15A is a TPG (Target Port Group) information 1113. The TPG information 1113 is information stored in each volume. The TPG information 1113 shares the same information among storage devices. The TPG information 1113 is used by the multipath program 1112.

The TPG information has one or more RTPI (Relative Target Port Identifier) which is a target port identification number, and has one AAS (Asynchronous Access State), as described with reference to FIG. 8. The target port of the storage device can control the IO destination issued by the multipath software of the host by changing the AAS with respect to a plurality of target ports included in the TPG. Further, the host can change the status of usability of a target port of a storage by changing the AAS of the TPG of the storage device. The former is an implicit ALUA, and the latter mode in which the host sets up the AAS status is called an explicit ALUA.

Now, we will describe the respective fields of the TPG information 1113. The TPG information 1113 includes a number of AAS and RTPI corresponding to each entry of the TPG number. It also includes a list of pairs of RTPI and target port WWPN corresponding to the number of RTPI.

Now, when there are a plurality of RTPI included in a TPG and forms a group, the AAS statuses of a plurality of target ports must be changed simultaneously. In the present embodiment, status management of the AAS is performed for each target port including the monitoring of the port usage load status when failure occurs to the target port. Therefore, the number of entries of the RTPI that a TPG has is referred to as 1. Although not shown in FIG. 15A, it is possible to store one or more RTPI entries with respect to a TPG.

A TPG number refers to an entry identification number of a Target Port Group. A port status (AAS) is retained in this entry. When a plurality of RTPI are included, the AAS of a plurality of target ports is changed collectively as a group.

An AAS is a field for retaining the port status in an ALUA. The AAS is selected from the following states: an Active/Optimized (Act/Opt) state, an Active/Non-optimized (Act/Non) state, a Standby state, an Unavailable state, a Logical Block Dependent (LBD) state, an Offline state or a Transitioning Between state (Transition).

Now, the details of the respective states of the AAS will be described. The Act/Opt state indicates that the AAS is in a state where the performance is optimized and all SCSI commands are issuable.

The Act/Non state indicates that all SCSI commands are issuable, but compared to the Act/Opt state, the performance is not optimized. When a plurality of TPGs can be selected and accessed via multipath to the same volume and when the Act/Non state and the Act/Opt state exist in a mixture, the host multipath software issues a SCSI IO command prioritizing the Act/Opt state. If failure occurs leaving only the TPG in Act/Non state, the Act/Non TPG is selected and a SCSI IO is issued. If a plurality of TPGs of the same state exist, it is possible to issue the IO to the TPG with an optimized performance using a performance measurement information monitored by the host multipath software, such as a port performance or a delay time of IO response, or in a round-robin fashion.

During the Standby state and the Unavailable state, only limited SCSI commands for management can be issued. The LBD state shows that the target port of the IO destination differs in UDS granularity. When the AAS is set to UDS, the host multipath software refers to the Referral information and determines a target port to be set as the IO destination. The Offline state is a state where no SCSI commands can be issued. The Transition state indicates that the transition AAS is on-going from a prior state which is not a transition state to a different state which is not a transition state.

An RTPI entry number is a field for retaining the entry number of RTPI included in the relevant TPG entry. An RTPI is a field for retaining the ID associating the target port WWPN to a relative number. The RTPI is an index number having shortened the WWPN, and should not be overlapped with the RTPI of other target ports. Further, since the storage device is formed astride physical storage devices, the multipath program 1112 assigns a unique RTPI within the system of FIG. 1 to the target port WWPN of the physical storage device so that the RTPI is not overlapped with other storage devices. The WWPN of the storage target port is a WWPN of a storage device corresponding to the relative number of the RTPI.

FIG. 15B shows a Referral information 1114. The Referral information 1114 is information stored for each distributed virtual volume. The Referral information 1114 shares the same information among storage devices, and shares an arrangement information of the UDS of the distributed virtual volume. The information should be shared among physical storage devices to which the partial volumes constituting the distributed virtual volume belong. However, it is not necessary to share the information with unrelated physical storage devices that do not constitute the distributed virtual volume. The Referral information 1114 is information used for managing the corresponding relationship between the UDS and the path information of the distributed virtual volumes and for appropriately managing the target port of the IO destination in UDS granularity via the multipath software of the host.

Now, we will describe the respective fields of the Referral information 1114. An internal LU number is a field for retaining the internal LU number of the volume having an attribute of a distributed virtual volume. The internal LU number corresponds to the internal LU number of FIG. 12A. An internal LU number of a partial volume is a field for retaining the internal LU number of the partial volume. It corresponds to the internal LU number of the partial volume of FIG. 12B.

A start/end LBA (Logical Block Address) is a field for retaining a set of a start LBA and an end LBA of the UDS. For data consistency, the start and end segments should not overlap. This is because the physical storage device storing the newest data could not be recognized if the write data in an overlapped LBA range is distributed in a plurality of physical storage devices.

A TPG number is a field for retaining the number of lists of the TPG/AAS pairs as described in detail later. A TPG/AAS pair is a field for retaining the TPG number and the AAS corresponding to the TPG. The AAS shows states other than Standby, Logical Block Dependent and Offline states (which are Active/Optimized, Active/Non-Optimized, Unavailable, and Transitioning between states). The basis of the host multipath software selecting an IO request destination TPG when there are two or more TPGs corresponding to a UDS is as described earlier.

It is possible to switch the target ports within the TPG by separating the TPG information 1113 and the Referral information 1114. In other words, by rewriting the RTPI and WWPN pair in the TPG information 1113 denoting the TPG number and notifying the same to the host without having to update the Referral information 1114 which is an extremely large table information, it becomes possible to collectively change only the entity of the WWPN of the target port denoted by the TPG number by merely updating only the information of the TPG information 1113 having a small capacity without having to re-notify the table set via the Referral information 1114 to the host.

Thus, when failure occurs to the target port, fail-over to another target port within the same physical device can be performed. At this time, by updating the host group information, changing the related host/peer zone information and registering the Zone to the SAN, it becomes possible to maintain a redundant configuration by performing automatic fail-over without any care from the administrator when failure occurs to the target port, by switching the target port to another target port coupled to the same SAN, and when it is coupled to the SAN, registering the setting of Zoning via Peer Zone. The administrator can replace the port module (replacement component corresponding to Host Bust Adapter) of the storage device and rolling the program within the storage device back to the host/peer zone information and the TPG information prior to failure, according to which the device can be returned to the state before failure occurs and fail-over is performed.

Further, by using the communication path between storage devices, when failure occurs to all the ports coupled to a specific physical storage device, as long as a target port coupled to a host of another physical device exists, it is possible to perform fail-over operation of the port to the other physical storage device and to access the partial volume of the physical storage device in which failure has occurred through a communication path between storage devices, by which the host IO to the distributed virtual volume can be continued.

FIGS. 16A and 16B show the TPG information and the Referral information. The differences with the information of FIGS. 15A and 15B will now be described. The TPG information and the Referral information of FIGS. 16A and 16B adopt a structure in which the TPG and the Referral are managed in granularity of host-volume pairs having permission for access. A field of a host group number is added with respect to FIGS. 15A and 15B to notify difference information to each host in volume granularity.

According to the structure of FIGS. 16A and 16B where a plurality of volumes share a target port by a host group information, the AAS state of the target port can be retained in different states for each volume.

For example, if a TPG A and a TPG B including the same target port WWPN correspond to different volumes, it is possible to have the state of AAS A of TPG A of volume A set to Act/Opt state and have the state of AAS B of TPG B of volume B set to LBD state, which are in different states. The reason for this is because by splitting the namespace of TPG and Referral via host group information, it becomes possible to have the entity volume and the distributed virtual volume exist together with respect to a target port.

According to the arrangement of FIGS. 16A and 16B, if a plurality of hosts share a volume, it becomes possible to respond different TPG information and Referral information to different hosts. Thereby, it becomes possible to correspond to the difference in attribute of host OS information or load distribution of target ports. The details of this processing will be described later with reference to FIG. 31.

The correspondence between the example of table information stored in the storage memory of the storage device as described with reference to FIGS. 11 through 16B and the device configuration example will be described later with reference to FIGS. 26 through 31.

Figure 17:
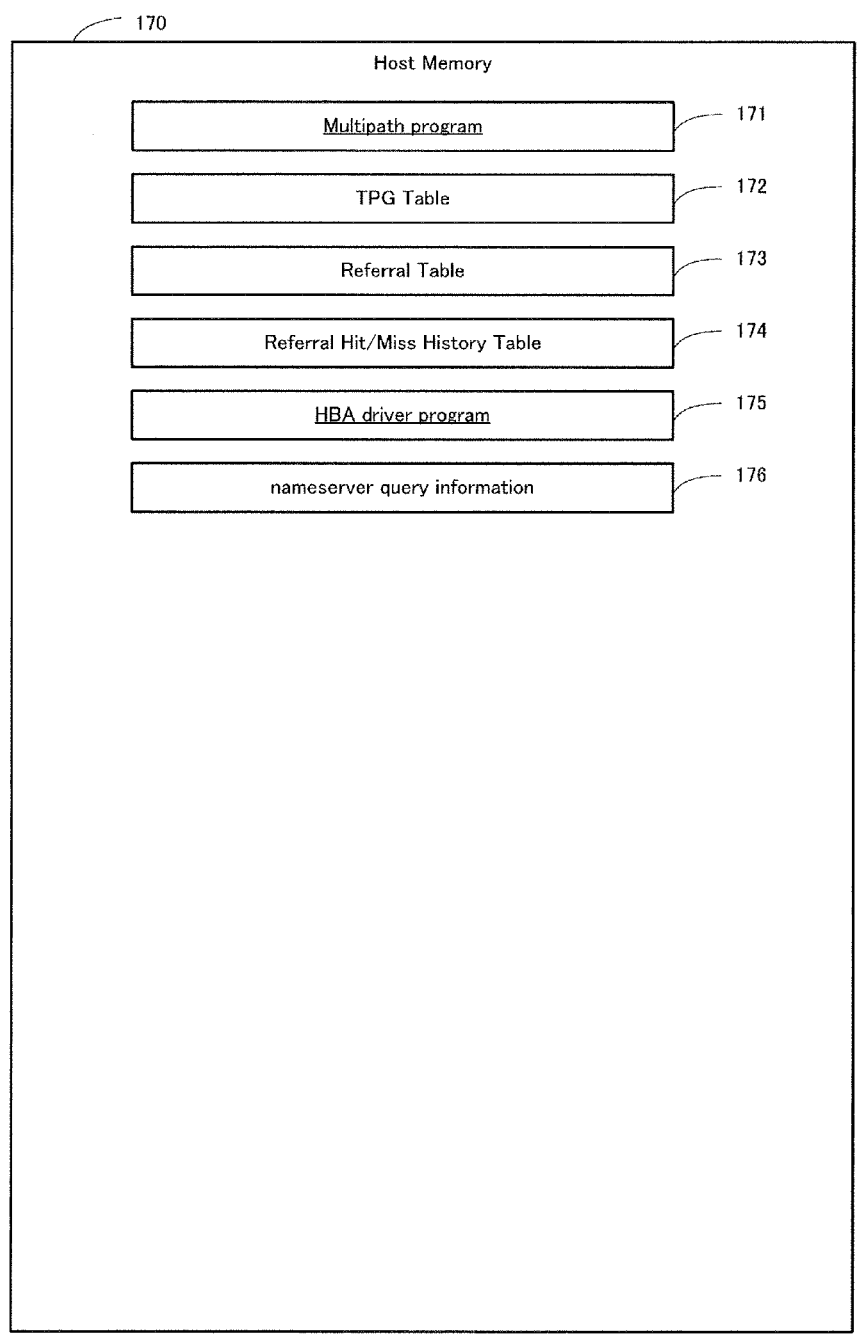
FIG. 17 is a block diagram illustrating the information in a memory of the host.

FIG. 17 is a view showing the program and table information stored within a host memory of the host system. FIG. 18A illustrates a host TPG information. Now, the respective fields of the host TPG information 172 will be described. Volumes accessible via the host group setting of the storage device are shown for each target port that the host initiator port is capable of accessing.

An LU number is the number of LUs that the host initiator port has acquired via a SCSI Report LUN command. An LU number is the list of LU numbers that the host initiator port has acquired via the SCSI Report LUN command. The LU number recognized by the host is the host LU number within the host group information of the storage device. An internal LU number of the storage device is a number for managing the real volume within the storage device, which is not visible from the host. Since a initiator port manages a plurality of volumes, the fields described hereafter are set for each LU.

A Vender/Device/LU Name field is the information related to the SCSI Inquiry command (Standard Inquiry information, and 0x83 Device Identifier VPD page) issued with respect to the LU number. The host multipath software determines whether the identifier (ASCII code) of the Vender/Device stored in the host multipath software corresponds so as to determine whether to perform multipath operation or not. An LU Name is a name identifier for confirming that that host multipath program is of the same volume. When this name corresponds, it is determined that the same volume is involved, and it is determined that the target port forms a multipath.

An RTPI is a field for retaining the identification number of the target port. A TPG is a field for retaining the TPG number to which the RTPI belongs. An AAS is a field for retaining the AAS corresponding to the TPG number. The RTPI and TPG number are each information acquired for each target port by the SCSI Inquiry command (0x83 Device Identifier VPD page) issued to the LU number. Therefore, the host multipath program issues a SCSI Report LUN command and a SCSI Inquiry command with respect to all recognizable paths for the initial volume identification. Since the target port differs, Different Device Identifier VPD page information can be acquired from each of the target ports.

The AAS information stores the current port access status corresponding to the TPG number. A list of one or more TPG structures that the corresponding volume has is acquired via the SCSI Report Target Port Group (Report TPG) command issued to the volume. The TPG structure stores the list of one or more RTPIs constituting the TPG and the TPG and AAS pair at the time the data is acquired.

An ALUA Support is a field for retaining an ALUA and Referral support mode by the volume of the corresponding LU number. An ALUA support flag is a flag for acquiring whether support is enabled or not of an Explicit ALUA and an Implicit ALUA acquired via the TPGS field of the SCSI Inquiry command (Standard Inquiry information). An R_SUP is an R_SUPPORT (Referral Support) flag of the SCSI Inquiry command (0x86 Extended VPD page information).

In addition, the host multipath program sets and refers to a D_SENSE flag of a Control Mode Page (page code 0x0A) via a SCSI Mode Sense/Mode Select command. The D_SENSE flag is a set bit for validating the SCSI response of the Referral Sense Data (D_SENSE=1) when the Referral supports the corresponding volume (R_SUPPORT=1).

FIG. 18B is a view illustrating a Referral information 173 of the host. In FIG. 18A, the host Referral information of the corresponding LU becomes effective when the volume is supported by the Referral and the AAS of the TPG is LBD. The Referral information acquired by the host multipath software issuing a SCSI Report Referral command to the corresponding LU is stored in the Referral information 173 of the host.

Upon receiving the SCSI Report Referral command, the physical storage device uses the Referral information of the storage device to create a response information regarding the SCSI Report Referral command and returns the same to the host. At this time, the physical storage device must return without fail every UDS of all the partial volumes (including the partial volume stored in other physical storages) constituting the distributed virtual volume. In other words, the storage device must return a list of UDS similar to the range of the end LBA acquired by the SCSI Read Capacity command.

Now, each field of the host Referral information 173 will be described. An LU number is a field for storing the host LU number in a distributed virtual volume of the storage device. A UDS start/end LBA is a field for storing the start and end LBA of the UDS. A TPG number refers to the field for storing the number of lists of the TPG/AAS pair. A TPG/AAS refers to the field for storing the TPG number and the AAS of the TPG structure within the UDS.

These information are acquired by the multipath program of the host issuing a SCSI Report Referral command to the relevant volume, and stored in the Referral information 173 of the host.

FIG. 19A is a view showing a Referral Hit/Miss information 174 of the host. The multipath program of the host stores the Referral information acquired via the SCSI Report Referral command to the host Referral information 173 of FIG. 18B. In the Referral information, in order for the storage device to cut down the capacity of the number of entries of the UDS in the Referral information, a number that differs from the actually accessed TPG may be associated. In that case, the host issues a SCSI IO command to a TPG that is not the associated storage device.

When a command that is not related to the associated storage device is received, the storage device returns as a SCSI Response an inspect Referral Sense Descriptor by an ASC/ASCQ (Additional Sense Key/Qualifier) of a Check Condition (status=0x2)/Aborted Command (0xB). If the aforementioned D_SENSE flag is 1, the Referral information is stored in a Sense Data of the SCSI Response. Based on the Referral Sense Data, it becomes possible to re-issue the SCSI IO command issued to a TPG that is not the storage device in charge to a correct TPG.

Therefore, the host multipath program retains the history information of Hit/Miss when a TPG that is not the storage device in charge is selected when the SCSI IO is issued, using a Referral Hit/Miss information 174 of the host.

FIG. 19A is similar to FIG. 18B, so only the different fields are described below. The host multipath software retains the history of Hit/Miss of the issued IO for every TPG of the UDS. The start and end LBA of the UDS does not have to be the same as the start and end LBA of the UDS acquired from the storage device in FIG. 18B. The host multipath program creates an entry of a start/end LBA related to the IO having missed the Referral Sense Data response if necessary, and stores the TPG number of the response information of the Referral Sense Data with respect to the SCSI IO command. Further, the TPG having missed the issued IO is set to miss.

Now, the UDS does not need to have the start/end LBA correspond with the UDS of the information acquired from the storage device in FIG. 19A. Further, according to FIG.

18B, the history of Hit/Miss of the TPG is all stored, but it is also possible to cut down the entry by retaining only the hit information. Based on this information storage method, compared to the Referral information described with reference to FIG. 18B, only the UDS of the portion having a high IO issue frequency is stored partially in the Referral Hit/Miss information 174 of the host.

Subsequently, the host multipath program of the host refers to the Referral Hit/Miss information 174 of the host to select a TPG having a hit information and issues the IO. If there is no corresponding TPG in the Referral Hit/Miss information 174 of the host, the host multipath program refers to the Referral information 173 of FIG. 18B.

Thereby, the multipath software of the host can cut down the frequency in which IO miss occurs by the check response of the Referral Sense Data. Further, it can cut down the capacity of the host Referral information 173 returned to the host via the SCSI Report Referral command responded from the storage device to the host.

FIG. 19B shows a name server query information 176 in a system configuration coupled to a SAN. The information is acquired by sending a query to a name server of the SAN from an HBA driver program 175 of the host. The name server query information 176 retains the coupling relationship between the respective physical storage devices and the ports. This coupling information is formed automatically when creating a distributed virtual volume by creating a zone from a target port of each physical storage device from a storage device. The details of this process will be described in detail later. The corresponding relationship of the example of a table information stored in the host memory of the host system described with reference to FIGS. 17 through 19B and the device configuration example will be described in detail later.

Figure 20:
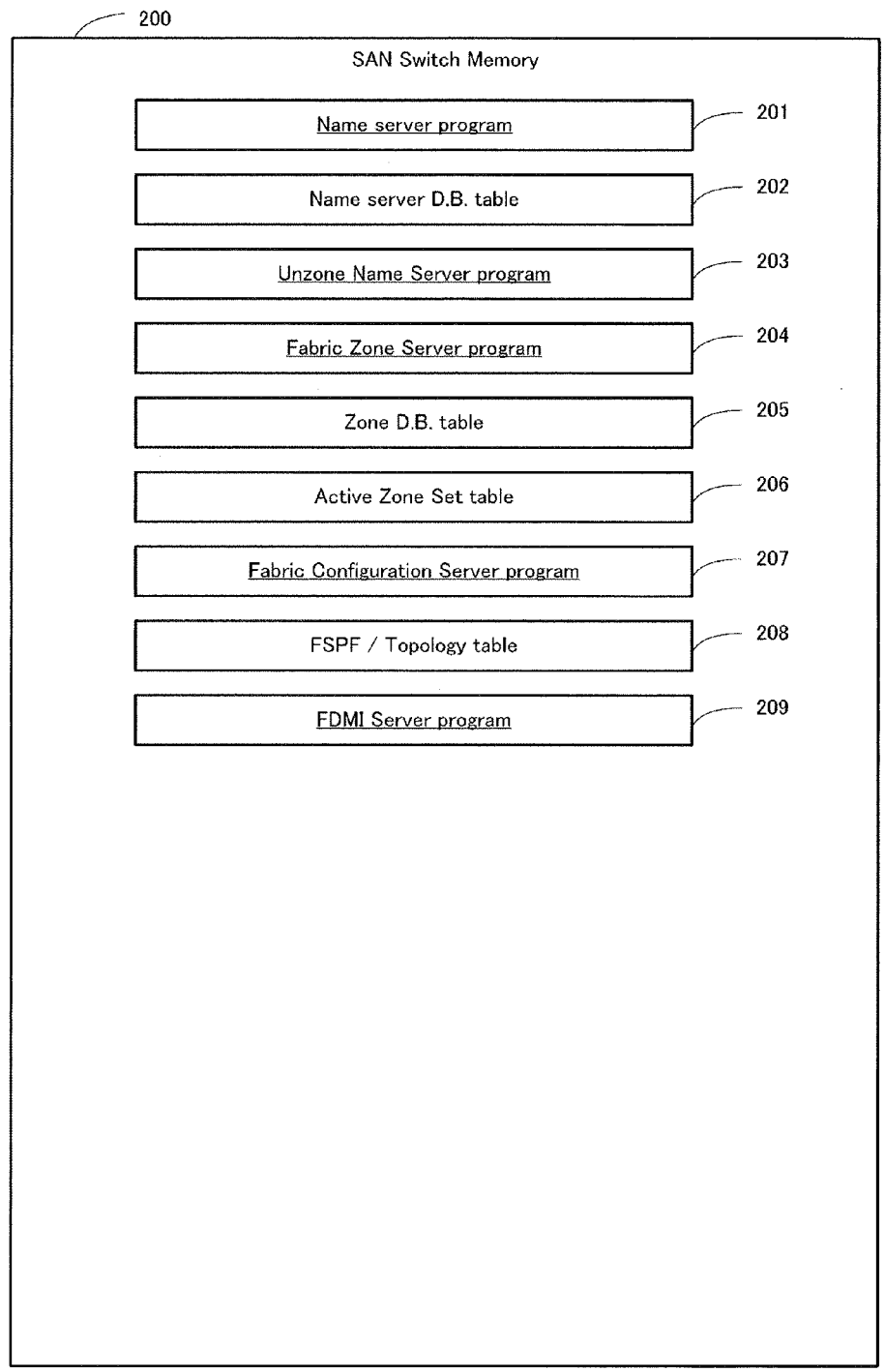
FIG. 20 is a block diagram showing the information in a memory of the SAN switch.

FIG. 20 is a view showing the programs and tables stored in a memory of a SAN switch device constituting a SAN. FIG. 21A shows a name server database information 202 of the SAN switch.

When a SAN is included in the system configuration, the host system and the physical storage device performs login to a Fabric Port (F_Port) of the SAN. An N_Port_ID assigned at this time retains the port WWPN of the login source, the port type of the login source (support protocol and type of initiator and target), the name of the storage device, and the host information stored in the host HBA (the host name, the OS name, the HBA vender, the firmware version and so on).

FIG. 21B shows a zone database information 205 of the SAN switch. This information is created when the SAN administrator registers a zone to a SAN switch via the management terminal.

The zone set has a plurality of zones. The name of a zone set must be in ASCII codes and the name of the zone set must not overlap with other names. Each zone has a zone name. The zone name must be in ASCII codes and the zone name must not overlap with other names. The zone includes fields of a number of ports having an access permission included in the zone, an identifier of the port having access permission (in the present case, WWPN) and a zone attribute (in the drawing, WWPN Zoning). The zone attribute can include other attributes determined by standard or a Peer Zone attribute, but the detailed description thereof is omitted.

FIG. 22 shows information on an active zone set in a SAN switch. An active zone set is a list of all active zones including the validated zone set information and the entries of the Peer Zone registered from the target port out of the zone database information 205 of FIG. 21B. The zones registered in this list are distributed to all SAN switches, set thereto and enabled communication.

In the case of a Peer Zone, the zone name can be set so that the target port is not overlapped. If the zone name is overlapped with other zone names, the SAN switch returns an error response with respect to the Peer Zone registration request from the target port. In that case, the target port avoids overlap of the Zone name by registering the zone name as a value having converted the target port WWPN to ASCII codes.

When a plurality of SAN switches are coupled to the SAN, each of the name server information, the zone information and the active zone set information is distributed and merged to each SAN switch via the name server program and the zone server program, and all the SAN switches retain the same information. Therefore, the zone name and the like must be unique within the whole SAN.

An unzone name server program is a name server program capable of sending a query with respect to all information registered in the name server information regardless of the zone (access permission). Prior to creating a zone via the peer zone, the target port of the storage device sends a query to collect the name server information. The details will be described later with reference to FIGS. 32 through 34. The corresponding relationship between the example of a table information stored in the memory of the SAN switch described with reference to FIGS. 20 through 22 and the example of the device configuration will be described later.

Figure 23:
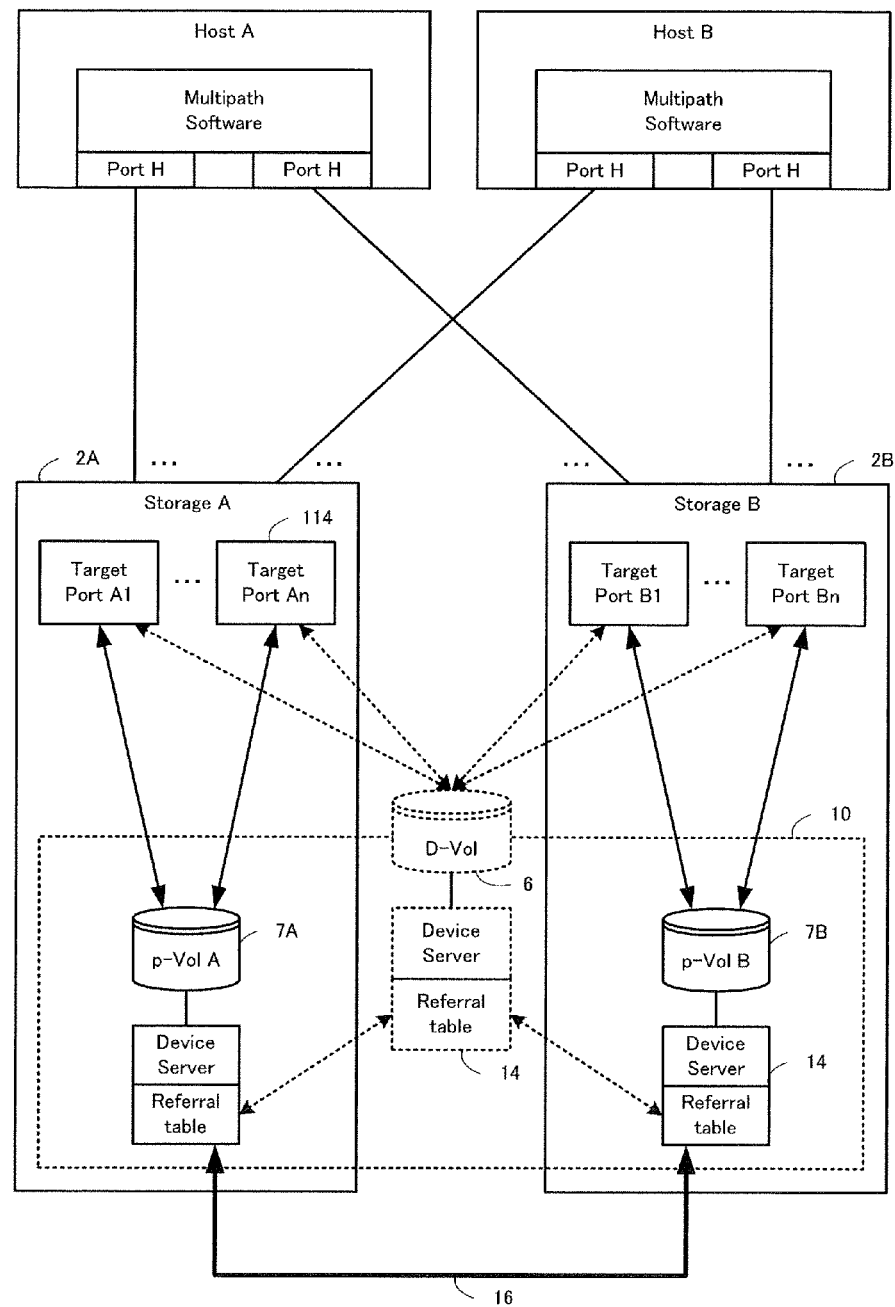
FIG. 23 is a block diagram illustrating one example of configuration of a virtual storage device.
Figure 24:
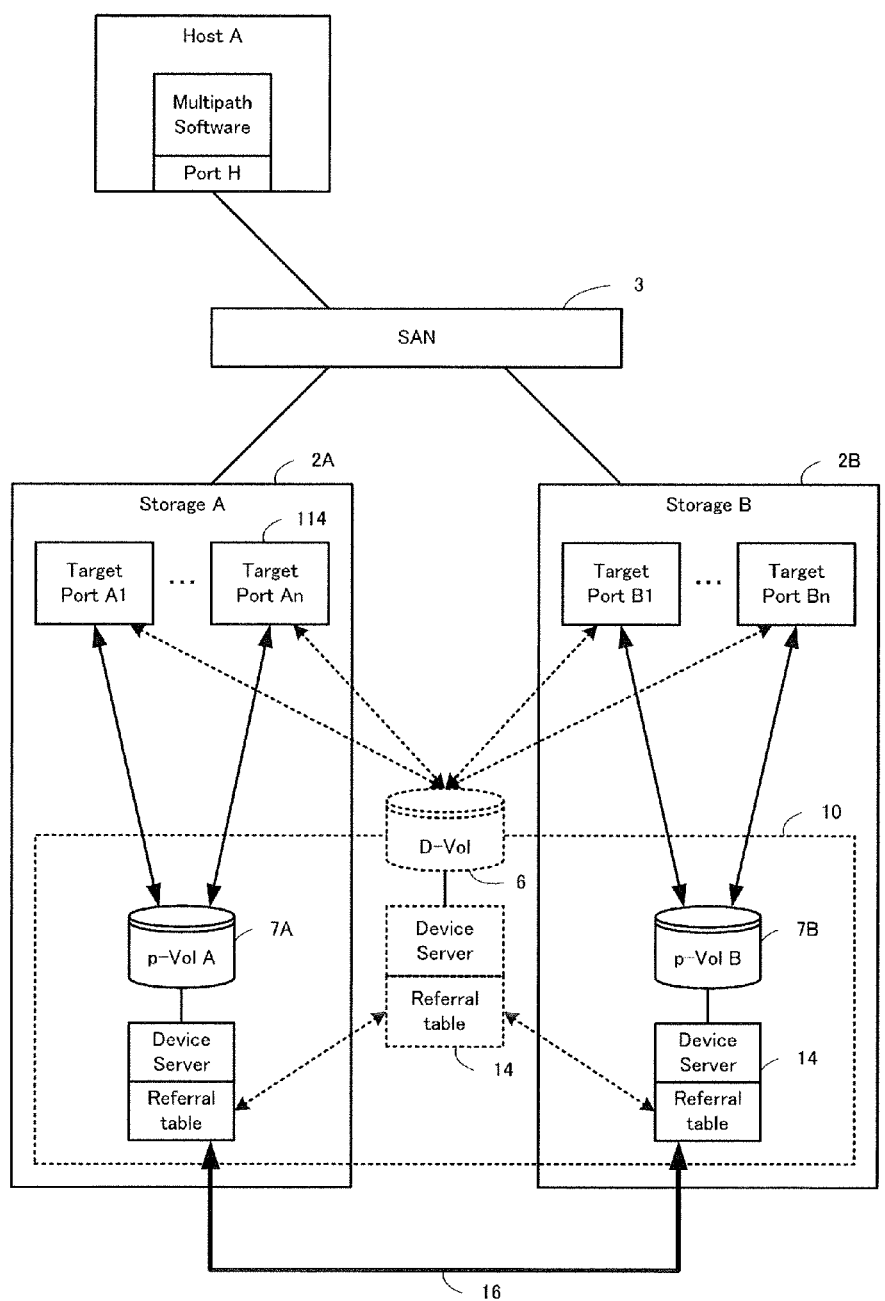
FIG. 24 is a block diagram illustrating one example of configuration of the virtual storage device.
Figure 25:
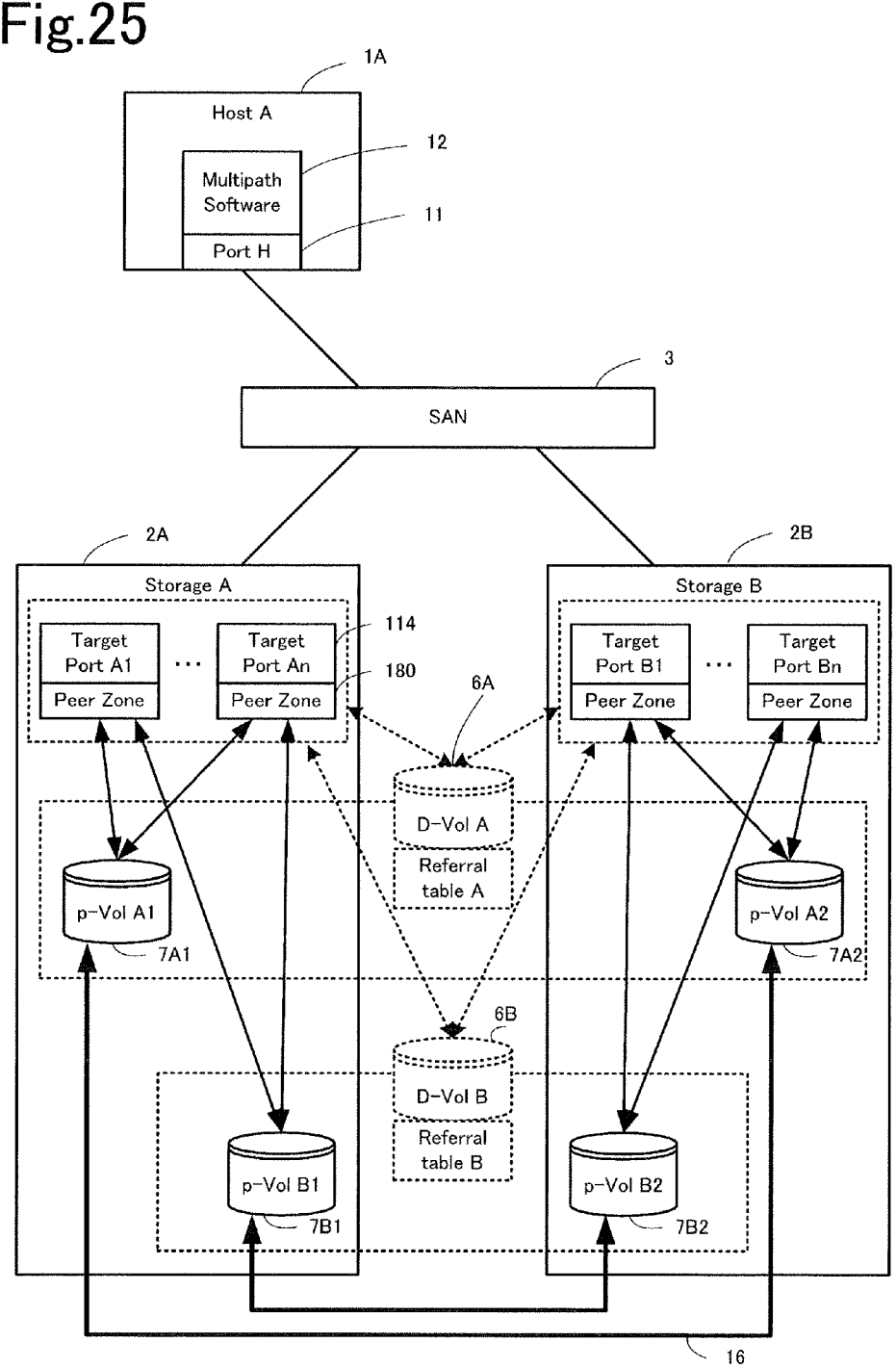
FIG. 25 is a block diagram illustrating one example of configuration of the virtual storage device.

FIGS. 23 through 25 illustrate examples of configuration of a computer system constituting the distributed virtual volume. FIG. 23 is an example of a system configuration in which the host and storage device are directly coupled and storage devices are also mutually directly coupled to establish a communication path 16. The distributed virtual volume 6 is formed astride a plurality of storage devices. The distributed virtual volume 6 stores the Referral information. Physically, the partial volume 7 stores the same information.

Upon accessing the distributed virtual volume 6, the host 1 acquires the Referral information in advance. The Referral information is a table storing a plurality of pairs associating the segments (UDS) and Target Port Groups, and the information is located in distribute d manner in the storage device 2. The host 1 is capable of accessing the partial volume 7A via the target port of the storage device 2A.

FIG. 24 illustrates a system configuration in which the host and the storage device or the storage devices are mutually coupled via a SAN. FIG. 25 illustrates a system configuration in which the host and the storage device or the storage devices are mutually coupled via a SAN and forming a plurality of distributed virtual volumes.

Figure 26:
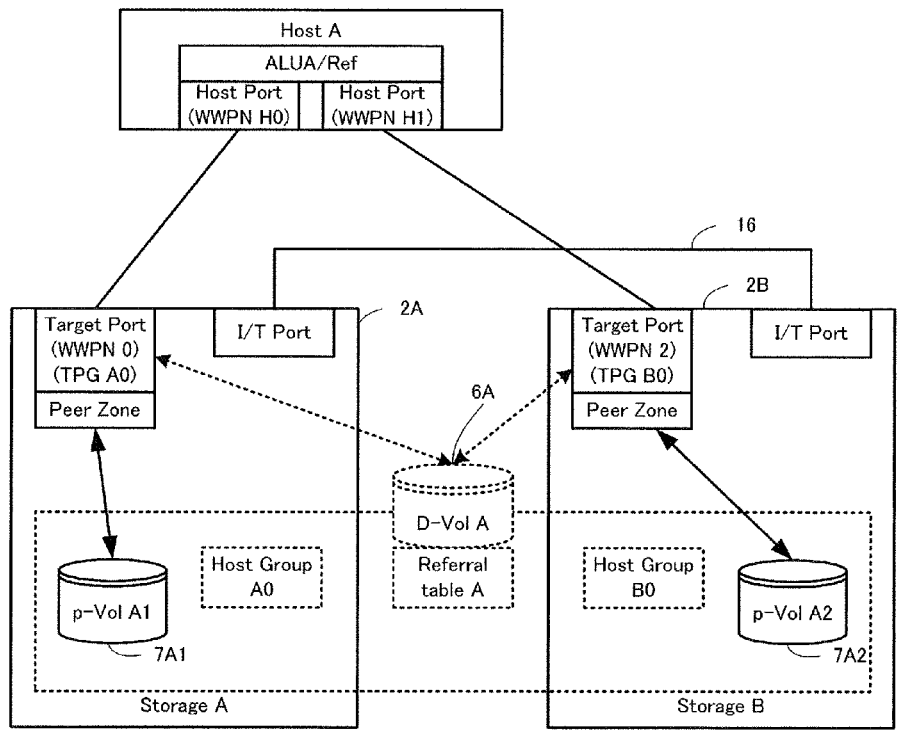
FIG. 26 is a block diagram illustrating one example of configuration of the virtual storage device and management information.

FIGS. 26 through 31 illustrate configurations of a computer system constituting a distributed virtual volume and a portion of the information stored in each device. FIG. 26 is a drawing showing a system configuration in which the host and the storage devices are directly coupled and the storage devices are also mutually directly coupled to establish a communication path 16, and a portion of the management information.

It is assumed that the storage device has already established a communication path 16 between storage devices. In the following drawings, the communication path 16 is omitted from the drawing. The communication path 16 can be an independent network or can be directly connected. Further, the communication path 16 can be shared with a network coupled to the host. The initiator/target port of the communication path 16 can be mutually independent. The target port coupled to the host and the initiator/target port of the communication path can be shared as a SCSI Port. These combinations can be appropriately configured within the range of assembly as described with reference to FIGS. 5 through 7.

When the storage administrator creates distributed virtual volume A, it performs a host group setting for permitting access of the host A. Actually, the virtual storage device administrator registers the host initiator ports H0 and H1 as host group information of the distributed virtual volume A. In a procedure described later, the virtual storage device selects storage device A or B for defining the distributed virtual volume according to the performance request. The virtual storage device selects usable target ports 0 and 2 via a procedure described later. In this case, each storage device searches a target port capable of reaching the initiator ports H0 and H1 of host A. Further, the administrator of the device can explicitly designate the physical storage device and the target port to be used.

As for the host group information (initiator ports H0 and H1) registered to the virtual storage devices, the program within the storage device creates a host group information independently as a setting required for the two physical storage device, and generates a host/peer zone information required for each target port. However, in the configuration illustrated in FIG. 26, since there is no SAN (P2P coupling mode), no peer zone information is generated, and the host port field is set to N/A. Upon creating a distributed virtual volume, the program of the storage device creates a TPG information and a Referral information. The details of the procedure for creating a volume will be described in detail later with respect to FIG. 35.

The host sequentially issues SCSI commands (Report LUN, Inquiry, Report TPG and Report Referral) when preparation for the communication with the storage device and volume creation is completed. Thereby, the host multipath software forms a TPG information and a host Referral information. The details of the procedure for volume creation will be described in detail later with reference to FIG. 36.

Figure 27:
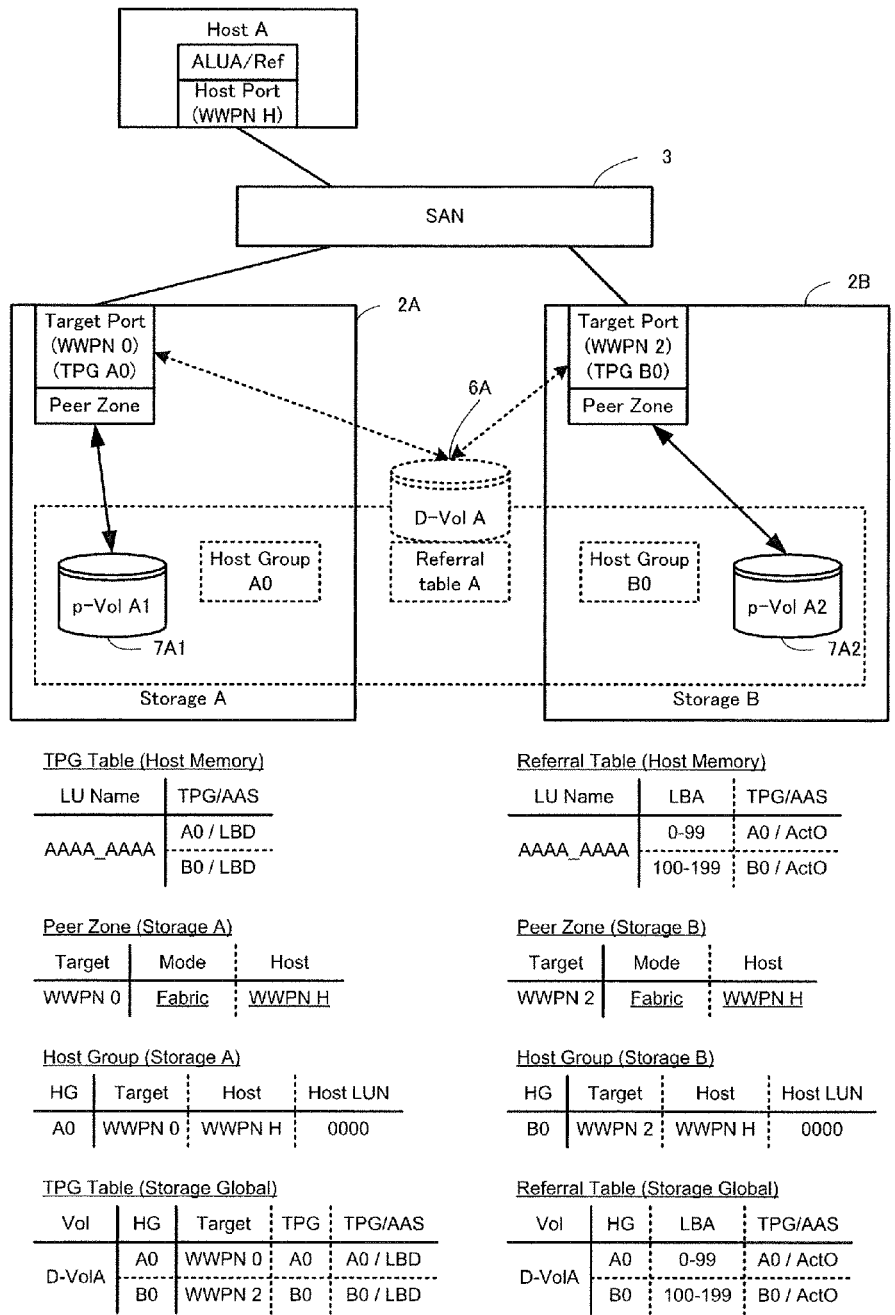
FIG. 27 is a block diagram illustrating one example of configuration of the virtual storage device and management information.

FIG. 27 is a view showing a system configuration in which the host and the storage devices or the storage devices are mutually coupled via a SAN, and a portion of the management information. The differences of the present drawing and FIG. 26 will be described. The coupling mode of the host/peer zone information is Fabric. The program of each physical storage device creates the host/peer zone information based on the host group information.

The storage administrator creates a distributed virtual volume and sets up a host group. The target ports of each physical storage device constituting the virtual storage device perform registration of access permission using a Peer Zone to the SAN. Upon receiving change of setting of the peer zone, the program within the SAN switch updates the access permission of the SAN, and enables communication between the host and the storage device. The host performs a procedure of volume recognition with respect to the storage device.

FIG. 28 is a view showing a system configuration in which the host and the storage devices or the storage devices are mutually coupled via a SAN, and a portion of the management information. The differences between the present drawing and FIG. 27 are explained. FIG. 28 omits the description on the partial volume and the Referral information, but the two distributed virtual volumes adopt the configuration of a partial volume similar to FIG. 27. The physical storage device sets two distributed virtual volumes A and B with respect to a target port using the host group setting.

Regarding distributed virtual volume B, the storage administrator instructs volume creation and sets up an access permission of host B to the host group. The virtual storage device converts the setting of the distributed virtual volumes created in the virtual storage devices into two physical storage device host groups X0 and Y0. Further, in response to a volume creation request from the administrator, the virtual storage device distributes the TPG information and the Referral information to the two physical storage devices via the communication path 16 (omitted in FIG. 28).

Each physical storage device updates the host/peer zone information based on the distributed host group information, respectively sets up access permissions with respect to the host B, and updates the Zoning ACL of the SAN in the Peer Zone. Thereby, the access permission of host B and distributed virtual volume B is added to the access permission of host A and distributed virtual volume A. When an instruction is received from the management terminal, the storage administrator sees a virtual storage device, and there is no need to repeatedly perform the settings of a plurality of physical storage devices.

According to the information storage method, a plurality of distributed virtual volumes can share the target ports of each physical storage device. Further, it is possible to set up access permissions of distributed virtual volumes independently with respect to a plurality of hosts. According to this arrangement, the states of the AAS of the TPG information and the AAS of the Referral information stored in the respective distributed virtual volumes can be set independently without depending on the information of the other distributed virtual volume.

Figure 29:
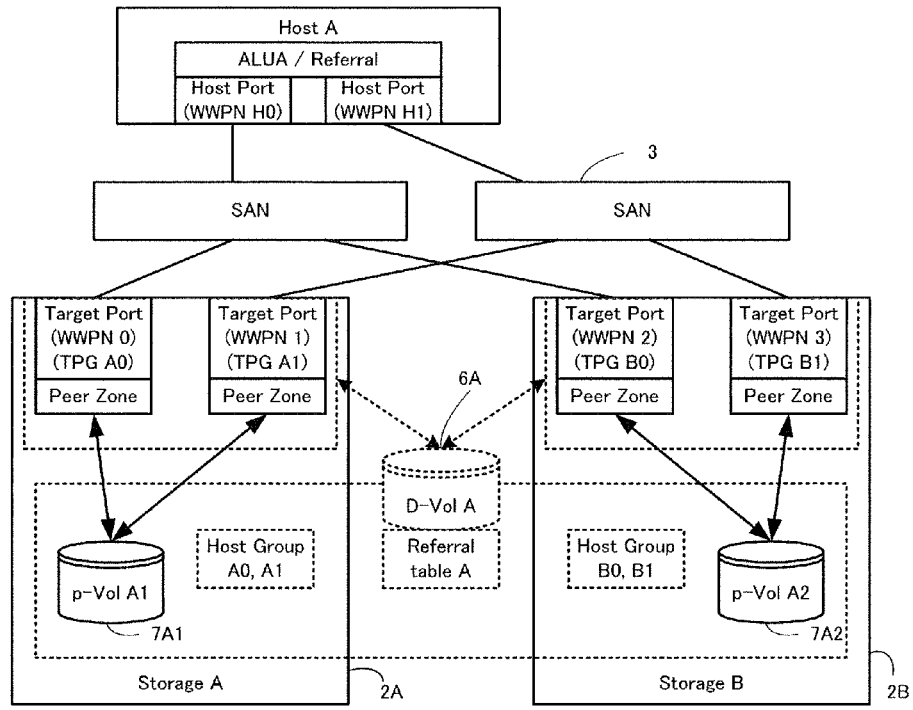
FIG. 29 is a block diagram illustrating one example of configuration of the virtual storage device and management information.

FIG. 29 is a drawing illustrating a system configuration in which a host and storage devices or storage devices are mutually coupled via a redundant SAN, and a portion of the management information. The differences between the present drawing and FIG. 27 are explained. The configuration of each information in a case where two or more target ports are set up with respect to a physical storage device will be described.

The storage administrator creates a distributed virtual volume A, sets up a host group of the virtual storage device, and provides an access permission of host ports H0 and H1 to a distributed virtual volume A. The virtual storage device provides to the host port H0 an access permission of target ports 0 and 2 of the respective physical storage devices and to the host port H1 an access permission of target ports 1 and 3 of the respective physical storage devices.

The virtual storage device converts the setting of the distributed virtual volume created in the virtual storage device to host groups A0, A1, B0 and B1 of the two physical storage devices. Further, based on the volume creation request of the administrator, the virtual storage device distributes the TPG information and the Referral information to the two physical storage devices using a communication path 16 (not shown in FIG. 29).

Each physical storage device updates the host/peer zone information based on the distributed host group information, respectively sets up access permissions for host ports H0 and H1, and updates the Zoning ACL of the SAN in the Peer Zone. Thereby, two paths are set in the respective UDS as access permission of host A and distributed virtual volume A. This process enables to save the work related to setting a redundant SAN structure.

Figure 30:
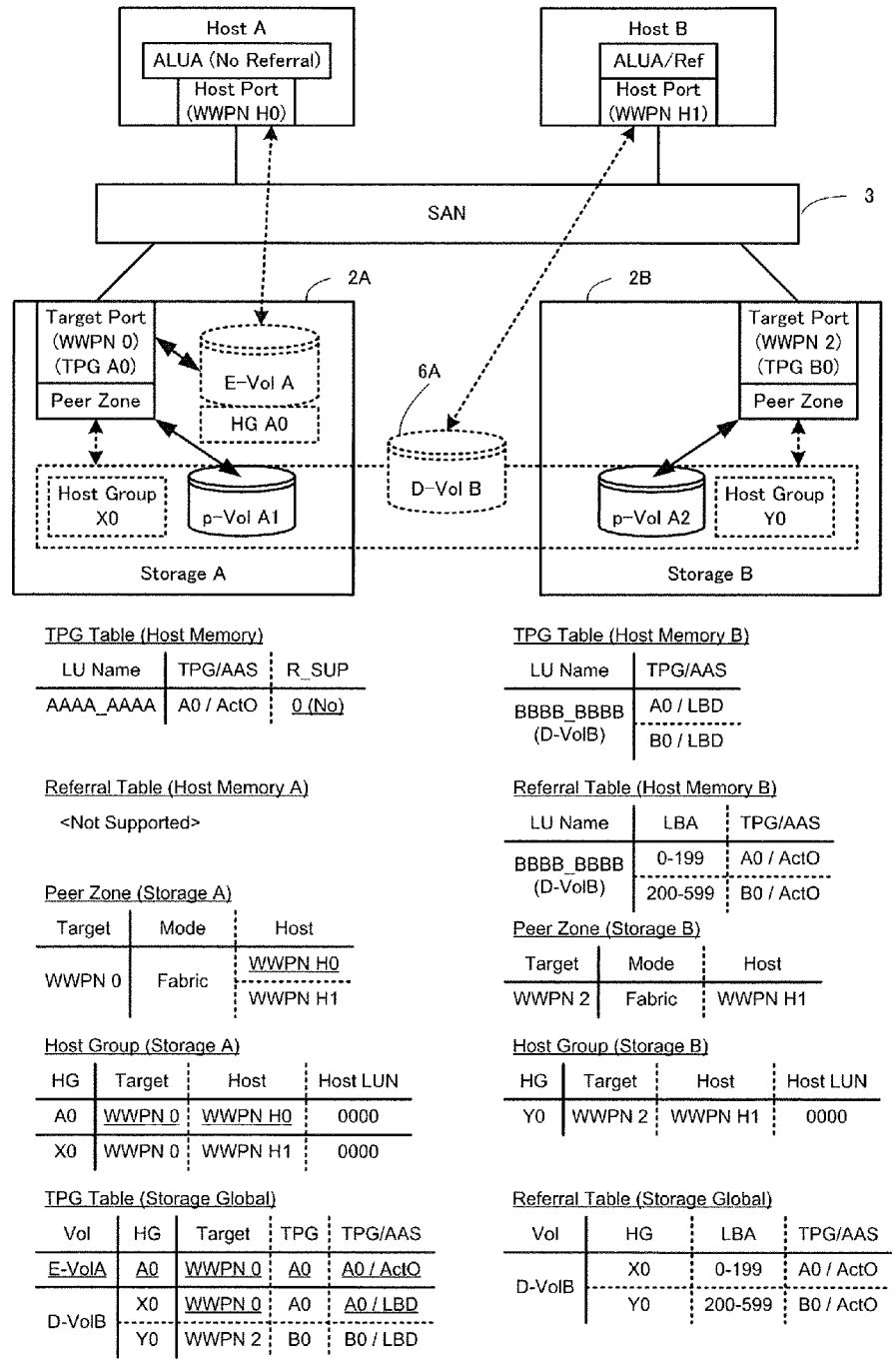
FIG. 30 is a block diagram illustrating one example of configuration of the virtual storage device and management information.

FIG. 30 shows a system configuration in which the host and the storage devices or the storage devices are mutually coupled via a SAN, and a portion of the management information. The differences of the present invention and FIG. 28 are explained. The physical storage device A sets up an entity volume A and a distributed virtual volume B with respect to a target port (WWPNO).

The storage administrator instructs volume creation with respect to entity volume A, and sets up a WWPN H0 to the host group as an access permission of host A. The virtual storage device converts the setting of the entity volume created in the virtual storage device to a host group A0 of the physical storage device A, and distributes the same to the physical storage device A. Since the entity volume A does not require Referral information, the physical storage device A will not register the Referral information. The physical storage device A registers the information of entity volume A of physical storage device A to the TPG information.

Each physical storage device updates the host/peer zone information based on the distributed host group information, respectively sets up access permissions with respect to the host B, and updates the Zoning ACL of the SAN in the Peer Zone. Thereby, an access permission of host B and distributed virtual volume B is added to the access permission of host A and distributed virtual volume A.

Based on the host group setting, the physical storage device A refers to the internal LU number from the host group information (the internal LU number is omitted from the entry of the host group information in FIG. 30), and determines that only entity volume A is an accessible volume. When the host A issues a SCSI command necessary for recognizing a volume to the entity volume, the host recognizes that the volume is a Referral non-support (R_SUPPORT=0) volume. Therefore, the host A will not issue a command for acquiring the host Referral information. Regarding host B, only the permission to access a distributed virtual volume B is provided, similar to FIG. 28.

Thereby, since the virtual storage device stores TPG information and Referral information for each host group number, that is, for each volume, and since a state that differs for each volume (in the case of E-VOl A, AAS=Act/Opt, in the case of D-VOl B, AAS=LBD) is stored with respect to the physical port of the physical storage device (WWPN 0), a different type of volume can perform access by sharing the target port of the same physical storage device.

Figure 31:
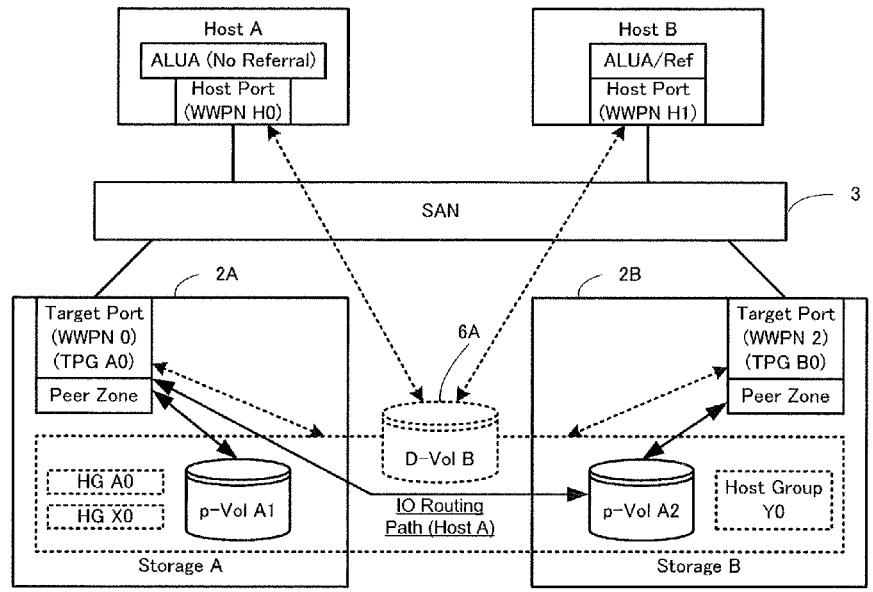
FIG. 31 is a block diagram illustrating one example of configuration of the virtual storage device and management information.

FIG. 31 shows a system configuration in which the host and the storage devices or the storage devices are mutually coupled via a SAN, and a portion of the management information thereof. The differences between the present drawing and FIG. 30 will be described. The host A is an old host having a multipath software that does not support Referral. It is assumed that both host A and host B access the distributed virtual volume B. The distributed virtual volume B is a cluster volume shared and accessed by host A and host B.

The storage administrator creates the distributed virtual volume B with respect to the virtual storage device and sets up a host group information for each host. The OS version of the host and the attribute information of the host multipath software are set for each host as attribute information described with reference to FIG. 13B. Now, the host A registers a SPC-3 ALUA support and the host B registers a SPC-4/SBC-3 ALUA/Referral support via the host group.

The information of the host group settings of the virtual storage device is shared by the respective physical storage devices via a communication path 16 (not shown in FIG. 31). A host port H0 of the host A only has access permission to target port WWPN0 as an access permission of host group A0 which is a distributed virtual volume and has a Referral non-support attribute. The host port H0 of host A cannot directly access the partial volume A2 of distributed virtual volume B via the target port of physical storage device B.

Therefore, the host port H0 of host A must access the partial volume A2 of physical storage device B from the physical storage device A through an IO routing path and via a communication path 16. Therefore, the host A is also capable of accessing the entity of the distributed virtual volume B.

Now, a host group number is registered as Referral information, and by referring to the volume information (FIG. 12A or FIG. 12B), it becomes possible to determine which physical storage device the volume is arranged in (the storage ID field of Referral information in the drawing is determined uniquely by referring to the volume information). Therefore, the IO routing path of the physical storage device is capable of determining whether it is necessary to perform routing to the physical storage device by referring to the volume information from the Referral information.

According to the arrangement of FIG. 31, even in an environment in which multipath software of different versions exist in a mixture, it becomes possible to maintain the compatibility of mutual coupling while sharing a distributed virtual volume via a plurality of hosts.

Figure 32:
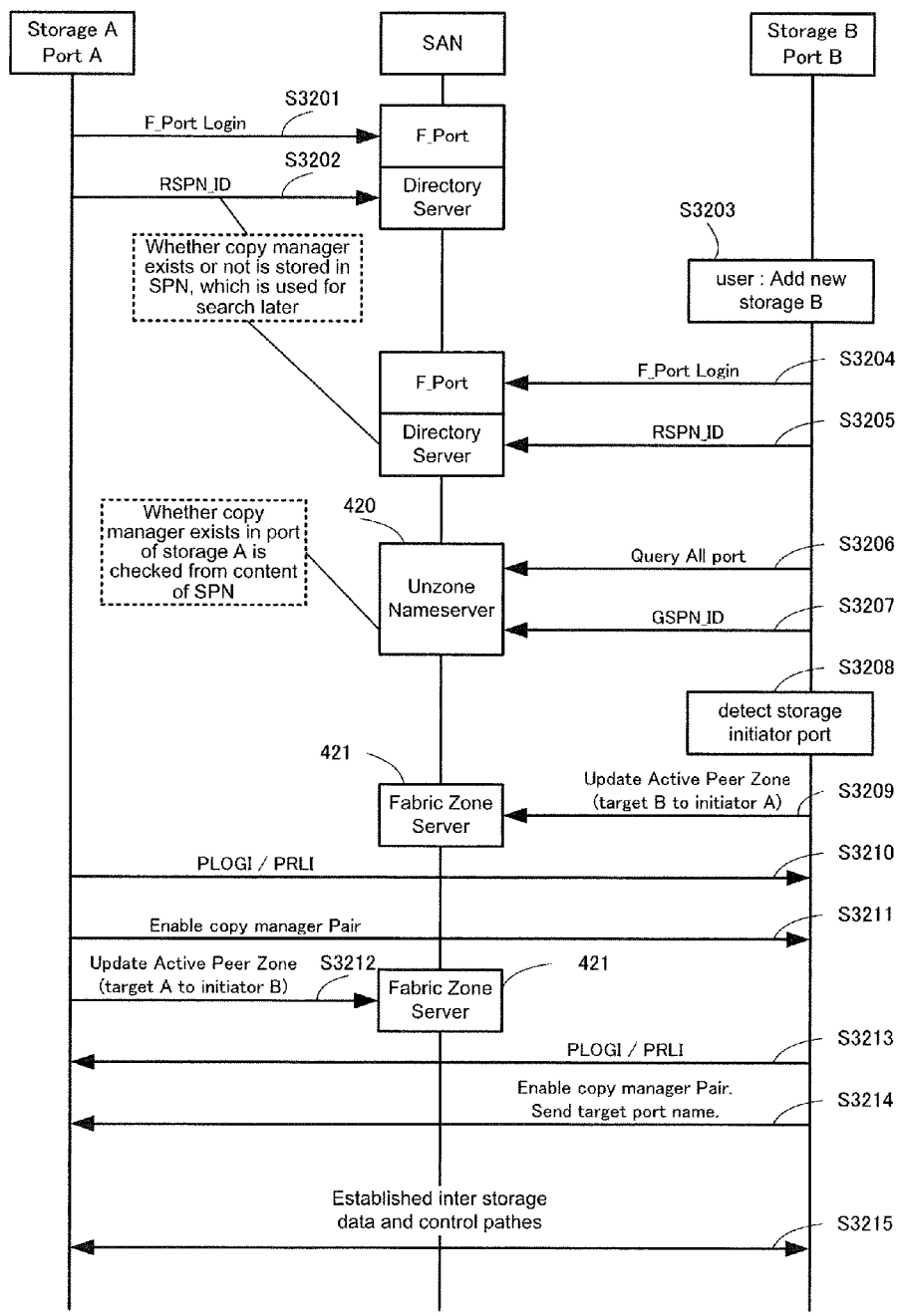
FIG. 32 is a sequence chart showing the establishment of a communication path coupling storage devices via a SAN.

FIG. 32 is a sequence chart for facilitating the work of the administrator in an arrangement in which a communication path is established between storage devices via a SAN. Based on this sequence, the recognition of the physical storage device is automated, and the setting of Zoning of the SAN required for establishing a communication path 16 arranged between storage devices is automated.

Figure 33:
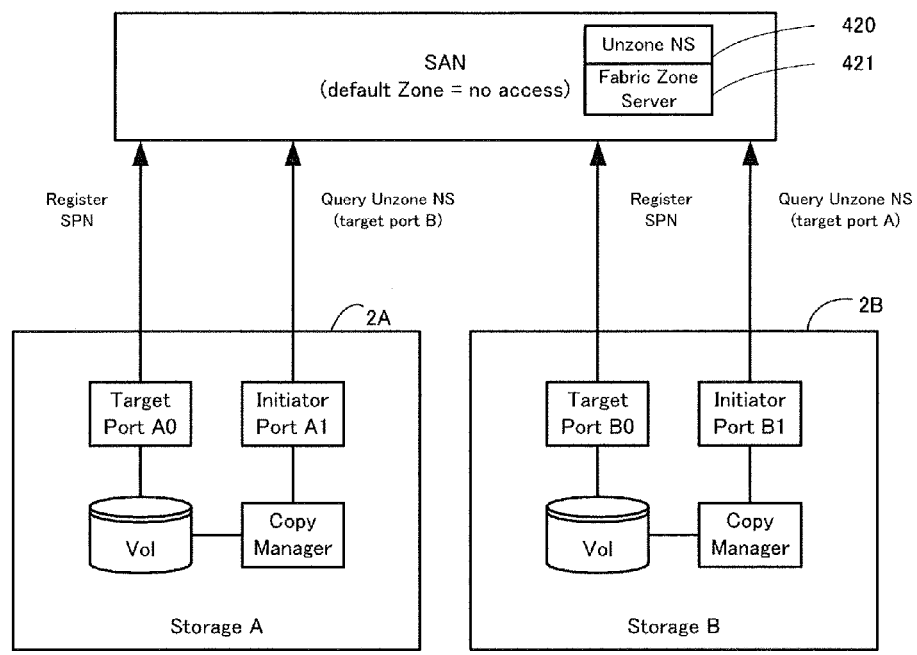
FIG. 33 is a block diagram illustrating one example of configuration of the virtual storage device and management information.

FIGS. 33 and 34 show system configurations prior to and after setting a communication path via the sequence of FIG. 32, and a view showing changes of various information. The sequence of FIG. 32 will be described with reference to FIGS. 33 and 34. The configuration, program and storage information within the SAN switch of FIGS. 32 through 34 respectively correspond to the configuration, program and storage information within the SAN switch described with reference to FIG. 10 and FIG. 20.

The storage device stores an Unzone Name Server information and a Name Server information in the memory. Since the Name Server information in FIGS. 33 and 34 is information generally required to store the list of SCSI initiator and target information, it is omitted from the description of FIG. 11. The Unzone Name Server information is inevitable information for searching a counterpart (peer) for providing access permission in order to create a zone automatically.

At first, the storage device 2A and storage device 2B perform fabric login to an F_Port (Fabric Port) of the FC SAN (S3201, S3204). Next, the storage devices 2A and 2B store information capable of identifying that a function exists to enable communication between storage devices in a directory server, such as a Symbolic Port Name, with respect to the SAN using an FC standard message such as a RSPN_ID (Register Symbolic Port Name based N_Port_ID) request (S3202, S3205).

The administrator adds a new storage device. The management screen of the storage device displays on the screen the newly added storage device in this state. The administrator sets the storage devices 2A and 2B as a pair capable of realizing a distributed virtual volume configuration (S3203).

Next, in response to the request (S3203) from the administrator, the storage device 2B sends a query to the Unzone Name Server. This query to the name server can acquire the connection information of all nodes stored in the name server exceeding the access permission range of Zoning. For example, an already linked-up N_Port_ID is acquired collectively via a GPL (Get Port List) request, all node name identifiers coupled to the SAN are acquired via a request such as a GNN_ID (Get Node Name based N_Port_ID), then the acquired information is compared with the device information stored in the management terminal of a plurality of storages so as to perform refinement (S3206).

Next, a GSPN_ID (Get Symbolic Port Name based N_Port_ID) or the like is issued, and an information capable of identifying the function registered via the aforementioned steps (S3202, S3205) is acquired (S3207). The port registered as a communication port out of the initiator ports of the storage device 2A in the previous step is detected (S3208).

A portion of the information of the SAN switch and the storage device up to the present step is as shown in FIG. 33. Based on the information obtained by the target port of the physical storage device sending a query to the Unzone Name Server, the initiator port of another physical storage device is searched, and in the subsequent step, a zone is set from the physical storage device to the other physical storage device.

Thereafter, the storage device B issues an Update Active Peer Zone request to the Fabric Zone Server 421. Thereby, Zoning of the communication path between the storage devices 2A and 2B (Zone A_B 431 of FIG. 33) is formed (S3209).

Next, the storage device performs initialization of the port (S3210) and activating of function via information transmission and reception via the communication path (S3211). Similarly, the communication path is established from the storage device 2A side. Thereby, Zoning (Zone B_A 432 of FIG. 33) of the communication path between the storage devices 2A and 2B is formed (S3212 to S3214). Thereby, a communication path between storage devices is mutually established (S3215).

Up to this step, the states of a portion of the information of the SAN switch and the storage device are changed as shown in FIG. 34. The physical storage device creates a Peer Zone information based on the information obtained via the query sent to the Unzone Name Server. In the case of the storage device A, WWN B1 which is an initiator port of the storage device B is registered to the communication path/peer zone information 1102. The physical storage device sets up a zone for the communication path in the SAN switch based on the Peer Zone request. The physical storage device receives an RSCN after setting of the zone is completed, and a query is sent to the normal name server to establish a communication path.

Further, the operation explained with reference to FIG. 33 is applicable for searching the initiator port of the host. By searching an initiator port via the target port by sending a query to the Unzone Name Server, the virtual storage device can search which target port of the physical storage device can reach the initiator port of the host having access permission without the administrator designating the target port. Further, the name server database information of the SAN switch (FIG. 21A) stores HBA information of FC FDMI (Fabric Device Management Interface) standard, and information can be acquired from the FDMI server of the SAN switch. By sending a query asking for the host name included in the FDMI structure or the like, it becomes possible to search a candidate of the initiator port of the host without the designation of the storage administrator.

FIG. 35 is a flowchart illustrating an operation sequence of a physical storage device when a storage administrator of the virtual storage device creates a volume. The virtual storage device administrator does not need to select a physical storage device in the process of creating a new volume. The virtual storage device performs conversion to a distribute d volume and assignment to a partial volume triggered for example by volume creation, monitoring of performance or capacity after volume creation or load equalization after adding a storage device.

The storage administrator of the virtual storage device (hereinafter referred to as storage administrator) orders creation of a volume from the management terminal of the virtual storage device (S3501). In this step, the setting of the volume type, the physical storage device to be assigned and the target port to be assigned can be performed by the administrator, or can be selected by the virtual storage device. The embodiment for creating a distributed virtual volume in association with the virtual HDD file of the virtual machine will be illustrated later.

Next, the storage administrator sets up a host group with respect to the distributed virtual volume. The storage administrator registers the list of initiator ports of the host providing access permission or the host names. Here, the storage administrator can independently register the name identifier (WWPN) of the virtual port assigned to the virtual machine of the host. In another example, the storage administrator can register the host name of the virtual machine and to have the virtual storage device perform an automatic search. As mentioned earlier, also based on the host name of the virtual machine, it is possible to search a port information associated to the host from the FDMI information registered to the name server information 202 of the SAN switch. Further, the storage administrator can independently select the identifier or the number of the target port of the physical storage device. The storage administrator selects a host OS attribute information formed as a template of the host OS information if necessary for the compatibility of the host OS, and associates the multipath information supported by the host OS to the host group (S3502).

Next, the virtual storage device management program of the management terminal sends an access permission information of the virtual storage device having been set to the physical storage device. In this step, the access permission setting set up by the administrator is not complete information capable of constituting a host group information, a TPG information or a Referral information. Therefore, the virtual storage device collects necessary information from the SAN switch or the host, searches the initiator port of the host, a candidate storage device and a candidate target port (S3503). The Virtual storage device administrator can perform operation for creating another volume or the like in parallel until the physical storage device completes a volume creation sequence and receives a message notifying that the volume can be utilized.

The physical storage device receives the order to create volume and necessary information in S3503 from the virtual storage device administration program and advances to S3505 (S3504). Hereafter, the step of S3505 is illustrated.

If the storage administrator does not explicitly register the WWPN of the host initiator port but registers a different identifier such as a host name, the physical storage device searches the initiator port WWPN via the procedure described in FIG. 32. Similarly, if the storage administrator has not selected a target port, the physical storage device searches a candidate of a target port capable of communicating with the host initiator port via the process described with reference to FIG. 32.

In the present step (S3505), if a plurality of target port candidates are searched, the virtual storage device narrows down the physical storage devices or the target ports according to the performance requirements of the distributed virtual volume, the function requirements and port performance requirements set by the administrator. If there are no candidates, if the performance does not satisfy the performance requirements designated by the administrator, or if there is not enough capacity of pools, the virtual storage device discontinues the subsequent procedures, notifies an alert of failure of creation of a partial volume to the storage device administrator, and ends the process. According to the present step (S3505), one or more candidates are determined as the physical storage device capable of reaching the host. Furthermore, the number of the physical storage devices and the number of partial volumes are determined according to the performance requirement of the volume, the functional requirement, the port performance requirement and the PP performance requirement. When the relationship of a target port and an initiator port is determined, the physical storage device completes the preparation of the information necessary for creating the host group information.

The virtual storage device adds to the volume management information 1104 an entry of a partial volume planned to be added to the distributed virtual volume, and assigns an internal LU number of the partial volume. The virtual storage device refers to the volume management information 1104 and updates the distributed virtual volume information 1105. Further, the physical storage device updates the function information 1116 and inherits to the partial volume the function set in the distributed virtual volume. The virtual storage device creates a TPG information 1113 based on the information of the target port and the initiator port (S3505).

Steps S3506 through S3512 can be operated in parallel in the respective physical storage devices, but for explanation, the flowchart illustrates a procedure for performing the processing for each physical storage device and then moving on to the next device. The physical storage device creates a host group information 1109 based on the TPG information created in step S3505. The physical storage device creates a Referral information 1114 corresponding to the distributed virtual volume information 1105 (S3506).

Next, the physical storage device creates a partial volume based on the volume information 1104 and the Referral information 1114 (S3507).

Thereafter, the physical storage device provides an access permission to the partial volume based on the host group information and the TPG information associating the partial volume and the target port with the access permission of the host initiator port. The physical storage device performs a setting for routing the IO to a different physical storage device via the communication path if necessary in a host multipath software which does not correspond to Referral. The present step is not necessary in a host supporting Referral, but is a necessary procedure in a system configuration as described in FIG. 31 (S3508).

Next, the physical storage device confirms whether the coupling mode is Fabric (SAN coupling) or not based on the host/peer zone information. In the case of a SAN coupling, the procedure advances to S3510 (S3509). In other cases, the procedure advances to S3512 (S3509). Thereafter, the physical storage device adds a WWPN of a host giving access permission to the target port entry giving access permission of a distributed virtual volume to the host peer zone information (S3510). Next, the physical storage device creates a Peer Zone request based on the host peer zone information created in the aforementioned step, and registers the access permission information including the added host WWPN to the SAN switch (S3511).

Thereafter, it is determined whether a next physical storage device constituting a distributed virtual volume exists or not. If a next physical storage device exists, the steps of S3506 through S3512 are repeated. When the setting of all the physical storage devices constituting the distributed virtual volume has been completed, the procedure advances to S3513. Next, the completion of creation of the distributed virtual volume is notified to the program of the virtual storage management terminal (S3513).

Lastly, the administrator of the virtual storage device receives completion of creation of the distributed virtual volume, and confirms that the settings of the host, the SAN, the distributed virtual volume of the virtual storage device and the partial volumes of all the physical storages are completed and that preparation to issue an IO has been completed.

This process has been described focusing on the distributed virtual volume, but also in creating an entity volume or a virtual volume, the process is applied to the setting of a specific physical storage, and an effect of reducing the work related to setting of each physical storage device can be exerted.

Figure 36:
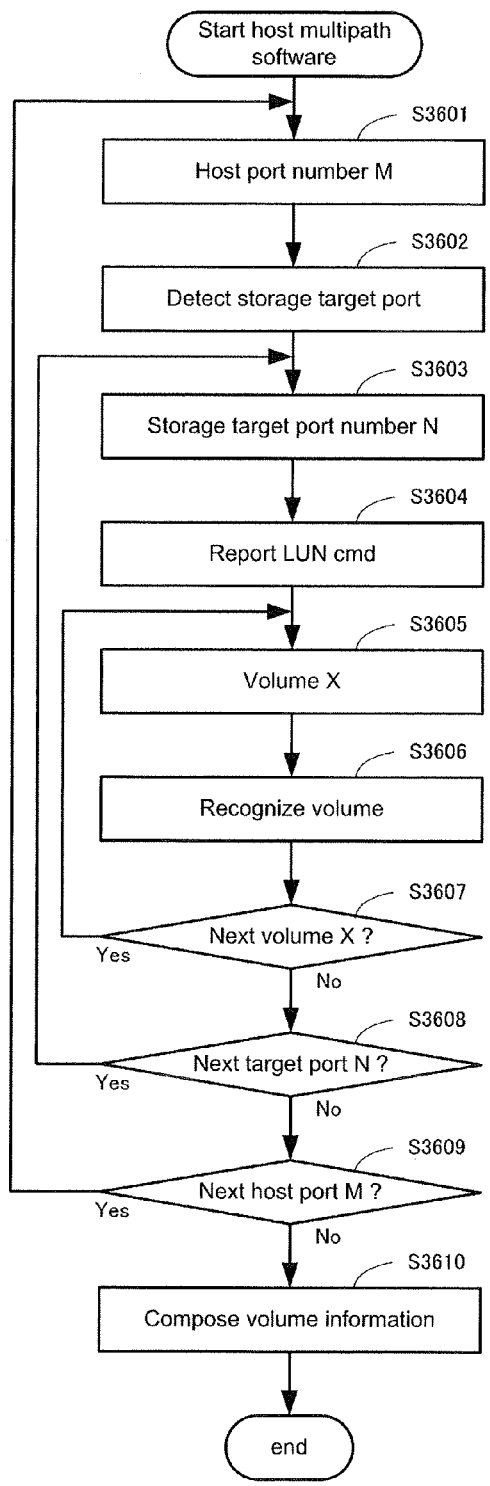
FIG. 36 is a flowchart showing the processing for recognizing a distributed virtual volume.

FIG. 36 is a flowchart of a process for the host to recognize a distributed virtual volume. In the following flowchart, it is possible for the commands to be issued in parallel from each host port, but in order to facilitate explanation, the flowchart only illustrates sequential execution of commands.

First, the one or more host ports of a host is sorted for example in order of Relative Port ID, and the following control is executed with respect to a port having a host port number M (S3601). Next, the host port M sends a query to the name server of the SAN. Now, the SAN switch only responds information having access permission via Zoning.

Now, the host executes only the port having a target port attribute (a port to which a target attribute is registered in RFF_ID CT_IU). If the host is not coupled to the SAN, one target port is detected at the timing of login. In the case of a FCoE MP (multipoint) topology, it is possible that a plurality of target ports are detected. The host HBA driver program sorts and retains the detected target ports for example in the order of number of the N_Port_ID (S3602). If no target port has been detected, the steps of S3603 through S3608 are skipped.

Next, the host performs the following sequence to the detected target port number N of the of the storage device (S3603). Thereafter, the host issues a SCSI Report LUN command. The storage device searches the host group information from the access source host port WWPN, creates a list of the host LU number of the volume having an access performance, and returns the same as a SCSI Report LUN command. Here, one or more volumes are returned (S3604). If not even a volume has been created, the steps of S3605 to S3607 are skipped.

Next, the host performs the following sequence to volume X of the detected target port number N of the storage device (S3605). Thereafter, the host issues a SCSI Inquiry command. Now, the issued page and the acquired information will be explained. The Standard Inquiry page acquires a vender name, a product name, and a TPGS flag which is an ALUA support availability flag. If the TPGS flag is not 00b, the ALUA is supported. If the combination of the vender name and product name are already registered in the host multipath software, the multipath software determines that the volume is a multipath volume and requires formation of the TPG information and the Referral information.

Next, the host issues a command to acquire a Device Identifier VPD page (0x83) of the Inquiry, and acquires the LU name identifier of the volume (LU Name), the name identifier of the Target Port being accessed, RTPI, and TPG. Next, the host multipath program supporting Referral issues a command to acquire an Extended VPD page (0x86) of the Inquiry, and acquires information on whether the volume supports Referral or not. If the R_SUPPORT bit of the page is set to 1, it is determined that the volume supports Referral.

If the volume supports Referral, the host issues a command to acquire a Referral VPD page (0xB3) of the Inquiry, and confirms whether the segment size of the UDS is a fixed-length striping or a variable length. According to the present embodiment, the UDS assumes a variable length acquired via the Report Referral command, but it can simply be a striping mode adopting a multiple of the UDS multiplier and a fixed Segment Size.

Next, if the volume supports ALUA, the host issues a SCSI Report Target Port Group command. Thereby, a list of all TPG of the access path of the volume storing a list of target port RTPI constituting the TPG is acquired. Based on this information, the configuration of all target ports constituting a multipath of a volume can be determined. However, since the association of the WWPN of the target port as an entity of the RTPI information is only stored in the Device Identifier VPD page of the Inquiry information, it is necessary to issue an Inquiry to all target port paths.

In the case of a host multipath supporting Referral and supporting Referral based on the information acquired from a volume, and wherein the AAS state of the TPG is in LBD state via the Report TPG command, the host issues a SCSI Report Referral command. According to this process, the start LBA, the end LBA, the number of accessible TPGs and the states thereof of all UDS can be acquired. Optionally, a Mode Sense/Mode Select command is issued, and a D_SENSE flag validating the Referral Sense Data response of the Control mode page (0x0A) is set (S3606). These commands and information are based on a format determined by SCSI standard, so the descriptions thereof are omitted.

Next, if there are other volumes (Yes), the host repeatedly performs the steps of S3605 through S3607. When recognition of all volumes has been completed (No), the procedure advances to the next step (S3607). Then, if there are other target ports (Yes), the steps of S3603 to S3608 are repeatedly performed. When recognition of all target ports has been completed (No), the procedure advances to the next step (S3608). Thereafter, if the host has a plurality of initiator ports via a redundant system configuration or the like (Yes), the steps of S3601 to S3609 are repeatedly performed. When recognition of all volumes has been completed (No), the procedure advances to the next step (S3609).

Finally, the host registers the acquired information in the host TPG information and the host Referral information to each of the volume name identifier (LU Name) (S3610). Thereby, the host completes the preparation for acquiring information necessary for issuing an IO of the entity volume or the distributed virtual volume of the virtual storage device, and IO can be issued.

Now, during these steps, when the host administrator performs an operation for volume re-recognition after a volume has been created by the administrator of the virtual storage device (FIG. 35), all necessary information can be performed by the HBA driver program and the multipath program of the host to complete the settings of various information tables, and IO can be issued automatically.

Figure 37:
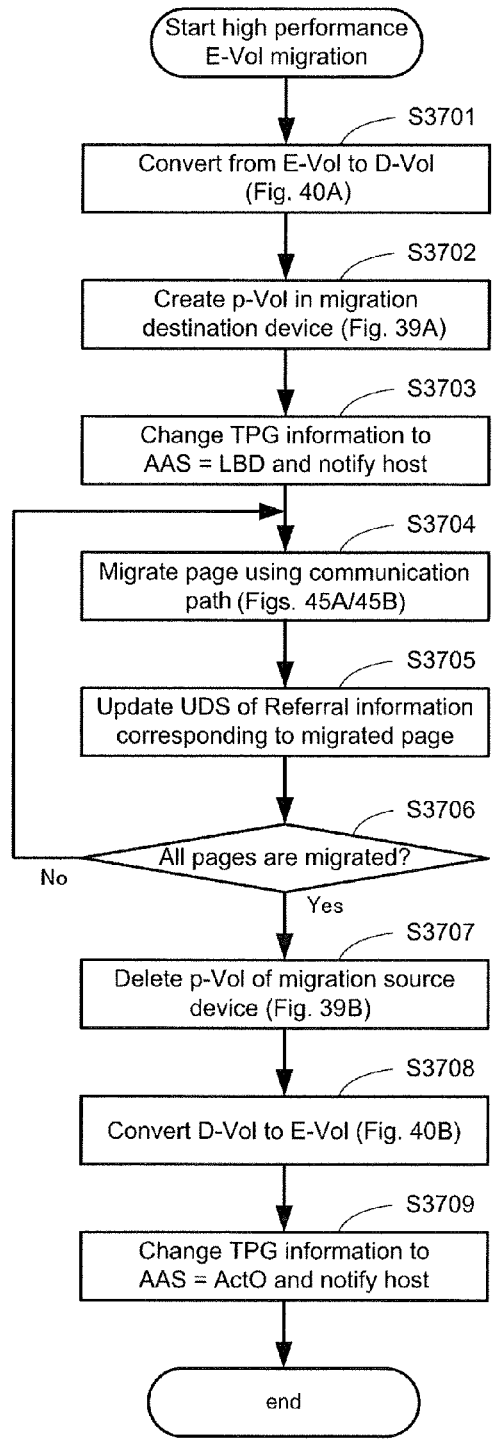
FIG. 37 is a flowchart showing a process for migrating volumes among storage devices.

FIG. 37 is a flowchart for migrating all data in the entity volume from the migration source storage device to the migration destination storage device without deteriorating the host performance. FIGS. 38A through 38D are views showing the change in the volume during migration and the change in respective control information during migration among volumes. The flowchart of FIG. 37 will now be described with reference to FIGS. 38A through 38D.

Figure 38A:
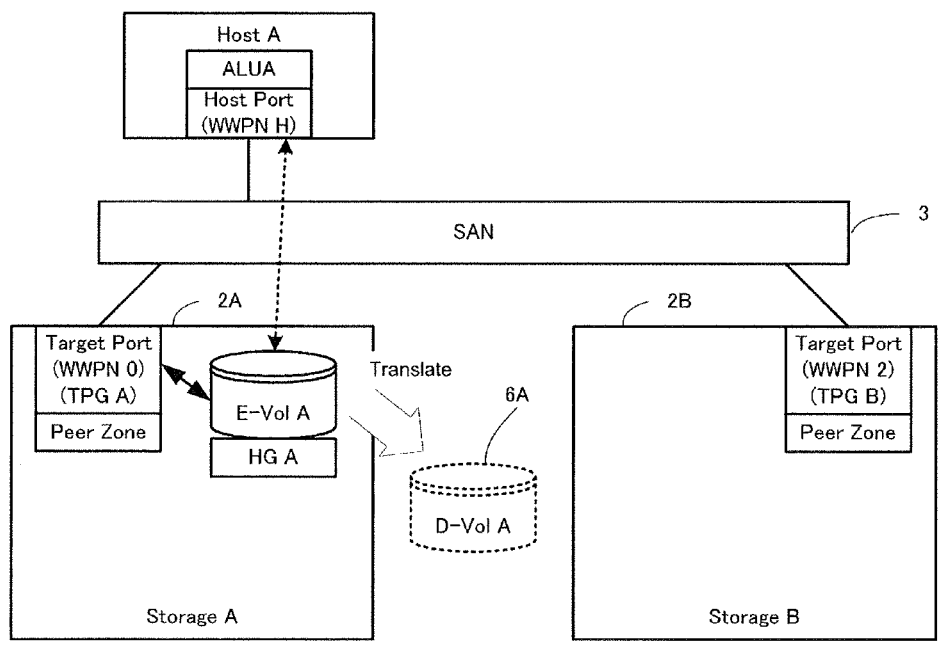
FIG. 38A is a block diagram illustrating one example of configuration of volume migration among virtual storage devices and the management information.
Figure 38B:
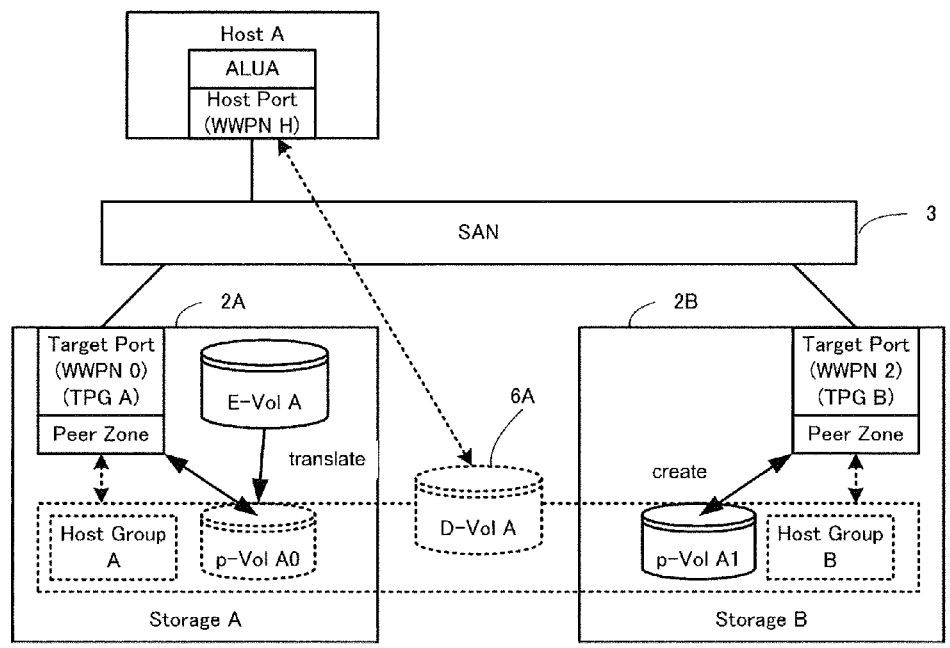
FIG. 38B is a block diagram illustrating one example of configuration of volume migration among virtual storage devices and the management information.
Figure 38D:
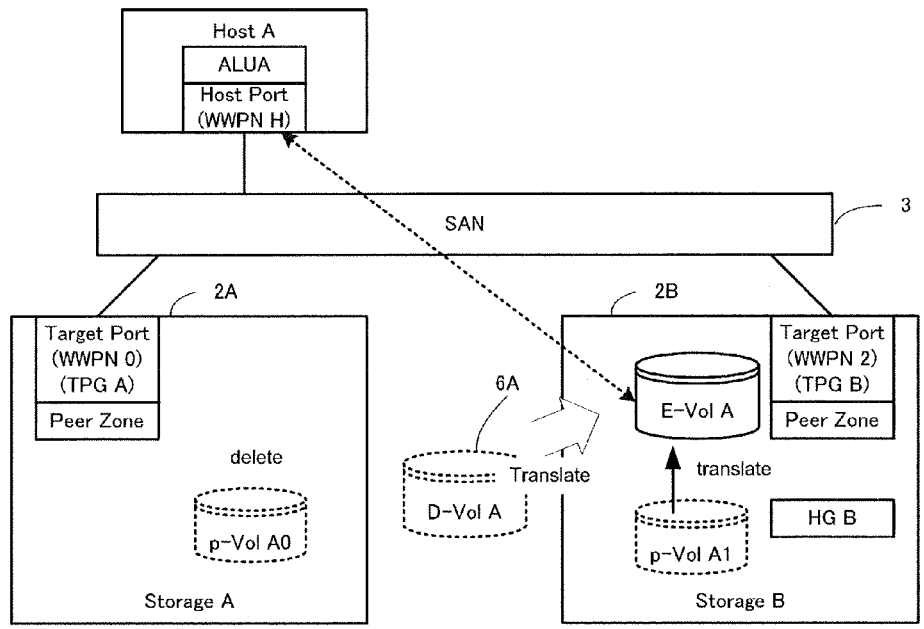
FIG. 38D is a block diagram illustrating one example of configuration of volume migration among virtual storage devices and the management information.

At first, the physical storage device being the migration source converts the entity volume being the target of migration (state of FIG. 38A) to a distributed virtual volume (state of FIG. 38B). The distributed virtual volume includes one partial volume in which the entity volume containing the migration source data is converted to a partial volume. The details of the conversion method will be described later with reference to FIGS. 40A and 40B (S3701).

Next, a partial volume is assigned to the migration destination physical storage device. The partial volume in the migration destination device does not store effective data before the migration of data of the partial volume stored in the migration source physical storage device is started. The virtual storage device adds the partial volume created in the migration destination physical storage device to the distributed virtual volume. The details of the method for adding and deleting a partial volume will be described later with reference to FIGS. 39A and 39B.

In the present step, the host group settings are taken over to the migration destination physical storage device by referring to the host group information, and if a SAN coupling is adopted, the Zone setting is also performed. This step corresponds to the change of host group information and Peer Zone information stored in the storage device B illustrated in FIG. 38B (S3702).

Next, the migration source physical storage device sends a notification to prompt reacquisition of the TPG information so that the change of volume attribute such as the conversion from an entity volume to a distributed virtual volume, the addition of a partial volume and the addition of a target port is sent to the multipath software of the host. The migration source physical storage device receiving the host IO sends a response of update notification of the TPG information in synchronization with the host IO via a SCSI Unit Attention response. The multipath software of the host issues a Report TPG command to the migration source physical storage device. The migration source physical storage device returns to the host the TPG information in which the target port AAS of the migration source physical storage device is changed from Active/optimized to LBD and the target port AAS of the migration destination physical storage device has added a TPG entry set to LBD.

This process corresponds to the TPG information and the host TPG information of FIG. 38B. If the multipath software of the host detects that the AAS of the TPG information is LBD, and if a Report Referral command has been issued, the virtual storage device returns to the host a Referral information in which the whole volume is set as UDS (a UDS entry) and designates the TPG of the migration source physical storage device. This procedure corresponds to the Referral information and the host Referral information of FIG. 38B. When this process is completed, the procedure advances to S3704 (S3703).

Next, the distributed virtual volume of the virtual storage device partially migrates the data in page granularity among storage devices using a communication path 16 coupling the migration source and migration destination physical storage devices (S3704).

Thereafter, the UDS entry corresponding to the migrated page is added to the Referral information and the Referral information is updated. This procedure corresponds to the Referral information and the host Referral information of FIG. 38C. In the present procedure, if the states of the UDS are identical with the entries before and after the UDS, the two or three UDS aligned in a row are gathered to a entry by changing the start and end addresses of the LBA and integrating the same. This process enables to cut down the memory capacity being used. In the present page migration sequence, the cache state during migration of pages among the physical storage devices is also managed. The detailed flowchart related to page migration among storage devices is illustrated with reference to FIGS. 45A and 45B (S3705).

Next, the virtual storage device repeats steps S3704 and S3705, and determines that all pages have been migrated from the migration source to the migration destination physical storage device. The determination condition can be, for example, that the Referral information only includes the TPG of the migration destination physical storage devices. When inter-device data migration is completed, the procedure advances to S3707 (S3706).

Next, when the inter-device volume migration has been completed, the virtual storage device temporarily returns the attribute of the volume having the volume attribute temporarily converted to distributed virtual volume to the attribute of entity volume. At first, in order to unify the partial volume belonging to the distributed virtual volume, which is the condition for returning the volume to an entity volume, the partial volume not storing effective data in the migration source physical storage device is deleted. This procedure corresponds to deleting the partial volume A0 of FIG. 38D. The present procedure is opposite to the procedure described in S3702, the details of which will be described with reference to FIGS. 39A and 39B (S3707).

Thereafter, the virtual storage device converts the distributed virtual volume having the partial volume arranged only in the migration destination physical storage device to an entity volume. This procedure corresponds to the procedure for converting the distributed virtual volume to an entity volume by transferring the partial volume A1 of FIG. 38D to an entity volume. This procedure is opposite to the procedure of S3701, the details of which will be described with reference to FIGS. 40A and 40B (S3708).

Lastly, the virtual storage device deletes the migration source physical storage device target port that has become unnecessary from the TPG information, and deletes the Referral information. Further, in order to notify the converted TPG information and Referral information to the host, the migration destination storage device sends the notification in synchronization with the host IO using Unit Attention response, by which the host issues a Report TPG command, updates the host TPG information and deletes the host Referral information (S3709).

Now, the difference of the method for controlling the inter-device volume migration that does not deteriorate the host IO performance as shown in FIGS. 37 and 38 will be described. According to the prior art inter-device volume migration method, the whole volume is transferred at once. On the other hand, according to the present embodiment, data is migrated in page granularity after converting the volume to a distributed virtual volume. Thereby, it becomes possible to eliminate the routing process of the host IO request using the communication path among storage devices.

Further, due to data consistency control in the target migration page during page migration as described later with reference to FIGS. 45A and 45B, for example, the turning off of the cache of the whole volume becomes unnecessary. Therefore, the distributed virtual volume will constantly not have cache turned off, so inter-device volume migration becomes possible without deteriorating the host IO performance or the storage volume performance.

Figure 39A:
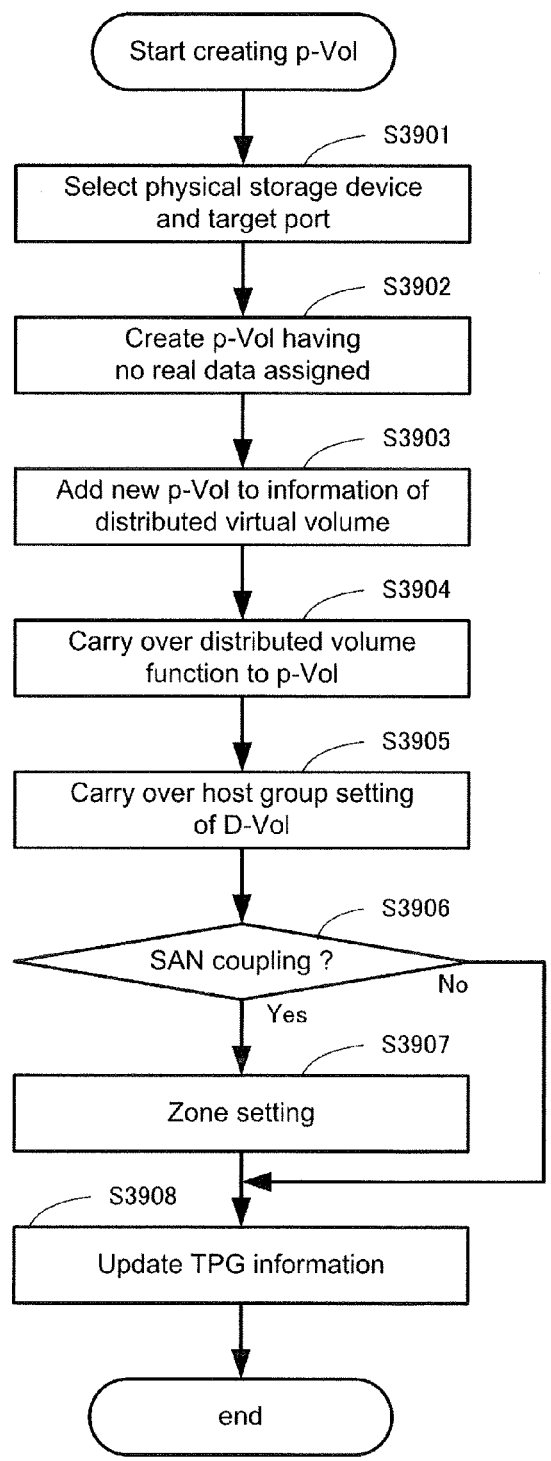
FIG. 39A is a flowchart showing the process for creating and deleting partial volumes.

FIG. 39A is a flowchart for newly creating a partial volume to a distributed virtual volume and adding the same to a member of the distributed virtual volume. The virtual storage device performs this sequence or for adding a physical storage device belonging to the distributed virtual volume in response to the requested volume performance or when adding a physical storage device.

At first, the virtual storage device selects a candidate of a physical storage device under the condition that the storage device is capable of reaching the host, based on the requested volume performance, required volume capacity, target port bandwidth, computing capability within the storage device, and the capability of the hardware resources required for functional operations. Further, the target port required for the physical storage device is selected under the condition that the target port is capable of reaching the host (S3901).

Next, the physical storage device selected in the aforementioned step creates a partial volume. The partial volume is a partial volume not having real data assigned thereto. A new entry is added to the volume information of FIG. 12A as a partial-volume type volume (S3902).

Thereafter, the virtual storage device adds a partial volume assigned to the physical storage device to the distributed virtual volume. The internal LU number of the distributed virtual volume is set to the pointer entry of the volume information of FIG. 12A. Further, a partial volume entry is added to the distributed virtual volume information of FIG. 12B (S3903).

Then, the virtual storage device inherits the functions of the distributed virtual volume to the partial volume assigned to the physical storage device. A newly created partial volume entry is added to the storage function information of FIG. 12C, and the same functions as the functions of the distributed virtual volume are activated. Thereby, the functions of the storage device are inherited to the partial volume newly belonging to the distributed virtual volume (S3904).

Thereafter, the virtual storage device carries over the host group information of the distributed virtual volume to the newly assigned physical storage device. The entry of the target port assigned in S3901 is added to the host group information of FIG. 13A (S3905).

Next, the physical storage device determines whether the target port assigned in S3901 adopts a SAN coupling or not (S3906). In the case of a SAN coupling, an entry is added to the host peer zone information of FIG. 14A, an Add/Update Active Peer Zone (AAPZ) request is issued to the SAN switch, and a zone is added (S3907). If the connection is not a SAN connection, the procedure advances to S3908.

Then, the virtual storage device adds an entry of a target port added to the distributed virtual volume to the TPG information of FIG. 18A, and update of the TPG information is notified to the host via a Unit Attention response. The multipath software of the host performs recognition of the distributed virtual volume as shown in FIG. 36 and recognizes the path of the newly added target port (S3908). The above-described process for newly creating a partial volume also applies to the case of creating a distributed virtual volume by distributing an entity volume.

Figure 39B:
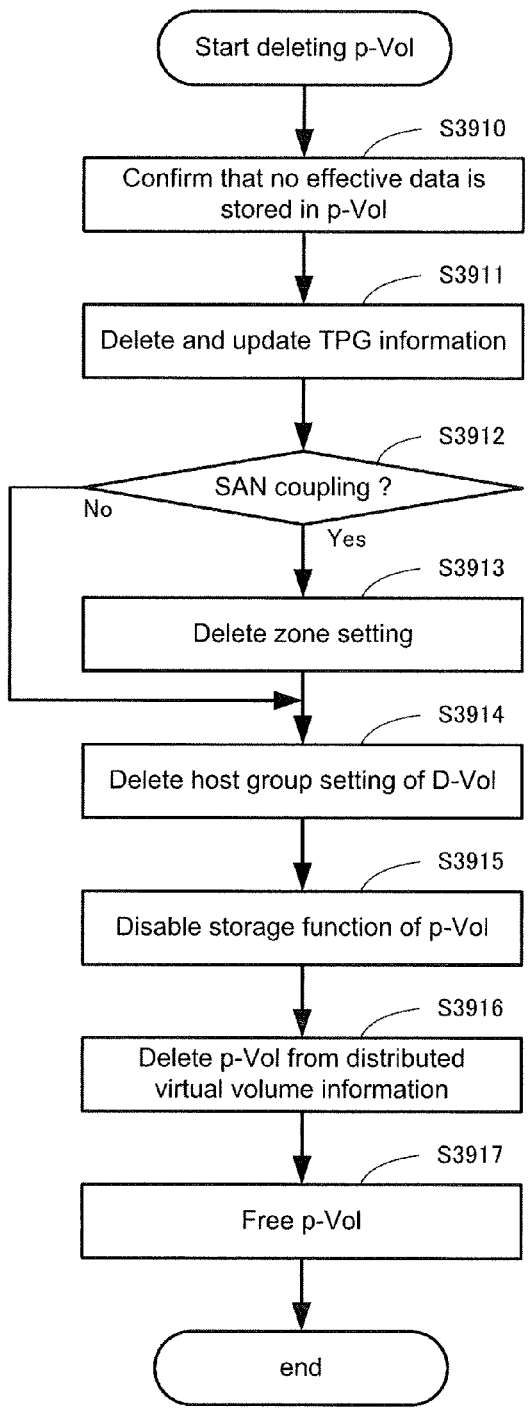
FIG. 39B is a flowchart showing the process for creating and deleting partial volumes.

FIG. 39B is a flowchart showing an example of deleting a partial volume belonging to the distributed virtual volume from the member of the distributed virtual volume. Basically, the present procedure is opposite from the additional sequence described with reference to FIG. 39A. When a partial data not having an effective data becomes unnecessary such as when a physical storage device is eliminated, the present sequence is performed when the virtual storage device deletes a partial volume from the distributed virtual volume.

As an advance preparation, the virtual storage device confirms that there is no effective data in the partial volume. Confirmation means can confirm via the Referral information of FIG. 16B that there is no effective UDS entry belonging to the partial volume planned to be deleted. The virtual storage device limits the writing of data to the partial volume so as not to assign a new page from the pool to the partial volume planned to be deleted when a new write data request is received. When an effective data exists in the partial volume, this sequence is interrupted, or the data is migrated in page granularity to another partial volume so that there is no effective data stored in the partial volume (S3910).

At first, the entry of the target port added to the distributed virtual volume is deleted from the TPG information of FIG. 18A, and the update of the TPG information is notified to the host via a Unit Attention response. The multipath software of the host executes recognition of the distributed virtual volume illustrated in FIG. 36 and deletes the path of the deleted target port from the entry of the host TPG information (S3911).

Next, the physical storage device determines whether the deleted target port in S3911 is a SAN connection or not (S3912). In the case of a SAN coupling, an entry of the relevant target port is deleted from the host peer zone information of FIG. 14A, and via the content having updated the Peer Zone list, the AAPZ request is issued to the SAN switch, a portion of the zone is deleted and updated, then the procedure advances to S3914 (S3913). If the coupling is not a SAN coupling, the procedure advances to S3914.

Thereafter, the virtual storage device deletes the host group information related to the partial volume planned to be deleted from the host group information of the distributed virtual volume. The virtual storage device deletes the entry of the host group related to the target port deleted in S3911 from the host group information of FIG. 13A (S3914). Next, the virtual storage device invalidates the function of the partial volume to be deleted. Based on the storage function information of FIG. 12C, the entry of the partial volume planned to be deleted is deleted (S3915).

Next, the virtual storage device frees the partial volume to be deleted from the physical storage device from the distributed virtual volume. The entry of the partial volume is deleted from the distributed virtual volume information of FIG. 12B. Further, the pointer entry of the volume information of FIG. 12A is disabled (S3916). Lastly, the physical storage device deletes the partial volume planned to be deleted freed from the distributed virtual volume. If necessary, the physical storage device returns the data in the assigned capacity to the pool within the physical storage device (S3917).

Figure 40A:
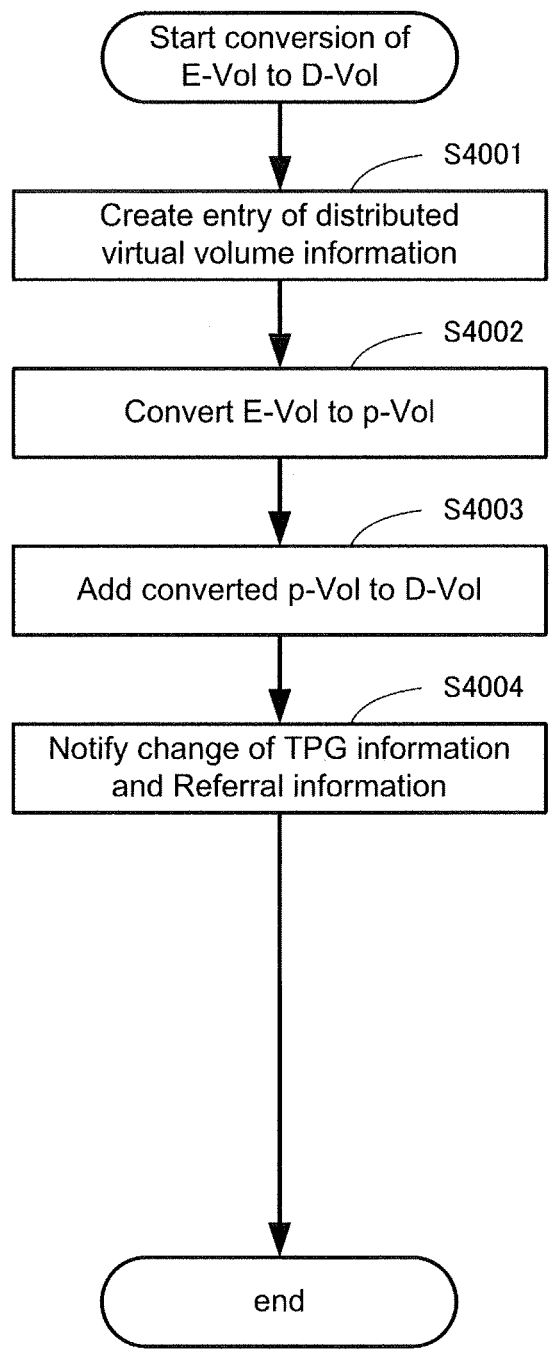
FIG. 40A is a flowchart showing the process for converting an entity volume to a partial volume.

FIG. 40A is a flowchart for converting an entity volume to a distributed virtual volume. In accordance with the requested volume performance, if a volume stored in a physical storage device does not satisfy the requested performance, the volume type is converted to a distributed virtual volume and a volume is created astride a plurality of physical storage devices.

First, the virtual storage device adds a new entry of a distributed virtual volume to a volume information 1104. Further, the virtual storage device adds an entry of a new distributed virtual volume to a distributed virtual volume information 1105 (S4001). Next, the virtual storage device changes the volume type of the entity volume from an entity volume to a partial volume (S4002).

Next, the virtual storage device associates the internal LU number of the distributed virtual volume to the entry of the internal LU number pointer of the partial volume of the volume information 1104 so that the partial volume having the volume type changed in S4002 belongs to the distributed virtual volume created in S4001. Further, the virtual storage device adds an information of a converted partial volume to the entry of the distributed virtual volume created in S4001 of the distributed virtual volume information 1105 (S4003).

Next, the virtual storage device changes the AAS entry of the TPG information 1113 from active to LBD. Further, a Referral information in which the UDS entry is a entry is created. The virtual storage device notifies change of TPG information to the host. The host recognizes the distributed virtual volume of a physical storage device via the distributed virtual volume recognition described with reference to FIG. 36 (S4004). By adding a partial volume described in FIG. 39A, the distributed virtual volume formed in a physical device becomes the distributed virtual volume formed astride a plurality of storage devices.

Figure 40B:
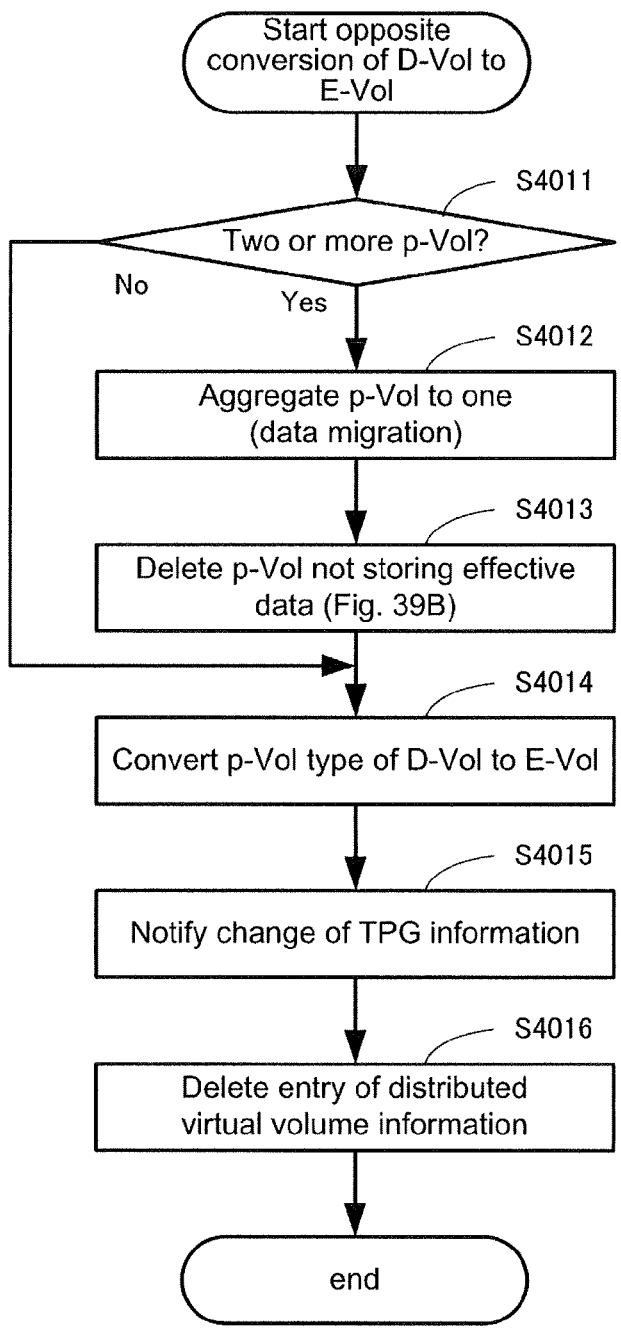
FIG. 40B is a flowchart showing the process for converting an entity volume to a partial volume.

FIG. 40B is a flowchart of an opposite conversion in which a distributed virtual volume is converted to an entity volume. Basically, this procedure is opposite to the procedure illustrated in FIG. 40A. The condition for converting a distributed virtual volume to an entity volume is that the volume is a distributed virtual volume in which only one partial volume exists in one physical storage device.

First, the virtual storage device confirms whether there are two or more partial volumes within the distributed virtual volume (S4011). If there are two or more partial volumes in the determination condition of S4011, the inter-device data migration in page granularity described with reference to FIGS. 45A and 45B is performed, data is collected in one partial volume, and the procedure advances to S4013 (S4012).

Next, the virtual storage device deletes a partial volume not having effective data stored therein via the delete sequence described with reference to FIG. 39B, by which the partial volume belonging to a distributed virtual volume is restricted to one, and the procedure advances to S4014 (S4013).

If the conversion conditions are already satisfied in the determination condition of S4011, the procedure advances to S4014. Thereafter, the virtual storage device changes the volume type of the one partial volume belonging to the distributed virtual volume to an entity volume. In this step, the virtual storage device carries over the host group information, the TPG information and the Peer Zone information to the entity volume having the volume type changed (S4014).

Next, the virtual storage device changes the AAS entry of the TPG information 1113 from LBD to active. Since the AAS entry of the TPG information is no longer LBD, the related Referral information is abandoned. The virtual storage device notifies the change of TPG information to the host. The host recognizes the entity volume of a physical storage device via volume recognition described with reference to FIG. 36. The multipath software of the host updates the host TPG information, and since the AAS of the relevant volume is no longer LBD, it is possible to abandon the host Referral information or the host Referral Hit/Miss information if necessary (S4015). Next, the virtual storage device deletes an entry of the distributed virtual volume having no partial volume belonging thereto from the volume information 1104 and the distributed virtual volume information 1105 (S4016).

Now, the relationship of the present invention with respect to the storage device functions will be described. FIG. 41 shows a page management information 1106 for realizing functions of capacity virtualization (Thin Provisioning) and tier migration in page granularity in a distributed virtual volume. This information is managed within the physical storage device. In the case of a distributed virtual volume, the information is associated with the Referral information shared among storage devices. In FIG. 41, only the example of the distributed virtual volume is illustrated for sake of simplification, but a configuration can be adopted in which the volume is mixed with an entity volume.

The fields of page management information will now be described. The page management information 1106 includes entries of a physical storage number, a pool number, a media type of the pool, a page number, a page address (start and end LBA), an internal LU number unique within the virtual storage device, a UDS number associated with the Referral information, and a flag for indicating that a page is being migrated.

The physical storage number is a number assigned uniquely to each physical storage device.

A pool number is a number assigned uniquely within the physical storage device. A pool is an actual domain for capacity allocation for each storage media in page allocation for realizing the capacity virtualization function and the page tier migration function described later. Each page information includes a metadata, and the information on whether the page is allocated or not is retained as one of the metadata (not shown in FIG. 41).

The pool media type stores a type for identifying a volume having a difference in performance for realizing the page tier migration function mentioned later. For example, the type of the storage media can be stored, or information classifying the media by performance indexes can be stored.

A page number is a number for identifying the pages uniquely allocated within the pool. The page size can be variable or can be a regular size. In order to facilitate tier management of the pages, the size can be the same among the pools. In order to reduce management tables, the capacity per page can be varied within each pool.

The internal LU number is a number having been explained with reference to FIGS. 12A through 12C. The UDS is the number of UDS of the Referral information explained with reference to FIGS. 16A, 16B and the like. The UDS is unique within a distributed virtual volume and must be arranged in order of LBA. This is because the information must be arranged in order of LBA when returning the Referral information to the host. A page migration on-going flag is a flag used for maintaining consistency of the cache data during migration of data among storage devices and for lock control during migration. The details will be described with reference to FIGS. 45A and 45B. Thereby, the page management information is associated with the UDS information.

Figure 42:
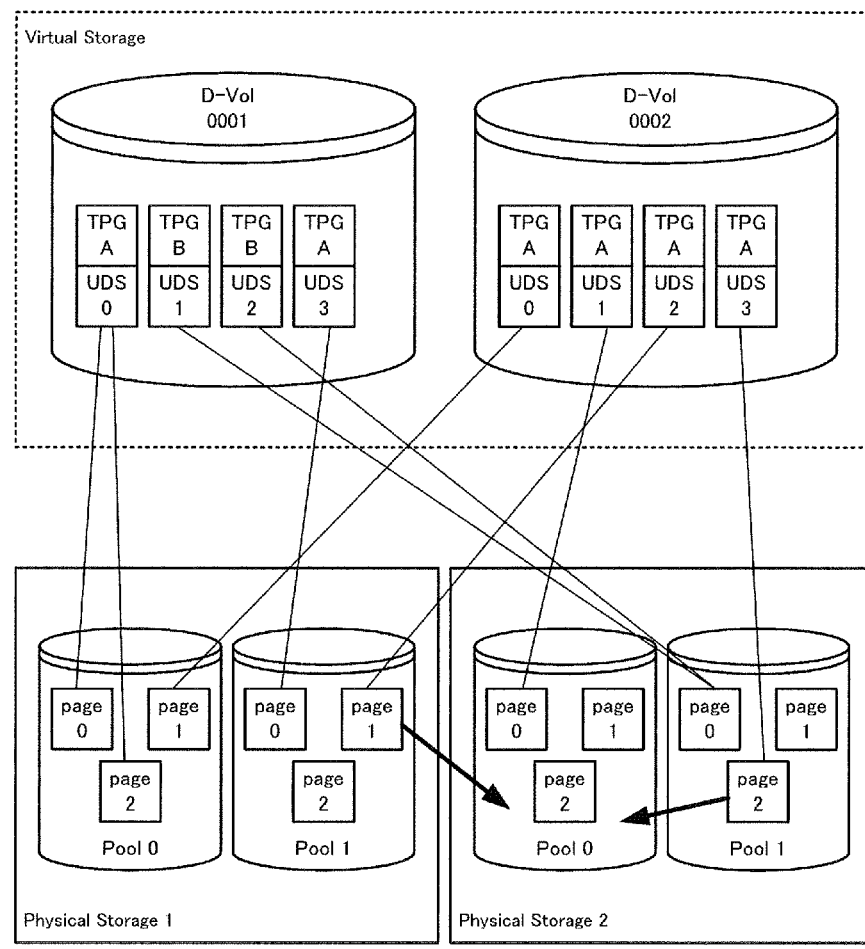
FIG. 42 is a block diagram showing one example of the correspondence between assigned pages of pools and distributed virtual volumes.

FIG. 42 is a view illustrating one example of the corresponding relationship of information of FIG. 41. The drawing of FIG. 42 omits the correspondence of the partial volumes constituting the distributed virtual volume. It illustrates the relationship between the UDS in the distributed virtual volume of the virtual storage device and the pages of a pool having a physical storage area within the physical storage devices.

A UDS can retain a plurality of pages, or a page can be retained astride two UDS. However, the two UDS must be linked when updating information if a domain is allocated or tier migration is performed. Further, a UDS can be formed of a page within a pool formed astride physical storage devices. However, since the host sends an IO request to the target port having the TPG number associated with the UDS, the IO request must be routed appropriately among physical storage devices. It is also possible to assign a plurality of pools having a plurality of different media types to a UDS. The arrows in the drawing indicates that the pool area of the storage tier is migrated within the device or among storage devices, so that pages having higher access frequency are migrated to a memory tier having higher performance.

Figure 43:
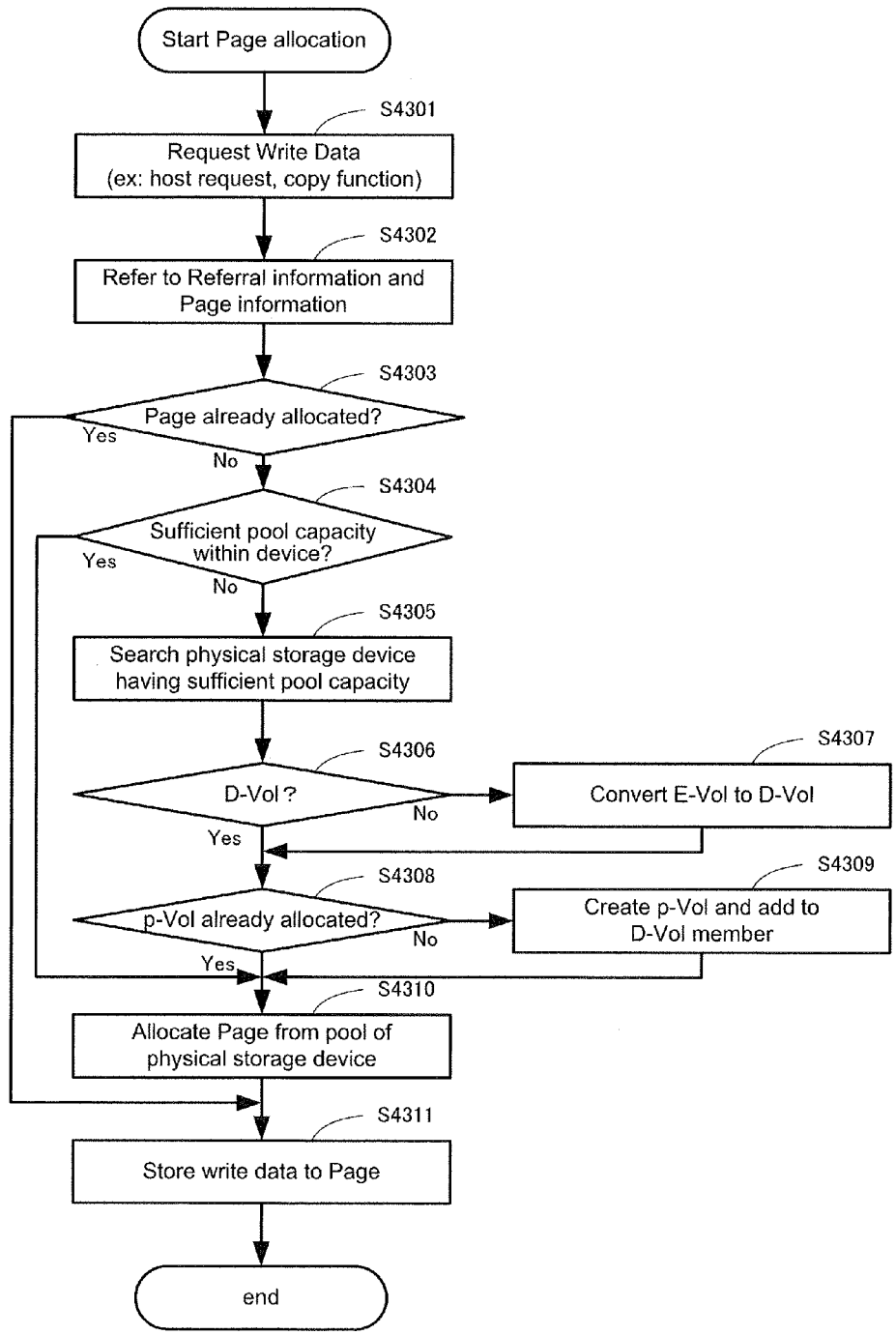
FIG. 43 is a flowchart showing a page assignment processing in a write request processing.

FIG. 43 is a flowchart of a write request in a capacity virtualized volume. The outline of the present sequence is described mainly related to the differences with the capacity allocation in a prior art independent physical storage device. According to the present sequence, if an allocation capacity could not be allocated within the physical storage device, the virtual storage device increases the number of physical storage devices and newly allocates a partial volume belonging to the distributed virtual volume and a new storage destination is allocated among physical storage devices.

At first, the physical storage device having the functions of a virtual storage device receives a copy function request from a host or within a virtual storage device or a write request such as a copy request from a virtual storage device of a different site (S4301). Next, the physical storage device searches an internal LU number based on the write command from the host, refers to the Referral information of the distributed virtual volume from the write request LBA, and searches for the UDS number (S4302).

Next, the physical storage device uses the UDS number acquired in the aforementioned step to refer to the page information and to determine whether a page has not been allocated or not (S4303). If a page has been allocated, the page allocation step is skipped and the procedure advances to S4311. If not, the procedure advances to S4304. Next, it is determined whether the pool capacity within the physical storage device is sufficient or not (S4304). If the capacity can be allocated within the physical storage device, the procedure advances to S4310. If not, the procedure advances to S4305 to perform allocation from other storage devices.

Thereafter, the virtual storage device searches another physical storage device having sufficient capacity. In the present step, if no other storage device exists, the device prompts the virtual storage device administrator to add a device or a capacity (S4305). Next, when the allocation of another physical storage device is determined, whether the type of the relevant volume having received the IO is a distributed virtual volume or not is determined (S4306). If the volume is a distributed virtual volume, the procedure advances to S4308. If the volume is an entity volume, the entity volume is converted to a distributed virtual volume in S4307 (S4307).

Next, the virtual storage device determines whether the partial volume of the distributed virtual volume belongs to the physical storage device planned to be subjected to page allocation (S4308). Now, if there is a partial volume, the procedure advances to S4310. If it is determined that there is no partial volume, the virtual storage device newly creates a partial volume and adds the same to the distributed virtual volume in S4309, and the procedure advances to S4310 (S4309).

In S4310, the physical storage device planned to be subjected to page allocation allocates a page of the write request. At this time, if a page must be allocated to the physical storage device that differs from the physical storage device having received the IO, the IO request is completed by the following two methods. One method utilizes a communication path 16 between physical storage devices to transfer the IO request received from the host to complete the process. The other method does not allocate pages in the present step, but the physical storage device having received the IO request returns a Sense Data Referral response to the host, and the host re-issues a command to another physical storage device having a page newly allocated thereto (S4310). Lastly, in S4311, the write data is stored in the newly allocated page (S4311).

Figure 44:
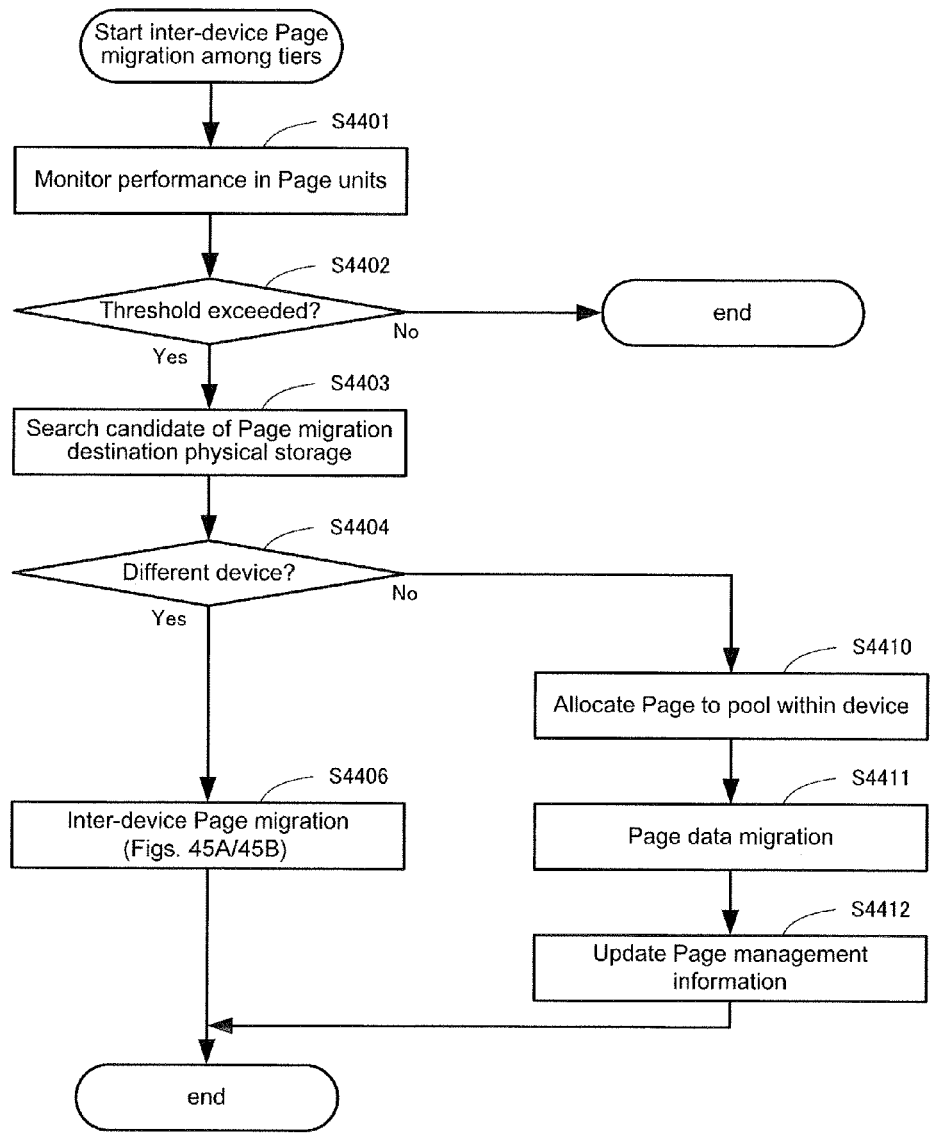
FIG. 44 is a flowchart showing page migration among storage tier pools among storage devices.

FIG. 44 is a flowchart of page migration when the function for tier migration of a page data among pools is adopted. At first, the storage device monitors the performance in page granularity and stores the same in a page information (S4401). For example, if a threshold of the required performance set by the administrator in advance is exceeded or if the access frequency is smaller than a threshold of reference frequency (Yes in S4402), the inter-pool migration of a page is started, and the page is migrated to a pool tier having a higher (or lower) performance. As for the page not subjected to the aforementioned determination, the process is ended without performing page migration (No in S4402).

Now, the conditions for determining the threshold values will be described. There are cases where it is determined that higher performance is required, and where it is determined that access rarely occurs and data is migratable to a pool having a lower performance. Examples of the performance includes the port throughput, the performance of the processor within the storage device, the transaction performance and so on. When an IO routing path as shown in FIG. 31 occurs in a distributed virtual volume, the performance of the communication path coupling the storage devices is also considered.

Next, an allocatable pool is searched. When a higher performance is required, an allocatable pool is searched from the pools having a superior performance based on media type (S4403). If capacity is insufficient, the pool is further searched from a different physical storage device. If the pool is determined to belong to a different physical storage device based on the search, the procedure advances to S4406 (S4404). Next, the process of allocating a pool to a different device will be described in detail with reference to FIGS. 45A and 45B (S4406).

Next, an example is described in which a pool is allocated to the same device. The physical storage device allocates a migration destination page in the pool within the physical storage device (S4410). Next, data is migrated from a migration source page to a migration destination page within the physical storage device. In this step, when an IO request of a new write data is received, the migration source page is synchronized with the migration destination page within the physical storage device (S4411). The details of the present step will be described later with reference to FIGS. 45A and 45B. Next, the storage device changes the association between the page number and the UDS number of the page information and ends the present flowchart (S4412).

Figure 45A:
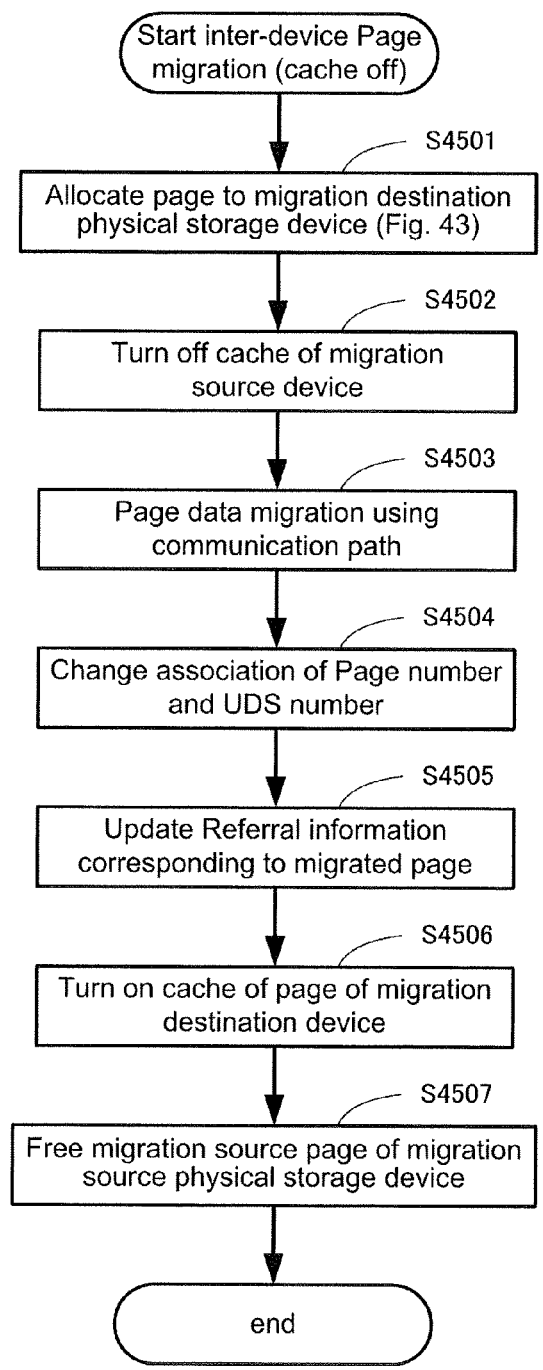
FIG. 45A is a flowchart showing the page migration among storage devices.
Figure 45B:
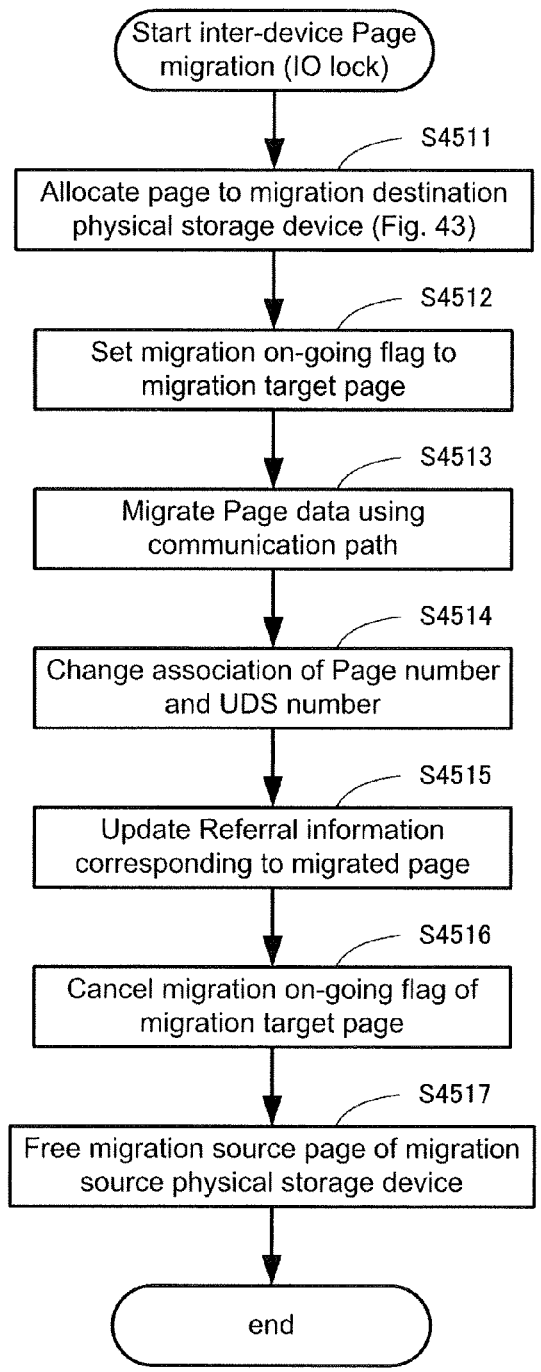
FIG. 45B is a flowchart showing the page migration among storage devices.

FIGS. 45A and 45B are flowcharts showing the migration of a page arranged astride physical storage devices. FIG. 45A shows steps for confirming consistency by turning the cache mechanism of the storage device off and performing write-through in page granularity (or UDS granularity) to be migrated in the distributed virtual volume.

At first, the virtual storage device allocates a page via the procedure described in FIG. 43 to the migration destination physical storage device (S4501). Next, the virtual storage device turns the cache of the physical storage device off with respect to the page being the target of migration of the migration source physical storage device. Further, as for the migration destination physical storage device, the cache of the relevant page is turned off. The flat is set during migration of the page information (FIG. 41) to share the information that the cache is turned off between the migration source and migration destination physical storage devices (S4502).

Next, the virtual storage device copies the page using communication path from the migration source physical storage device to the migration destination physical storage device. At this timing, the Referral information is not yet updated, and the host issues to the migration source storage device an IO request to be issued with respect to the migration target page, so that when the data stored in a page is updated via the write request, the information is reflected via write-through also in the migration destination storage device (S4503).

Next, the virtual storage device updates the entry related to the migrated page of the Page information. The entry of the migrated page is moved from the migration source storage device pool to the migration destination storage device pool. The page address field stores the address of the pool area allocated in S4501. The UDS and the internal LU number field are not changed from the previous entry (S4504).

Next, the virtual storage device updates the Referral information 1114. The TPG number field of the UDS entry related to the migrated page is changed to the TPG number of the target port of the migration destination storage device. Further, the virtual storage device notifies the update of the Referral information via a plurality of means described with reference to FIG. 3 to the host (S4505).

In S4505, the host issues an IO request to the migration destination storage device. When inconsistency temporarily occurs between the Referral information of the distributed virtual volume and the host Referral information, the host may issue an IO request related to the migrated page to the migration source storage device. In that case, as shown in FIG. 3, a response is sent to request re-issuing of the IO request to the migration destination storage device via Referral Sense Data response, as described with reference to FIG. 3.

Next, the virtual storage device turns the cache of the physical storage device on with respect to the migration target page of the migration destination physical storage device. At this time, a migration on-going flag of the page information is reset (S4506). Lastly, the page of the page number of the migration source page information is freed so as to free the allocation to the migration source page, and the page is returned to the pool as an unallocated page (S4507).

In the present migration steps, all the pages other than the migration target page do not influence the update of various information and the on/off of the cache of the storage device. When the migration source storage device receives a new write request from the inter-device migration of page data (S4503) to the Referral information update (S4505), data must be migrated again to the migration destination storage device using the communication path between storage devices (synchronization of page data of two storage devices via cache off).

It is also possible for the step (S4503) of data migration among storage devices and the steps (S4504 to S4505) of updating Referral information to adopt a process of first switching the associated physical storage devices receiving the IO request and then migrating data. When the migration destination storage device receives the host IO prior to migration of page data among storage devices, it is necessary to perforin routing of host IO as shown in FIG. 31 using the communication path coupling the storage devices.

FIG. 45B ensures consistency by temporarily locking the host IO prior to and after page migration in page granularity (or UDS granularity) migrated among partial volumes in the distributed virtual volume. The differences with respect to FIG. 45A will be described. The first step is the same as S4501 (S4511).

Next, the virtual storage device sets a migration on-going flag of the page information so as not to execute the IO request to the migration target page. This information is shared among the migration source and migration destination physical storage devices (S4512). Steps S4513 through S4515 respectively correspond to steps S4503 through S4505. When a host IO request related to the migration target page is received between steps S4513 and S4514, the migration source storage device puts the on waiting until the Referral information is updated in S4515.

Further, when step S4515 is completed, the migration source storage device sends a Referral sense data response and changes the communication path to the migration destination storage device. During this IO waiting time, the granularity of migrated data is page granularity, and not the whole cache data related to the volume, so the time required for migration is extremely short and no host IO time out occurs.

Next, the virtual storage device resets the page information migration on-going flag of the page being the target of migration of the migration destination physical storage device (S4516). In S4516, the host issues an IO request related to the target page to the migration destination storage device. Further, the migration destination storage device performs a normal response regarding the page having completed migration. S4517 is the same as S4507.

According to inter-device volume migration of a prior art storage device, the IO issue destination of the whole volume is changed to a different physical storage device, so it was necessary to perform consistency control of all the dirty data in the cache of the migration target volume. However, in the present embodiment, regarding the page not being the migration target, the host can issue an IO request to an appropriate physical storage device via the Referral information. Therefore, the page prior to migration or after completing migration does not have to be subjected to consistency control. Only the page being migrated should be subjected to control of the host IO reception timing of the migration source and migration destination physical storage devices.

Further, since the page capacity is extremely small compared to the real data capacity of the whole distributed virtual volume, and migration operation can be completed in an extremely short time, migration is completed in a relatively short time not causing host IO timeout when exclusive control of the host IO is temporarily executed during migration (pending of host IO request) instead of performing cache control. Further, the consistency control of page migration is used in common for all page migration procedures in all embodiments.

Figure 46:
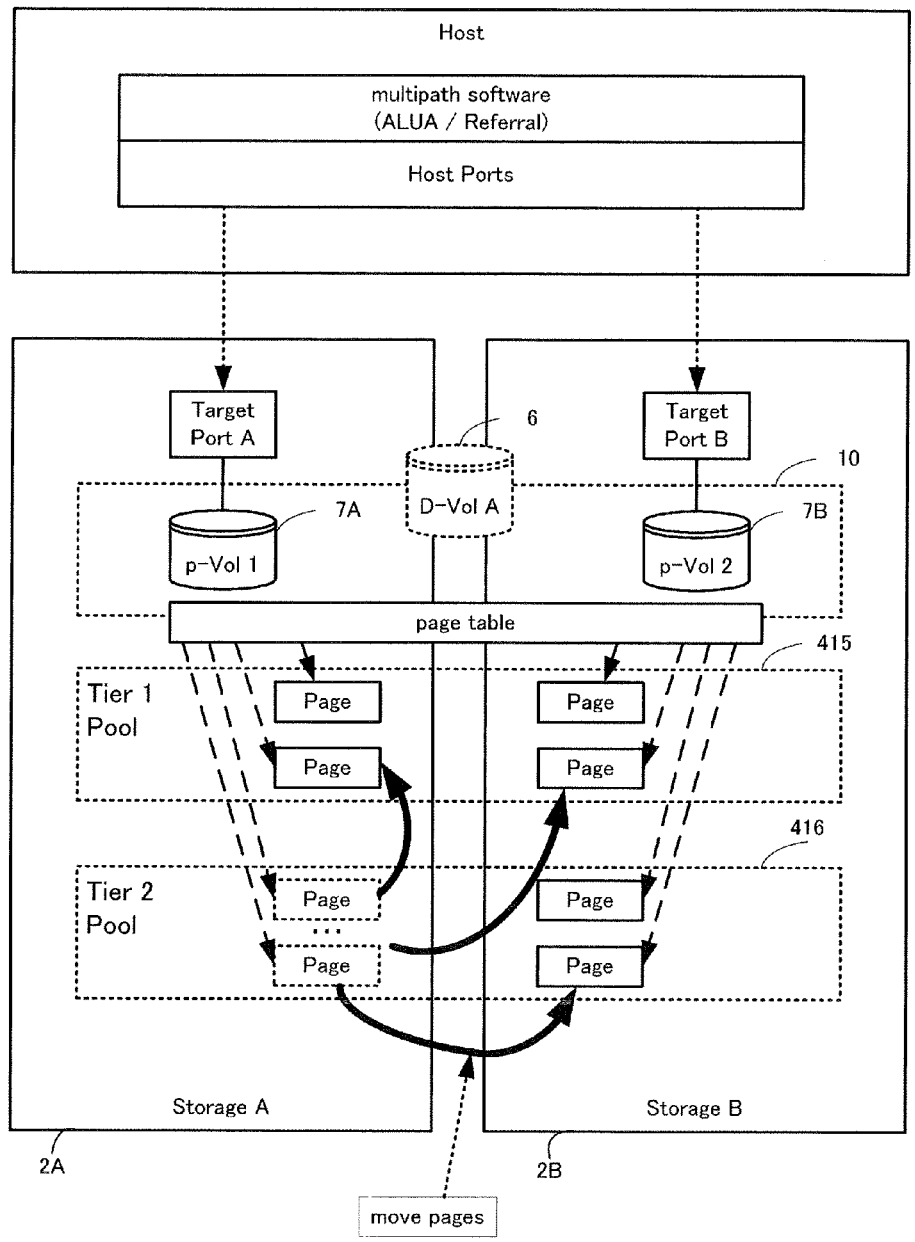
FIG. 46 is a block diagram showing one example of page migration among storage devices.

FIG. 46 is a drawing showing a virtual storage device performing page migration among storage devices and performing tier control among storage devices. By combining the inter-page allocation, tier migration and inter-device page migration described with reference to FIGS. 43 to 45B, the page migration within the device, inter-device page migration among tiers and inter-device page migration within the same tier as shown in FIG. 46 can be performed.

Figure 47:
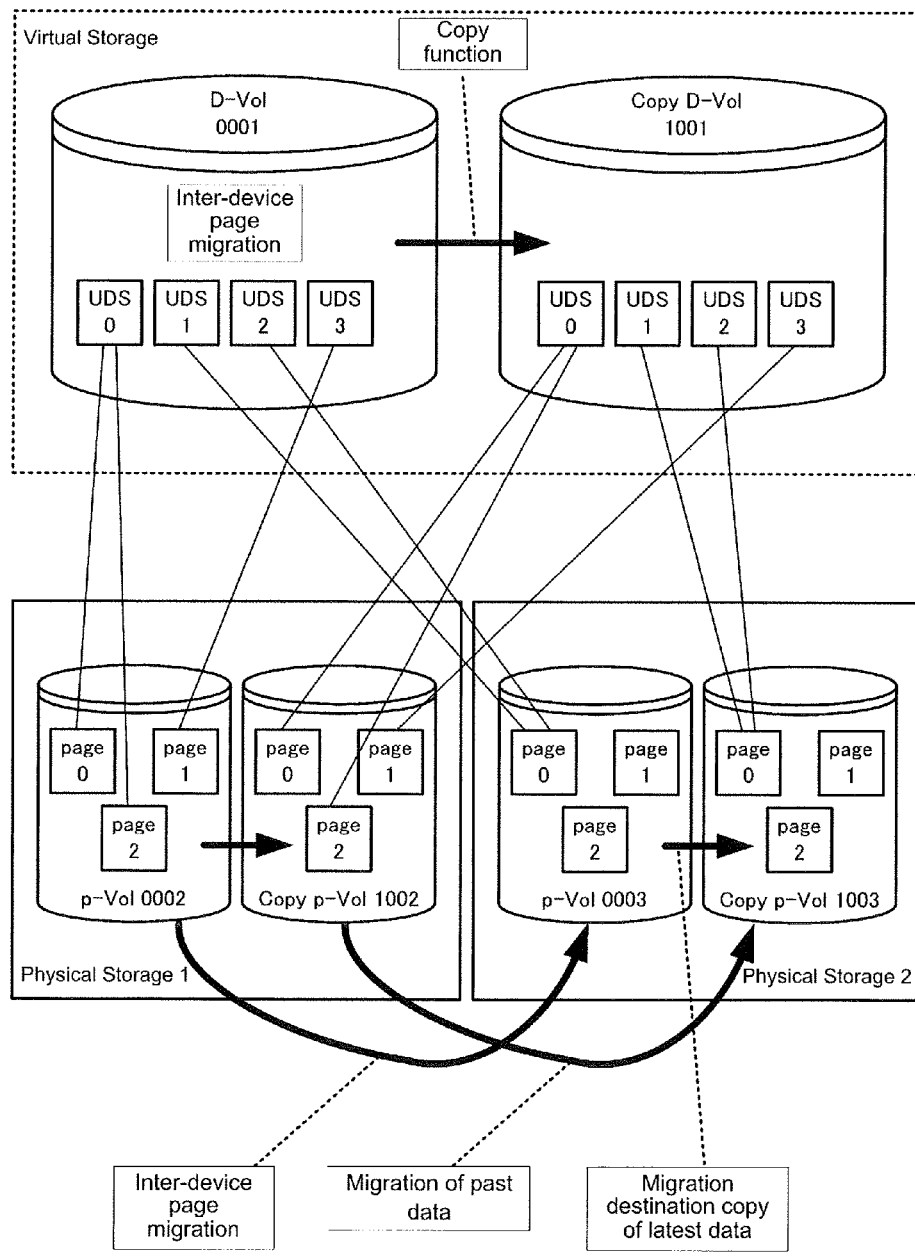
FIG. 47 is a block diagram illustrating the relationship between the distributed virtual volume and partial volume having applied a volume copy function or a snapshot function.

FIG. 47 is a view showing the relationship between a virtual volume and a partial volume when the volume copy function or the snapshot function are applied to the distributed virtual volume. The arrow from the copy source volume to the copy destination volume of the virtual storage device illustrates copying of data via a volume copy or a snapshot.

Similarly, the copy function can be operated by creating a copy destination partial volume corresponding to the copy source partial volume and handling the partial volume similarly as the prior art volume within the physical storage device. When the page in a partial volume of a copy source is migrated to another partial volume, the page of the partial volume related to the copy volume is also migrated following the migration. Thereby, the page can be migrated to a partial volume of another device while maintaining the snapshot information of other generation.

FIG. 48A is a flowchart showing a case where the volume copy function or the snapshot function is applied to a distributed virtual volume. At first, when the administrator of the virtual storage device applies a copy function to the distributed virtual volume, the virtual storage device creates a distributed virtual volume of the copy destination (S4801). Next, the virtual storage device creates a copy destination partial volume corresponding to each partial volume of the copy source distributed virtual volume so as to form pairs (S4802). Next, the virtual storage device allocates a page having necessary capacity to create a copy to each partial volume of the distributed virtual volume of the copy destination (S4803). Next, for each partial volume of the copy source distributed virtual volume, the virtual storage device applies the copy function to the copy destination partial volume forming pairs created in S4802 within each physical storage device (S4804).

Figure 48B:
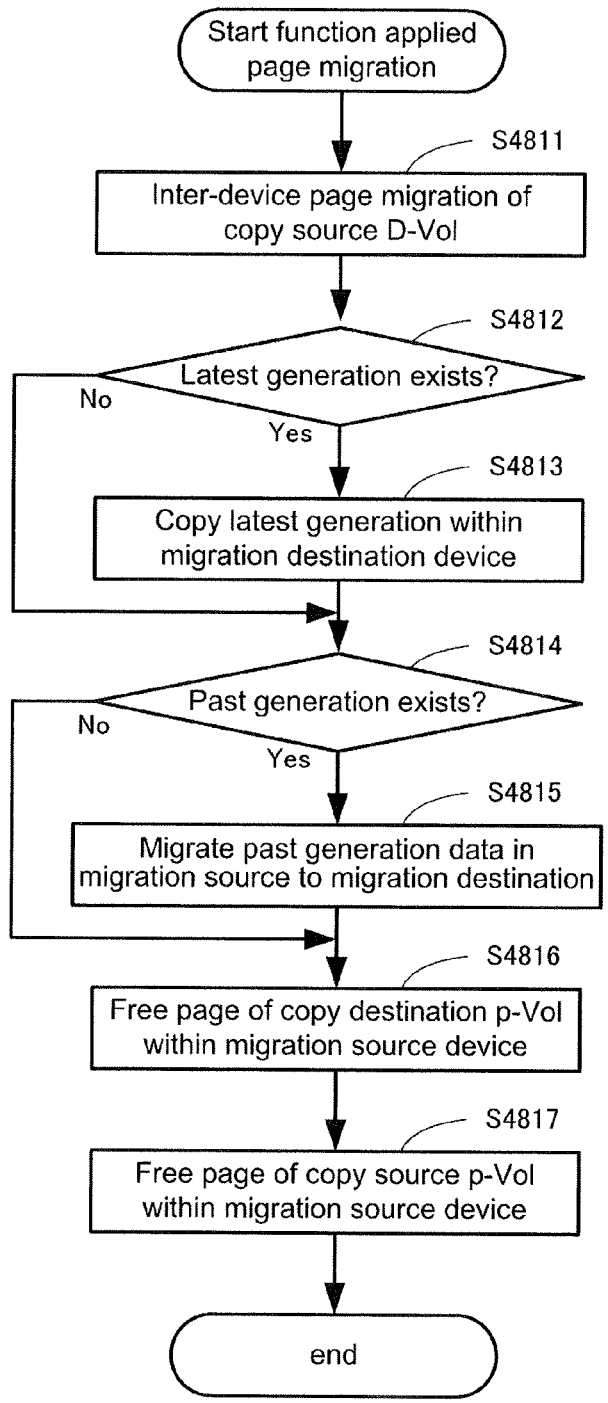
FIG. 48B is a flowchart showing the distribution volume processing having applied the volume copy function or the snapshot function.

FIG. 48B is a flowchart showing the case where the data of the distributed virtual volume having a volume copy function or a snapshot function applied thereto is migrated among storage devices. Now, the copy function is classified mainly into a synchronized copy in which the current generation data is constantly backed up, and a copy function in which the past generation is stored in the copy destination volume. The copy of the whole volume can include multiple generations of volume. In order to simplify the explanation, the operation performed by the copy source volume upon performing inter-device page migration is described for the latest generation copy function and the past generation copy function.

At first, the virtual storage device performs page migration among storage devices of the distributed virtual volume of the copy source (primary VOL) (S4811). Thereafter, it is determined whether the latest generation copy function is activated or not (S4812). When the latest generation copy function is activated, the procedure advances to S4813, and if not, the procedure advances to S4814.

Next, the virtual storage device performs data copy of the latest generation from the migration destination partial volume to the copy destination partial volume within the physical storage device for page migration of the copy source distributed virtual volume (S4813). At this time, the virtual storage device does not perform migration of copy data among storage devices, but performs data copy within the device, by which the traffic of inter-device communication is reduced.

Thereafter, the virtual storage device determines whether the past generation copy function is activated in the copy source distributed virtual volume (S4814). When the past generation copy function is active, the procedure advances to S4815, and if not, the procedure advances to S4816. Next, regarding the copy destination distributed virtual volume storing the past generation data, the virtual storage device migrates among storage devices the past generation data of the same segment as the migrated page of the copy source volume (S4815).

Next, the virtual storage device frees the page having been migrated of the copy destination partial volume within the migration source physical storage device (S4816). Then, the virtual storage device frees the page having been migrated of the copy source partial volume within the migration source physical storage device (S4817). Here, the order of the steps is not determined, excluding the order of the migration step and the freeing step. During migration, the consistency in an undetermined state during migration is maintained using the migration on-going flag of page information.

Thereby, the volume copy function and the snapshot function are activated for the distributed virtual volume. Further, the inter-device page migration of the distributed virtual volume can be performed while activating the copy function.

Figure 49:
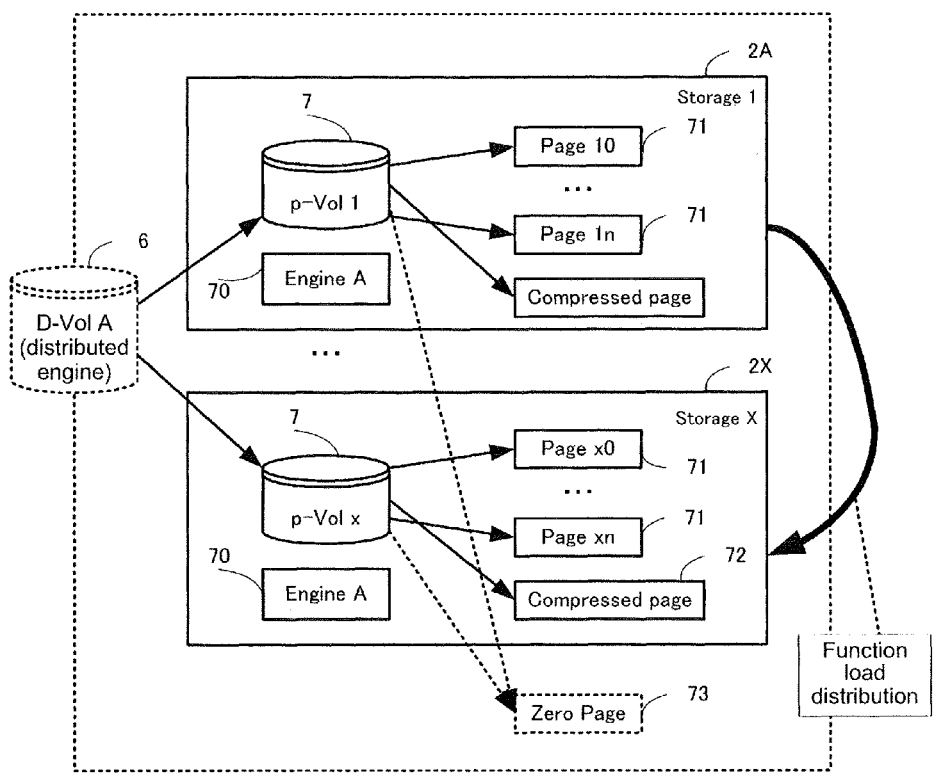
FIG. 49 is a block diagram showing one example of a distributed virtual volume configuration having applied a data compression function.

FIG. 49 is a drawing showing an example where load distribution is performed when activating a function with respect to the system of a plurality of storage devices having a data compression function and a data search function. The present example is restricted to a case where the function program within the storage device can be activated in the storage device in which the partial volume 7 is located. Actually, the data page 41 stored in the partial volume is not in dependent relationship with the data page 41 of the partial volume 7 of other storage devices. Since the definition of a format page (shown as Zero Page in the drawing) 73 accompanying capacity allocation is the same in all storage devices, it is not necessary to perform a special process by communicating data among storage devices.

The virtual storage device can perform load distribution of high load functions dynamically to a plurality of storage devices by adopting a performance of function engine of the physical storage device.

Figure 50:
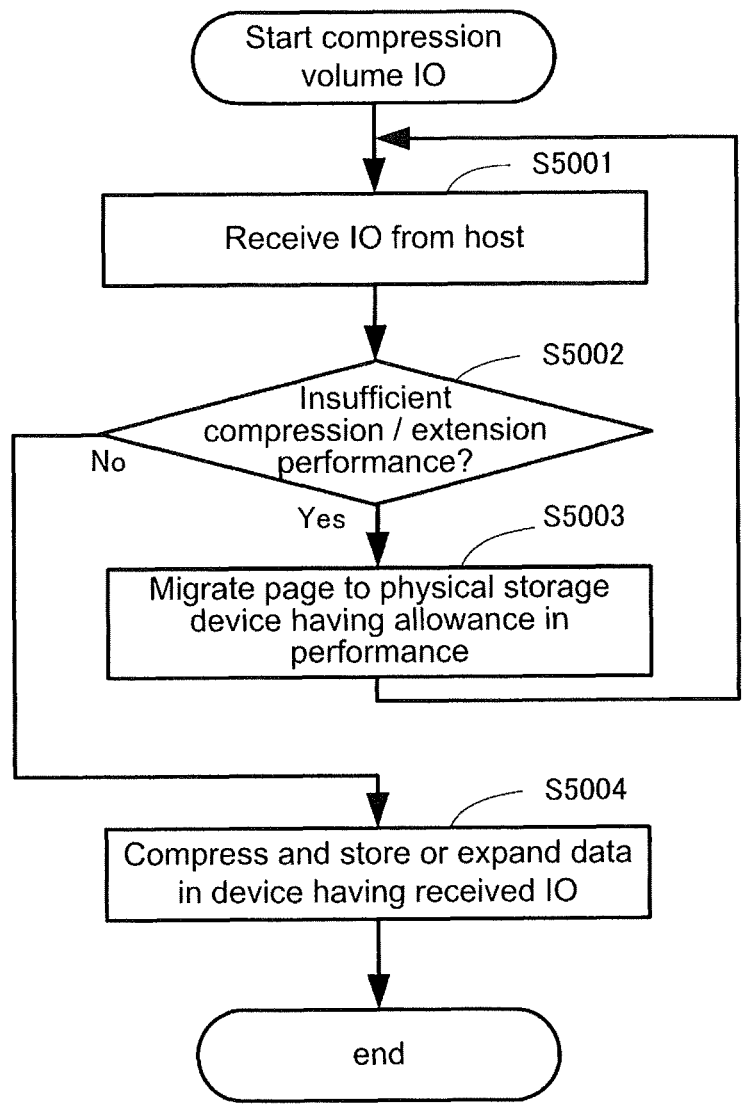
FIG. 50 is a flowchart showing a dynamic load distribution processing of the distributed virtual volume having applied the data compression function.

FIG. 50 is a flowchart performing load distribution of functions in a distributed virtual volume having applied the functions of the storage device as shown in FIG. 49. At first, the virtual storage device receives an IO from the host (S5001). Next, the physical storage device having received the host IO determines whether the performance of the function engine such as compression is insufficient or not. When there is allowance in performance, the procedure advances to S5004. If not, the procedure advances to S5003.

Next, the virtual storage device searches a physical storage device having sufficient allowance of performance, and performs page migration among storage devices (S5003). In the present step, if necessary, the addition of partial volume of FIGS. 39A and 39B, the inter-device page allocation of FIG. 43, the tier migration of FIG. 44 and the inter-device page migration of FIGS. 45A and 45B are performed. The host IO request received by the virtual storage device is re-issued to another device, and the procedure returns to S5001. The physical storage device having sufficient allowance of performance receiving the host IO performs functions such as compression, expansion or search, and processes the host IO before returning a normal response to the host (S5004).

Figures 51, 52A:
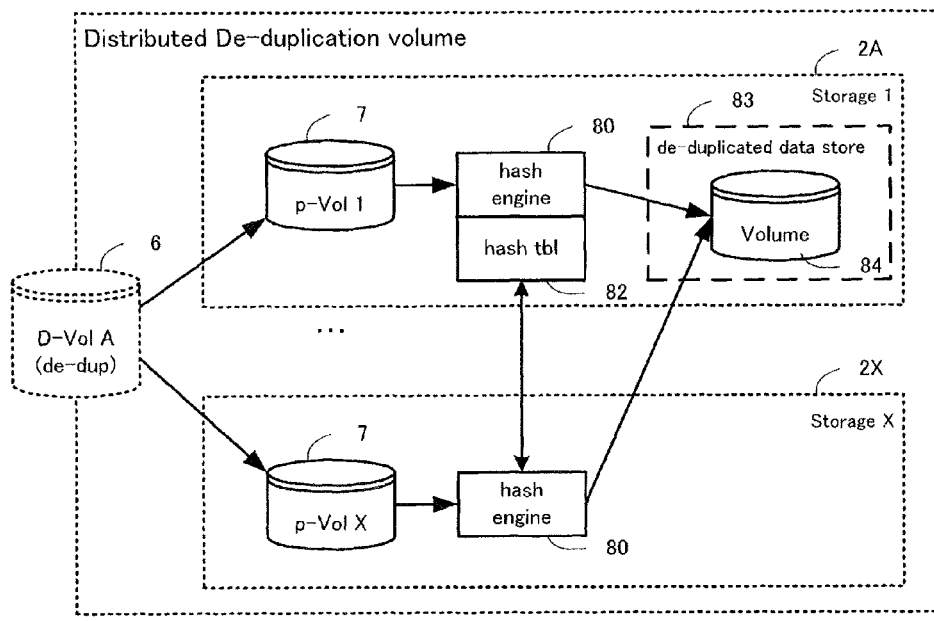
FIG. 51 is a hash table having associated the data hash value and data storage destination in a distributed virtual volume having applied the de-duplication function.
FIG. 52A is a block diagram showing one example of configuration of a distributed virtual volume having applied the de-duplication function.

FIG. 51 is a hash table associating the data hash value and data storage destination in a distributed virtual volume having applied a de-duplication function. When the de-duplication function is activated in a distributed virtual volume, it is necessary to denote the data storage destination to another storage device storing the same data, as described later with reference to FIGS. 52A and 52B. Therefore, arrangement information that differs from the page information described in FIG. 41 becomes necessary.

The hash table is not associated with the partial volume constituting the distributed virtual volume. The Referral information defining the partial volume only determines the associated physical storage device of the IO issue destination in order to perform load distribution of the physical storage device, and actually, the hash table is referred to for obtaining the data storage destination information.

The hash table has fields of a storage destination internal LU number, a storage destination storage device number, and a storage destination address information for each hash value of the result having performed hash calculation of data. Further, in order to search the storage destination during reading of data, a list storing one or more LBA of the distributed virtual volume is provided. When there are two or more data, it means that data de-duplication was performed as a result of determination of the same data.

Figure 52B:
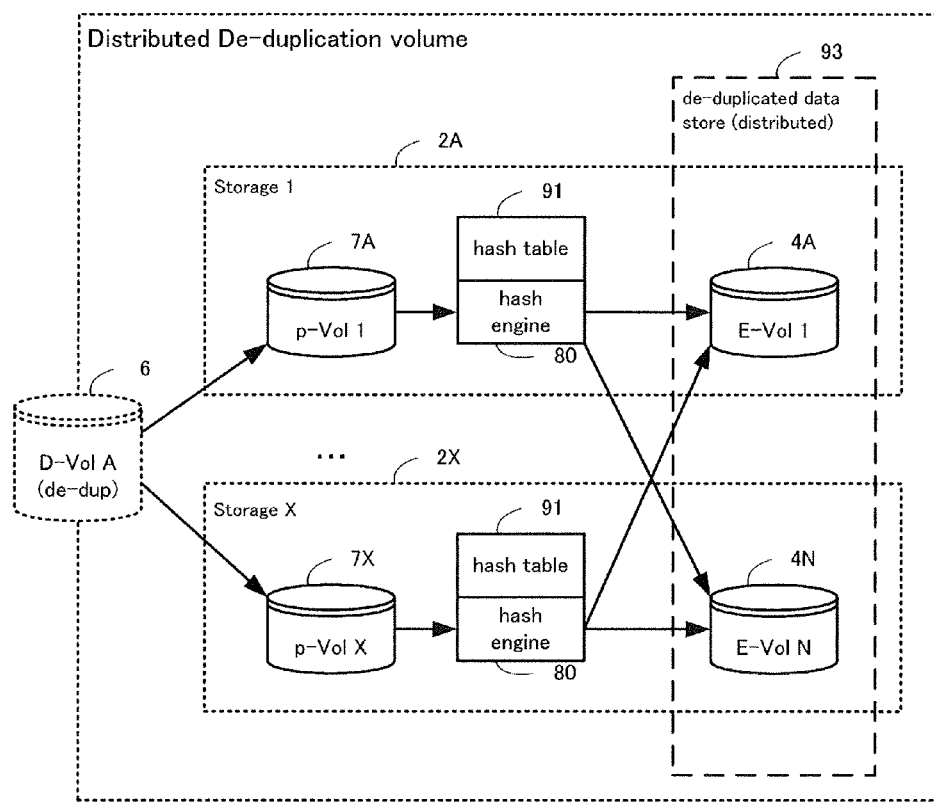
FIG. 52B is a block diagram showing one example of a distributed virtual volume configuration having applied the de-duplication function.

FIGS. 52A and 52B illustrate a function of the storage device, which is the load distribution processing of the real volume for executing the data de-duplication processing. FIG. 52A is a view showing an embodiment of load distribution of a de-duplicated volume. The host issues an IO request to the plurality of storage devices directly via the distributed virtual volume. Each storage device uses a hash engine 80 independently to execute the IO processing. The hash engine 80 of each storage device 2 refers to a shared hash table 82 and stores data in or reads data from a cluster volume 84.

If the write request relates to a new data page, a new storage destination is allocated in the cluster volume 84 and the data page is written thereto. In the write request, when identical data are detected, a pointer points to the real data page of the cluster volume 84. At this time, other storage devices can access the storage device having the cluster volume using the communication path coupling the storage devices. In FIG. 52A, in case the hash engine processing relatively requires a processing ability compared to the cluster volume performance or the communication of shared information on the communication path coupling the storage devices, the effect of storage device distribution is exerted.

FIG. 52B shows another embodiment of load distribution of a de-duplication volume. The difference between FIG. 52B and FIG. 52A is that in the present drawing, the data storage destination is distributed across the whole storage device.

If the write request is a new data page, a new storage destination is allocated in a data store 93 and the data page is written thereto. When identical data are detected in the write request, a pointer is set to point to the real data page of the data store 93. At this time, the other storage device accesses the storage device having the cluster volume using the communication path coupling the storage devices. Further, the hash table 91 is shared by a plurality of storage devices so that the same information can be acquired from the hash engine of any storage device.

When the hash table 91 is referred to during reading of data, identical data may be stored in the storage device that differs from the storage device associated with the partial volume 7 having issued the IO request based on the SCSI Referral.

At this time, there are two methods of the procedure for reading data. One method performs reading of data among storage devices using the communication path coupling the storage devices and then returning the read data to the host. Another method first prompts a retry request to the host in a Referral response since it is possible to determine which storage the data is stored in based on the hash table 91. Thereafter, the host uses the TPG information stored in the Referral response to switch the IO issue path to a storage that differs from the initial IO storing the real data via de-duplication, and issues an IO request.

According to the former operation flow, the communication path coupling the storage devices is consumed. According to the latter operation flow, the host must re-issue the IO based on the Referral response, but the bandwidth of the communication path between storage devices is not consumed by the read data. Whether to choose which operation flow to process the IO request should be selected by the storage device having received the IO request based on the size of the read IO request and the bandwidth load of the communication path between storage devices to determine whether the process should be performed within the present storage device or send a response to the host to re-issue the IO request to another storage device.

Figure 53:
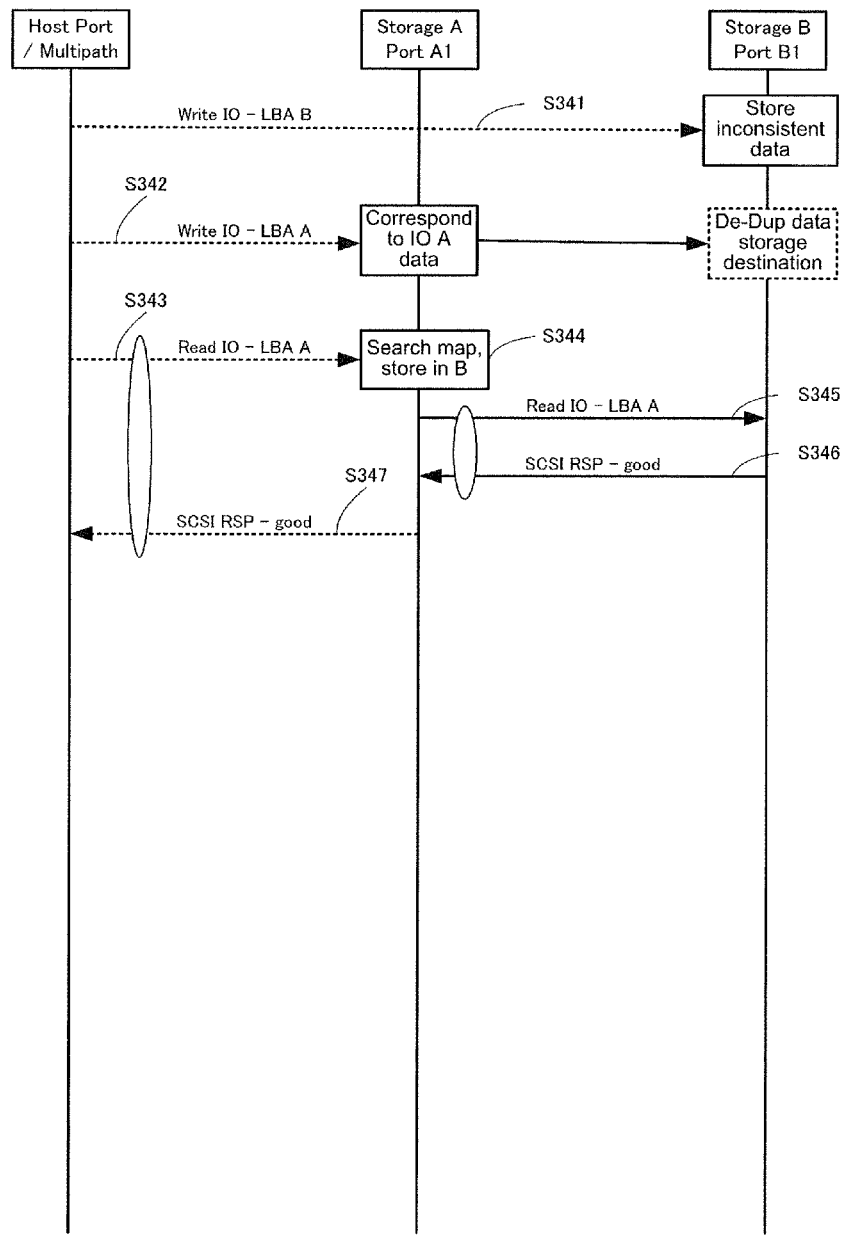
FIG. 53 is a ladder chart showing the distributed virtual volume processing having applied the de-duplication function.

FIG. 53 is a ladder chart illustrating the IO processing procedure between storage devices in a distributed virtual volume for operating the de-duplication function described in FIG. 52A. The host issues a write command to the LBA (Logical Block Address) B. At this time, when the host refers to the Referral of the distributed virtual volume 6 having been acquired in advance, the LBA B corresponds to the partial volume 7B stored in the storage device 2B. Therefore, the write command of LBA B is issued using the path connected to storage device 2B (S341).

As a result of executing the hash engine processing, the storage device recognizes that the data does not correspond to the already-stored data and therefore does not correspond to de-duplication, so a new page is allocated to the storage device 2B and the data received via the write command S341 is stored therein. Thereafter, the host issues a write IO request to another LBA A. At this time, by referring to the Referral that the host has, the host recognizes that LBA A is an IO request that should be issued to the storage device 2A. Therefore, the host issues the write IO request through the path connected to storage device 2A (S342).

At this time, it is assumed that by processing the write data received by the storage device 2A via the hash engine, the data has corresponded with the data of the IO request A. In this case, since the data storage destination is storage device 2B, when the area of LBA A is to be read, the data must be read from the storage device 2B.

According to this process, the Referral information that the host or the distributed virtual volume has will be inconsistent with the position of the page assigned via de-duplication. When the host issues a read IO request to the LBA B, the Referral information and the mapping of de-duplication correspond, and the IO request being issued to the storage device 2B should read the data page assigned to the storage device 2B and complete the process (not shown in FIG. 53).

Next, an example is described in which the host executes the reading of data with respect to LBA A. The host issues a read IO request with respect to the LBA A. At this time, by referring to the Referral information that the host has, the host should issue the IO to the associated storage device 2A. Therefore, the host issues a read IO request of LBA A to the storage device 2A (S343). The storage device 2A having received the aforementioned IO request refers to the de-duplication page management table. Here, it is found that the data storage destination storage device is 2B (S344).

Next, the storage device 2A issues an IO request to the storage device 2B via the communication path 16. The storage device 2B reads data from the data storage destination (S345), and returns the read out data and response (S346). Next, the storage device 2A returns the data read from the storage device 2B and a response to the host (S347).

According to this procedure, when the size of the IO request is large, the communication path 16 between storage devices will become the bottleneck. Therefore, according to the length of the IO request, it may be suitable for the multipath software of the host to issue an IO read request of the LBA A directly to the storage device 2B.

Figure 54:
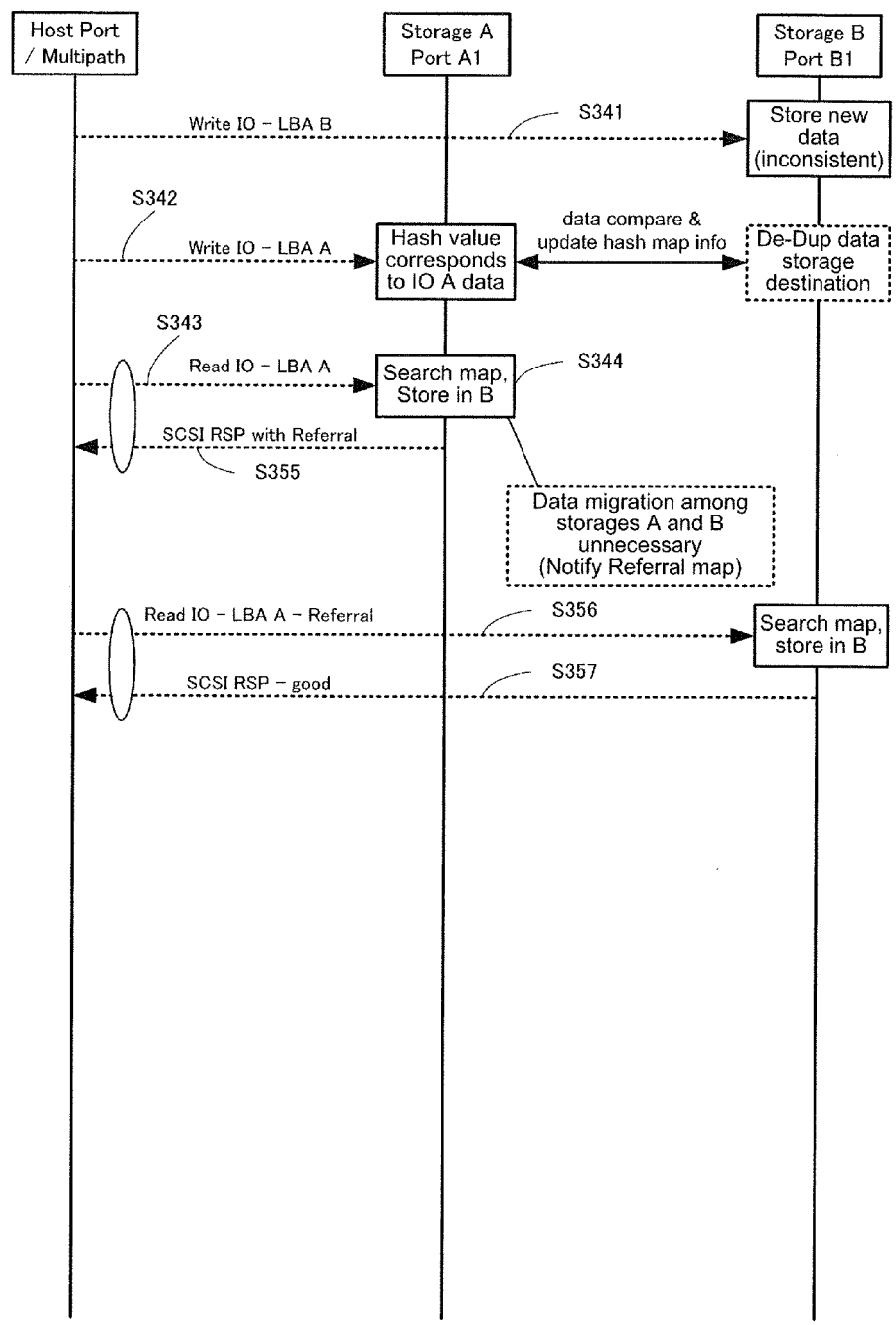
FIG. 54 is a ladder chart showing the distributed virtual volume processing having applied the de-duplication function.

FIG. 54 is a ladder chart showing the IO processing procedure between storage devices in a distributed virtual volume having the de-duplication function activated. The conditions of FIG. 53 apply to steps S341 through S344 of FIG. 54, so the descriptions thereof are omitted.

After S344, the storage device 2A returns a response including Referral information stating that an IO request to the storage device 2B is required to the multipath software and requests that the IO request is re-issued (S355). Then, the host having received the SCSI Referral response in S355 analyzes the response and re-issues a current IO request to the storage device 2B restricted only to the current IO request. The host re-issues the IO request only in this case since the current IO request is associated with the Referral response (S356).

The storage device 2B reads the data of LBA A that is stored therein (data matched via de-duplication) from the data page, and sends a response to the host without having the storage device 2A intervened (S357).

The difference between the response methods of FIGS. 53 and 54 is the tradeoff of the amount of traffic of the communication path 16 and the increase in the number of retries by the host. The storage device can selectively use both the sequences of FIGS. 53 and 54 by calculating the amount of traffic of the IO and the amount of traffic of the data.

Figure 55:
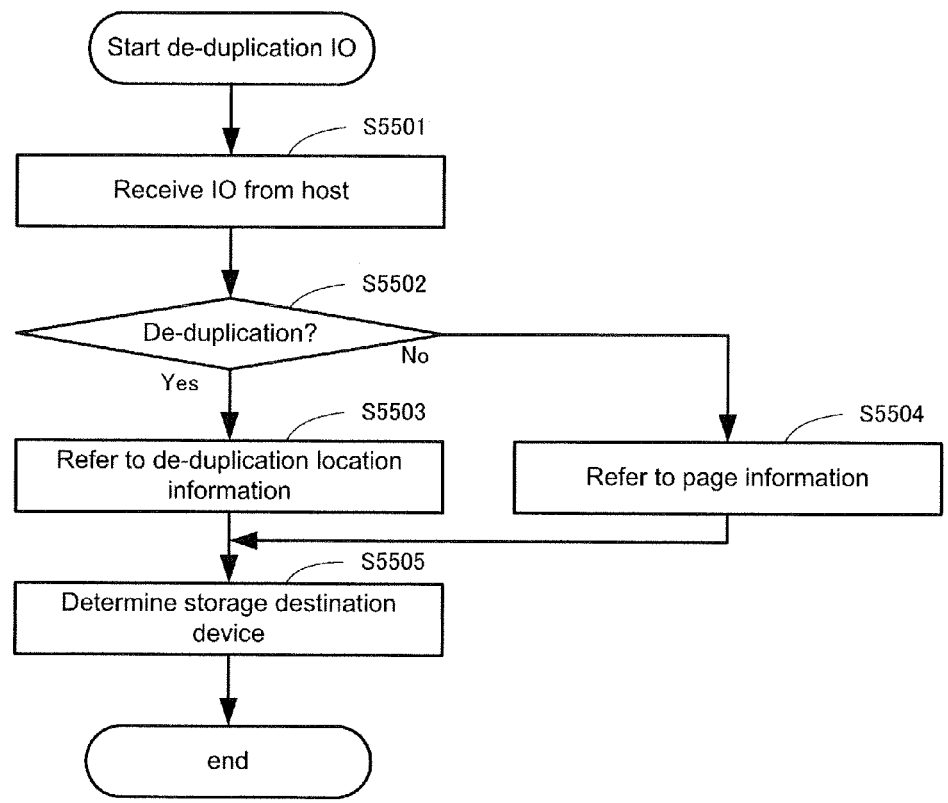
FIG. 55 is a flowchart showing the host IO processing of the distributed virtual volume having applied the de-duplication function.

FIG. 55 is a flowchart of the host IO when a de-duplication function is applied to a distributed virtual volume. First, the virtual storage device receives an IO request from the host (S5501). Next, it is determined whether the volume has a de-duplication function applied thereto (S5502).

If the volume is a de-duplication volume, a hash table (FIG. 51) storing a de-duplication storage destination information and hash value information (FIG. 51) is referred to. In the case of a write request and the data is determined as an identical data, the address list field is updated. In the case of a write request and the data is determined to differ from the already stored data, the storage destination area is allocated from a pool and data is stored therein. In the case of a read request, the address list is searched to acquire the storage destination device or volume and the address (S5503).

If the volume does not have an active de-duplication function, the page information (FIG. 41) is referred to (S5504). By referring to each information, the storage destination is determined and the IO request is completed (S5505).

Figure 56:
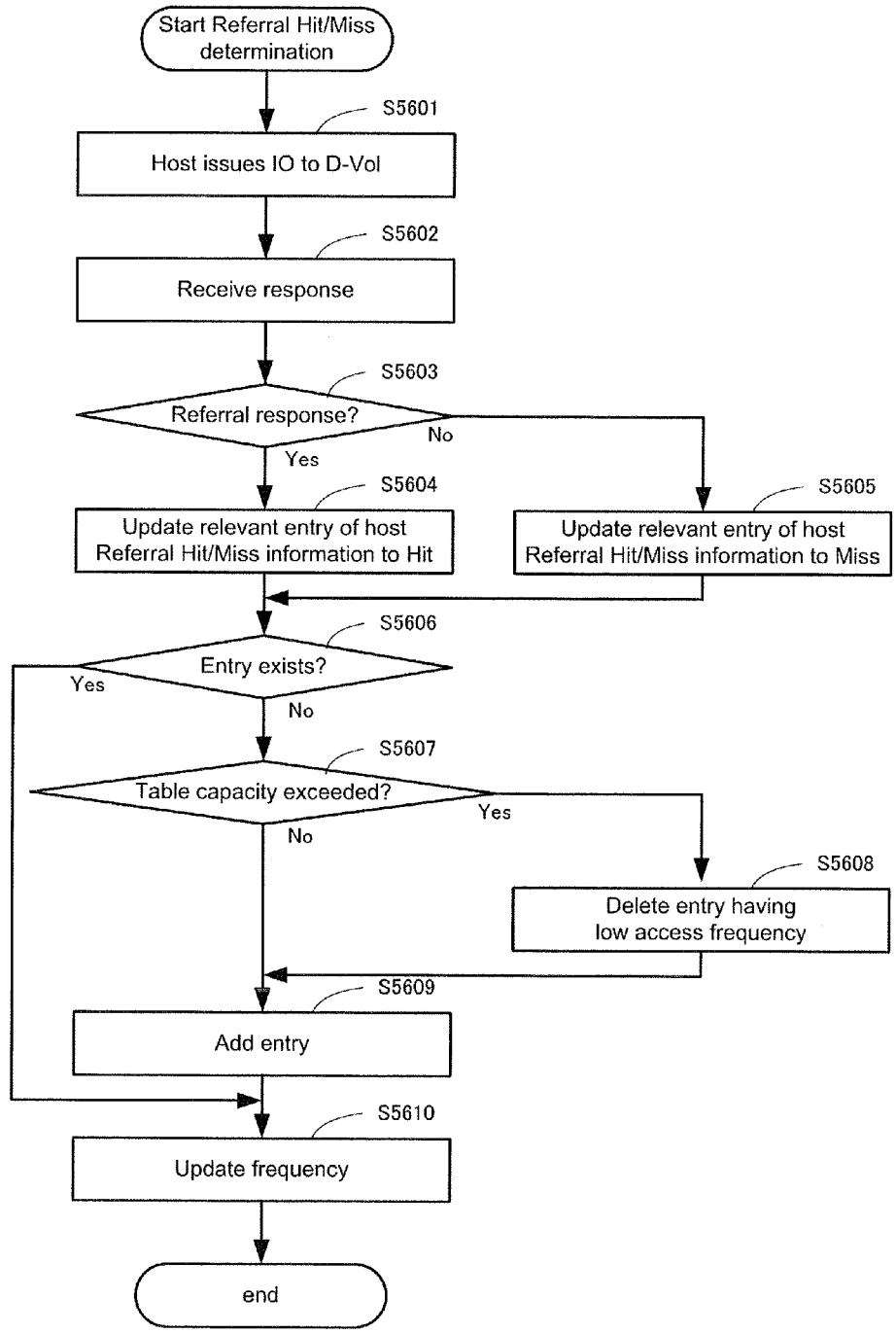
FIG. 56 is a flowchart showing the update processing of management information of the host.

FIG. 56 is a flowchart illustrating the update procedure of the Referral Hit/Miss information of the host according to an IO request illustrated in FIG. 3C. According to the present embodiment, the host does not have the Referral information of all entries. Therefore, when issuing an IO request to the distributed virtual volume, an IO request may be issued to the unassociated physical storage device. In that case, it is necessary to re-issue the IO or to split the IO request. In order to suppress the occurrence rate of re-issuing of the IO, a method for predicting the IO request issue destination using the host Referral Hit/Miss information will be described.

First, the host issues an IO request with respect to the distributed virtual volume (S5601). Next, the physical storage device sends an IO request to the host. At this time, when the physical storage device is not the associated device, a request to re-issue an IO is prompted to the multipath software of the host via Referral Sense Data response. When the physical storage device is the associated device, a good response is sent. The host receives the response to the IO request (S5602).

Thereafter, the multipath software of the host determines whether the response was a good response or not (S5603). If the response was a good response or other error responses, the procedure advances to S5604, and if the response was via the Referral sense data, the procedure advances to S5605. In S5604, the multipath software of the host sets up a hit flag with respect to the entry of the issue destination TPG belonging to the entry of the relevant UDS of the host Referral Hit/Miss information, and the procedure advances to S5606 (S5604).

In S5605, the multipath software of the host sets up a miss flag with respect to the entry of the issue destination TPG belonging to the entry of the corresponding UDS of the host Referral Hit/Miss information, and advances to S5606 (S5605). If there is no corresponding entry in the aforementioned step, adding of an entry is prepared and the procedure advances to S5607 (S5606). When a corresponding entry exists and the update of a flag is completed, the procedure advances to S5610.

In S5607, the multipath software of the host determines whether the table capacity has been exceeded (S5607). Now, if a capacity has been exceeded, the procedure advances to S5608, an entry having a low access frequency is deleted to free the capacity, and the procedure advances to S5609 (S5608). If a free capacity exists, the procedure advances to S5609. In S5609, the multipath software of the host adds a new entry to the host Referral Hit/Miss information, stores the information of S5604 or S5605, and advances to step S5610 (S5609).

In S5610, the multipath software of the host updates the IO frequency of the relevant entry. This frequency information deletes the entry having a low access frequency of S5608, and retains only the frequency accessed information so as to realize high efficiency of capacity of the host Referral Hit/Miss information. Thereby, regarding the UDS having a high access frequency, the host can reduce the frequency of occurrence of IO re-execution via Referral Sense Data response by storing a portion of the history information of the Referral information.

Figure 57:
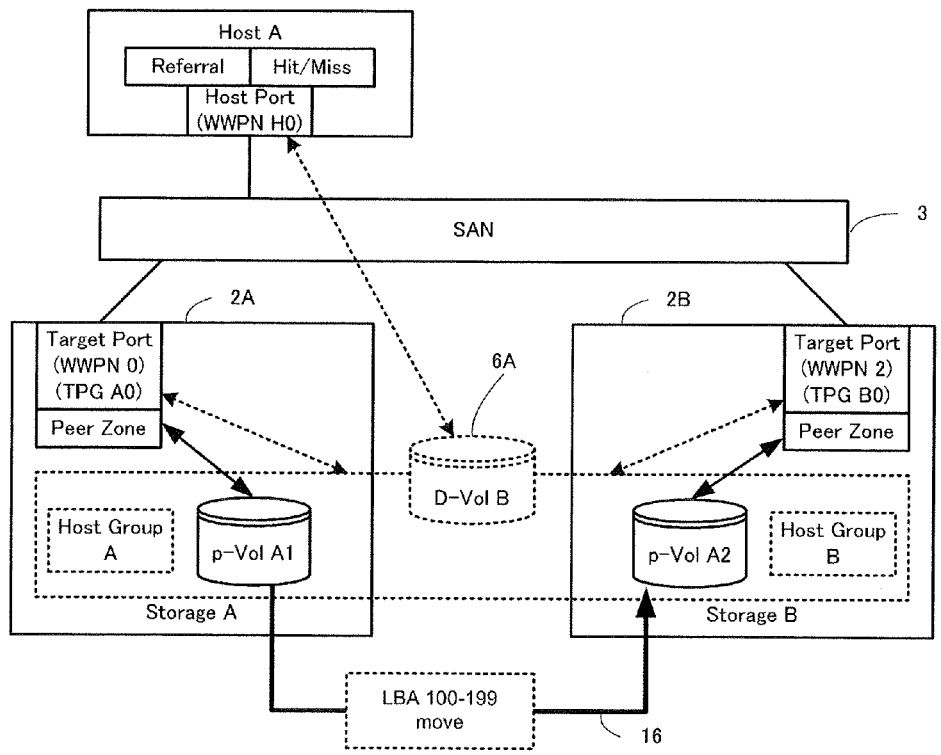
FIG. 57 is a block diagram showing one example of virtual storage device configuration and management information for page migration among storage devices.

FIG. 57 is a view showing the change of Referral Hit/Miss information when inter-device page migration is executed in the embodiment described in FIG. 56. The host IO errors the issue destination immediately after the virtual storage device performs page migration to a device having higher performance via inter-device tier migration or the like. Therefore, the host manages the hit/miss information regarding the page or UDS having a high occurrence frequency, and updates the information so that the IO request is issued to the correct physical storage device in the next try.

Regarding the rarely accessed UDS, the host arbitrarily abandons the Referral information since the storing of Referral information in advance relates to increasing the management information of the host. Thereby, the multipath software of the host can cope with the enormous increase of Referral information accompanying inter-device page migration.

FIG. 58 is a view showing a system configuration having applied a distributed virtual volume to a cluster volume in which a plurality of hosts accesses a volume. For example, a use is considered in which a volume having stored a plurality of virtual machine HDD files is applied as a distributed virtual volume, and accompanying the migration of the virtual machine, the UDS associated with the virtual machine HDD is migrated to another device.

Since each host stores Referral information (not shown in FIG. 58), the cluster file system can refer to the Referral information and determine the arrangement of the virtual machine HDD file. For example, by adopting a one-to-one arrangement of the partial volume and the virtual disk file, upon migrating the virtual machine B to a remote site, the partial volume 7B is migrated and the Referral information is updated, and the IO request issue destination of the partial volume 7B is switched to the target port of the storage device 2B of the remote site, the virtual machine migrated to the remote side can issue the IO request directly to the storage device within the remote site.

Figure 59:
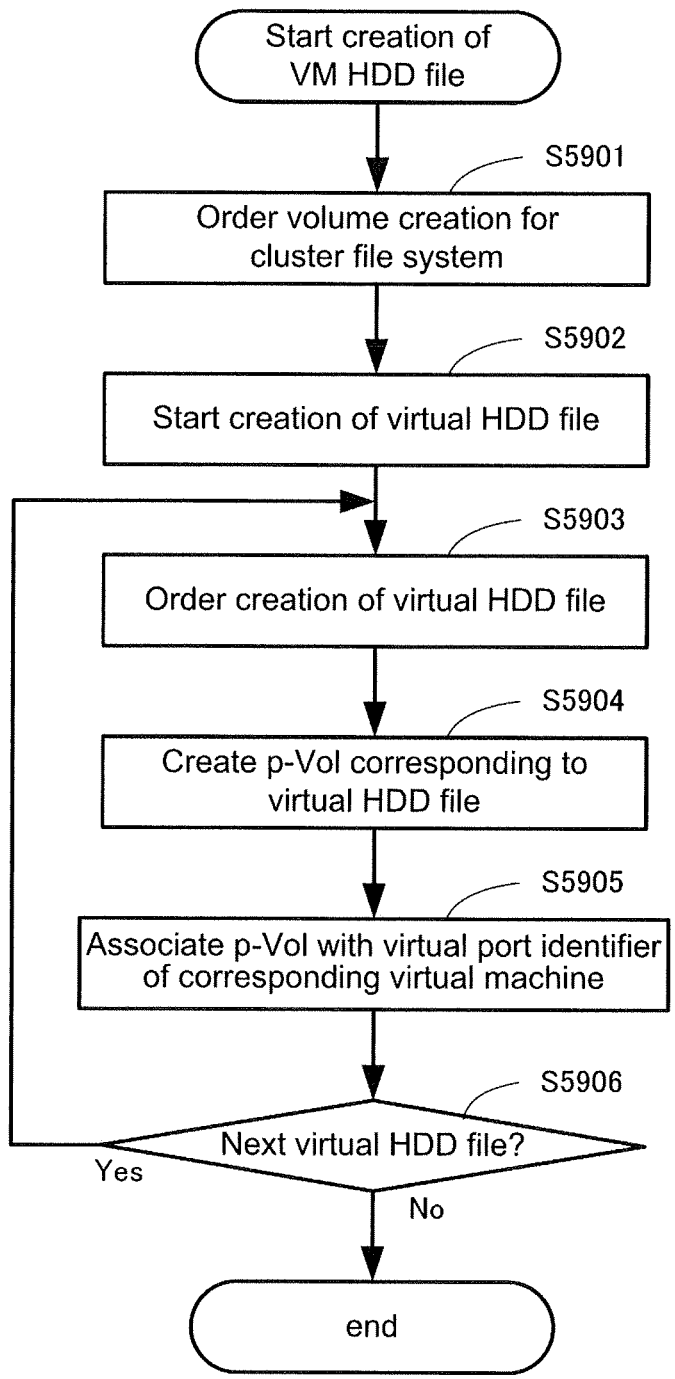
FIG. 59 is a flowchart showing the process for creating a virtual machine HDD file in the distributed virtual volume.

FIG. 59 is a flowchart of the cluster file system of the host creating a virtual machine disk file. At first, the administrator of the virtual storage device creates a volume for a cluster file system of the virtual machine in the storage device (S5901). Thereafter, accompanying the creation of the virtual machine, the server administrator starts creating a virtual machine HDD file to be mounted to the virtual machine (S5902).

The server administrator instructs creation of a virtual HDD file to a volume storing the cluster file system. Each virtual machine stores the virtual host port having a virtual WWPN, and a host name of a host OS registered to the FDMI information of the SAN switch (the host name is generally a unique information). The storage device administrator adds the information of a virtual machine (VM) identification information set by the server administrator (such as the virtual host port name and VM host name) as the setting of the host group information (S5903).

Next, the virtual storage device uses information such as the WWPN of the host port or the host name of the virtual machine set as host group information to create a partial volume which is the storage destination of the virtual HDD file of the virtual machine (S5904). In the present embodiment, one or more partial volumes constituting the distributed virtual volume can be created in one physical storage device. This is for realizing a one-to-one association of the virtual HDD file that the virtual machine refers to and the partial volume of the distributed virtual volume being the storage destination of the virtual HDD file when one or more virtual machines are formed in a physical host.

Next, the virtual storage device associates the storage destination of the virtual HDD file with the partial volume using the fact that the WWPN of the host port or the host name as IO request source of the virtual HDD file differs (S5905). Next, if creation of other virtual machines and virtual machine HDD files is necessary, the steps of S5903 through S5905 are repeated to create a plurality of partial volumes, which are then associated. The sequence illustrated in FIG. 59 associates the access range of the virtual machine file with a partial volume and enables other storage devices to easily operate the partial volume.

Figure 60:
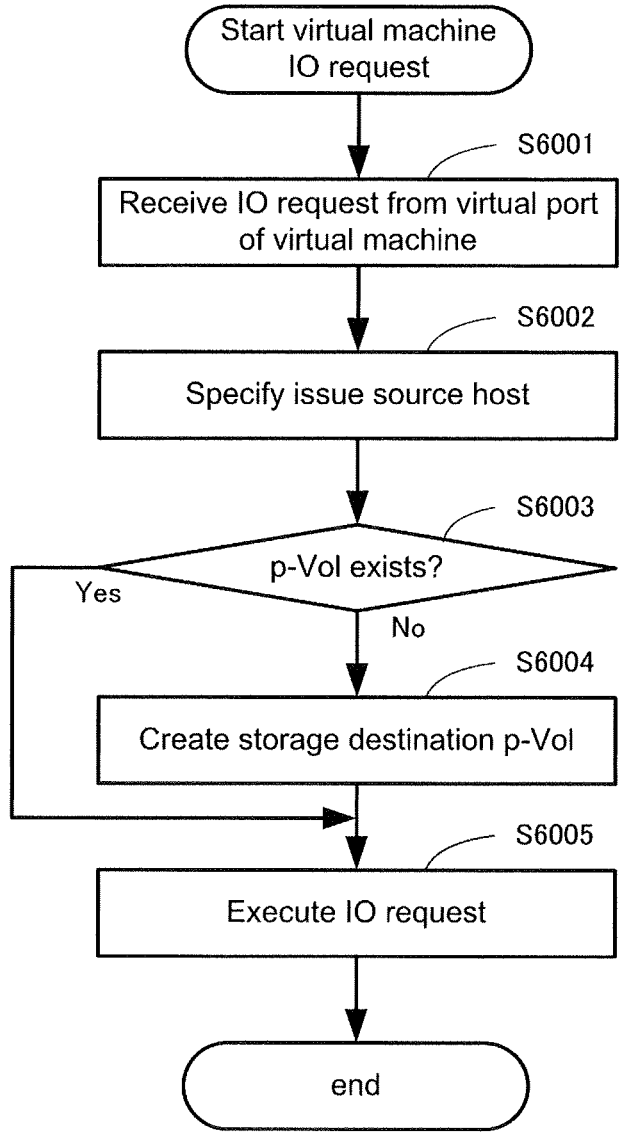
FIG. 60 is a flowchart showing the IO processing of the virtual storage device receiving simultaneous accesses from a plurality of hosts.

FIG. 60 is a flowchart of the host IO request according to the embodiment of FIG. 59. At first, the virtual storage device receives an IO request to the distributed virtual volume from the virtual port of the virtual machine (S6001). Next, the virtual storage device specifies the issue source host based on the WWPN of the virtual port which is the information on the issue source port of the IO request (S6002).

Next, the virtual storage device determines whether a partial volume of the distributed virtual volume corresponding to the issue source host exists or not. In the case of a virtual machine host already having a corresponding relationship, the procedure advances to S6005. In S6003, if the virtual storage device determines that there is no partial volume of the distributed virtual volume corresponding to the issue source host, the procedure advances to S6004.

Next, in S6004, the virtual storage device creates a partial volume which is the range for storing an IO request from a new virtual machine (S6004). The physical storage device has one or more partial volumes within a device. Along with the migration of the virtual machine, the virtual storage device can migrate the partial volume to other physical storage devices. The details of the present embodiment will be described with reference to FIG. 61. Thereafter, an IO request is completed regarding the corresponding partial volume (S6005) and the present sequence is ended.

Figure 61:
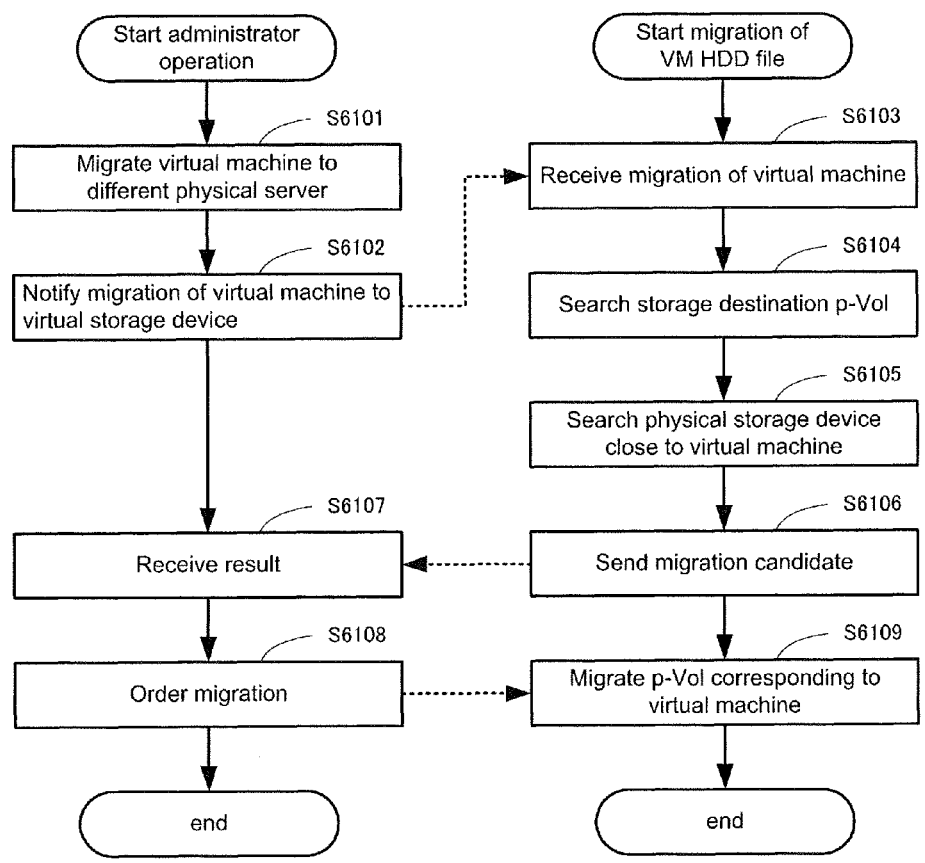
FIG. 61 is a flowchart showing the data migration processing accompanying migration of the virtual machine.

FIG. 61 is a flowchart for migrating data during migration of a virtual machine according to the embodiment of FIG. 59. At first, the server administrator or the virtual machine management software of the server migrates the virtual machine (VM) among physical servers. For example, the server administrator monitors the operation load in the physical server and performs VM migration so as to make the operation load of each physical server uniform (S6101).

Thereafter, the server administrator or the virtual machine management software of the server notifies the volume of the virtual storage device that the virtual machine has migrated. Thereby, the virtual storage device detects that a virtual machine has migrated to a different physical server and the position of the host of the virtual machine has varied (S6102). Next, the virtual storage device detects migration of the virtual machine by receiving the information sent in S6102 (S6103). Further, steps S6102 and S6103 can be executed via substitute steps. The virtual storage device receives a host port migration event of the IO issue source via RSCN from the SAN switch.

Next, the virtual storage device re-acquires the migrated host port information with respect to the SAN. Thereafter, the virtual storage device detects the change in the N_Port_ID assigned to a host initiator port via a SAN switch, and detects that the virtual machine has migrated (S6103). Thereafter, the virtual storage device searches a partial volume associated with the virtual HDD file being the storage destination of the IO request of the virtual machine from the WWPN or the host name (S6104).

Thereafter, the virtual storage device determines whether to migrate the partial volume to the physical storage device close to the virtual machine along with the migration of the virtual machine, and performs a search. IN an FC, a topology information can be acquired from the Fabric Configuration Server of the management service of the SAN switch. Similarly, it is possible to comprehend the physical position. If the communication distance is long (for example, exceeding a certain distance set as reference), the virtual storage device can determine based on the topology information such as the port attribute of the SAN router or the path cost information of the FC that migration to a different site of a data center at a far distance has occurred (S6105).

Next, the virtual storage device notifies the candidate of a physical storage device being the migration destination of the virtual machine HDD file from the physical storage device constituting the virtual storage device to the storage device administrator (S6106). Thereafter, the administrator receives information gathered by the virtual storage device such as the network distance and performance, or whether load balancing of the physical storage device is necessary or not (S6107).

Thereafter, the administrator selects a candidate of the physical storage device being the migration destination of the virtual machine HDD file, and orders the virtual storage to migrate the partial volume (S6108). Next, the virtual storage device starts migration of the partial volume corresponding to the virtual machine to the physical storage device (S6109).

According to this procedure, triggered by the migration of the virtual machine, the partial volume of the distributed virtual volume can be migrated to another physical storage device. Further, by migrating a partial volume in the range depending on the configuration of the distributed virtual volume (such as the association of the VM and the virtual HDD file), migration can be performed having advantages in performance such as communication performance.

Further, the range of migration of the VM can be presented to the administrator from the above-described configuration of distributed virtual volume. Thus, it becomes possible to find an efficient migration destination from the migration selection group.

The next embodiment relates to an example in which the inter-device page migration is started triggered by the SCSI command of the copy off-load function issued by the host.

Figure 62:
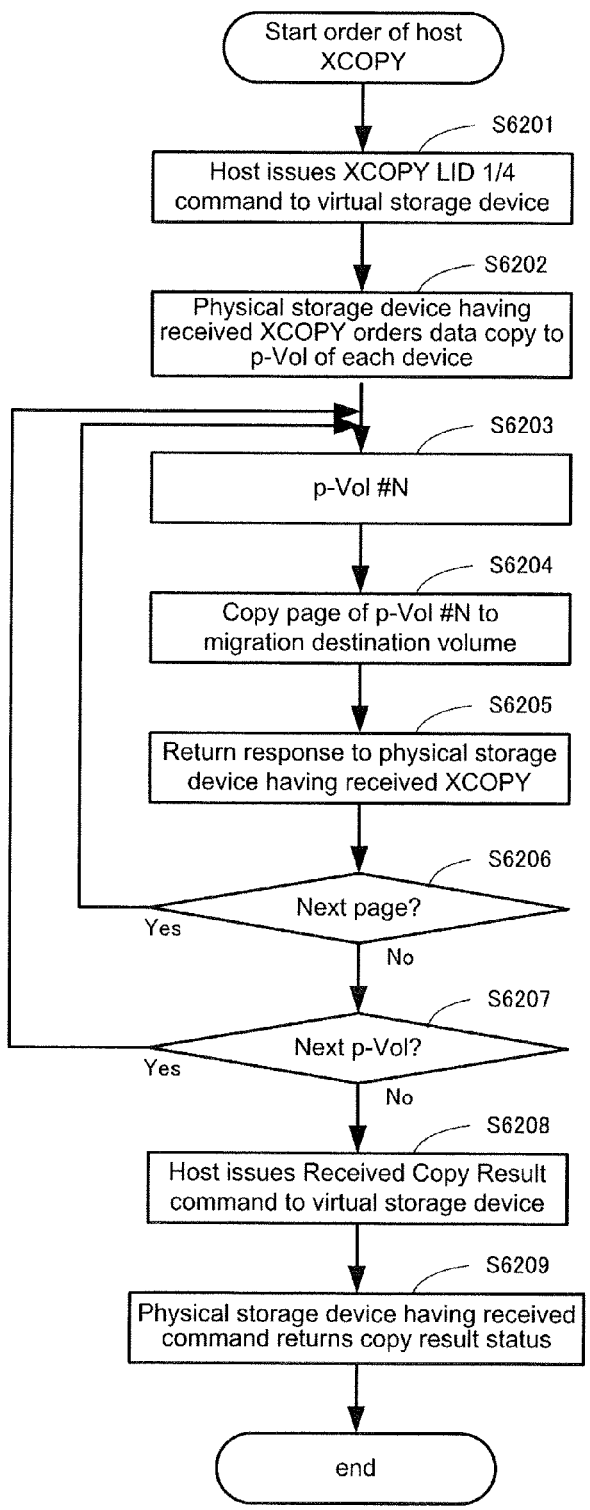
FIG. 62 is a flowchart showing a copy off-load command processing of the distributed virtual volume.

FIG. 62 is a flowchart showing the copy operation of the distributed virtual volume when the host issues a SCSI command of a copy off-load function. At first, the host issues a command such as a command related to the copy off-load (Extended Copy LID1 or LID4) with respect to the virtual storage device (S6201).

Next, the physical storage device of the virtual storage device having received the copy off-load request orders to copy data to the partial volume of each device (S6202). At this time, even if the storage device is not the associated device, it is capable of outputting an order to each partial volume without sending a Referral Sense Data response.

Copying of data to the migration destination volume (S6204) is repeatedly performed for each page stored in the partial volume of each physical storage device (S6203) in steps S6203 through S6207. Regarding the copy off-load request, when all copying is completed (S6206 through S6207), the procedure advances to S6208.

Next, the host issues a command (Received Copy Result command) acquiring the result regarding the copy off-load request to the virtual storage device. By gathering the result of each partial volume of the distributed virtual volume (S6208), the physical storage device having received the copy result acquisition command returns the result of copy off-load request (S6209). Thereby, the host can order copying of the whole distributed virtual volume via a copy off-load command request even if the host does not have any Referral information.

Figure 63:
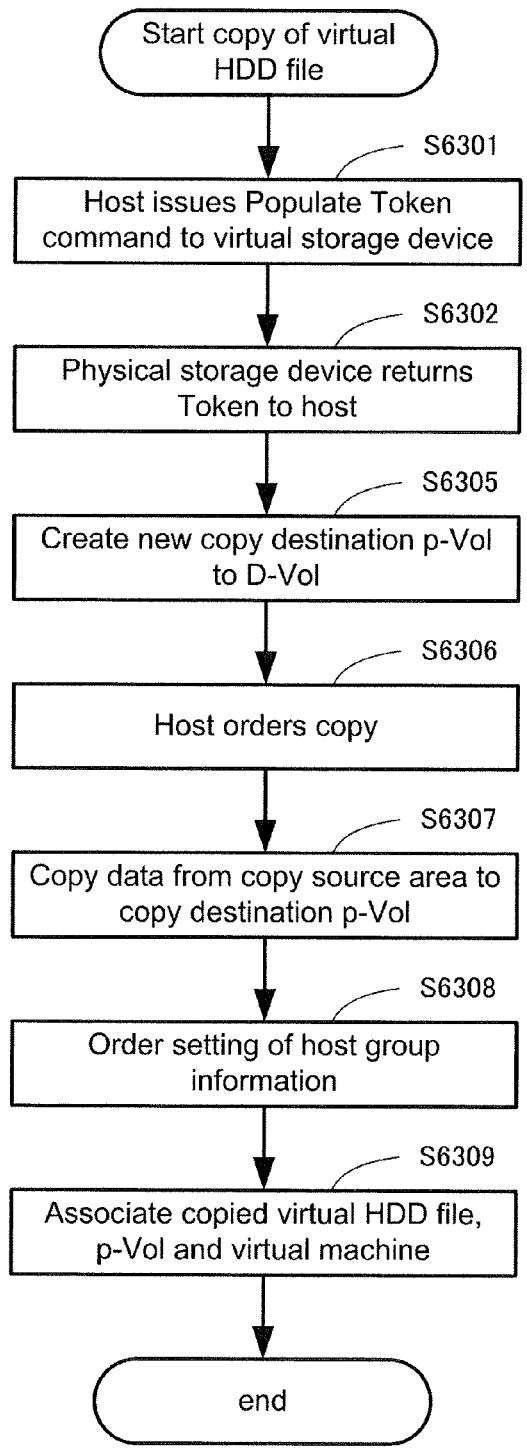
FIG. 63 is a flowchart showing a copy off-load command processing of the distributed virtual volume.

FIG. 63 is a flowchart of an example in which the host issues a copy off-load request to a portion of the data area of the distributed virtual volume. The present embodiment assumes that off-load is performed to the host within the distributed virtual volume when performing file copy of the original image of the virtual server HDD file within the volume.

At first, the host issues a command to acquire a token of the data area (Populate Token command) with respect to the virtual storage device (S6301). The storage device issues a token of the read data area and returns the same to the host (S6302). Thereafter, the virtual storage device creates a new partial volume as a copy destination area (S6305).

Next, the host issues a copy off-load request using a token (Write Using Token command) to the virtual storage device, and starts off-load of the data copy within the virtual storage device (S6306). Thereafter, the virtual storage device performs data copy within the virtual storage device with respect to the partial volume allocated as copy destination in S6305 from the area storing the virtual server HDD file of the copy source (S6307).

Then, the virtual storage device administrator sets up a host group information with respect to the new virtual server HDD file being created. The virtual storage device associates the virtual HDD file, the partial volume and the virtual machine using information such as the virtual WWPN of the virtual server and the host name (S6309). According to this process, in response to the copy order from the copy, it becomes possible to appropriately perform the creation of a partial volume of the distributed virtual volume or the inter-device data migration using the information on the copy order from the host.

FIGS. 64A through 64D show the arrangements of various information that the virtual storage device and the physical storage device retains, and the method for accessing the same. Since the host group information 1109, the host/peer zone information 1111 and the communication path/peer zone information 1102 differs for each physical storage device, the information is not required to be shared with other physical storage devices. The page location information 1106 is location information allocated from the capacity pool, so that the information is not required to be shared with other physical storage devices.

The volume configuration information (volume information 1104, distributed virtual volume information 1105 and storage function information 1116) and the TPG information 1113 are information that need to be shared with all the storage devices constituting the distributed virtual volume. The virtual storage device refers to and changes these shared information via the procedure (FIG. 35) in which the storage administrator creates a volume. Further, in the procedure (FIG. 36) in which the host executes volume recognition, the host refers to the volume configuration information and the TPG information for creating the Inquiry information or the TPG information. When the host issues an IO request at normal times, the information is retained in the memory of the host, so that there is no need to send an inquiry to the virtual storage device. The capacity of these information is small, so that it can be shared with each physical storage devices and can be updated synchronously when creating a volume, since there is little influence on the performance.

The Referral information 1114 of the distributed virtual volume is information storing the path of the TPG that can be accessed in page granularity, and the capacity of the information is extremely large. Further, the Referral information must be referred to every time an IO request is issued so as to determine the associated storage device regarding the IO request from the host, to create a Referral Sense Data response when the storage device is not the associated storage device, or to perform IO routing, and there are a number of arrangement methods thereof.

Figure 64A:
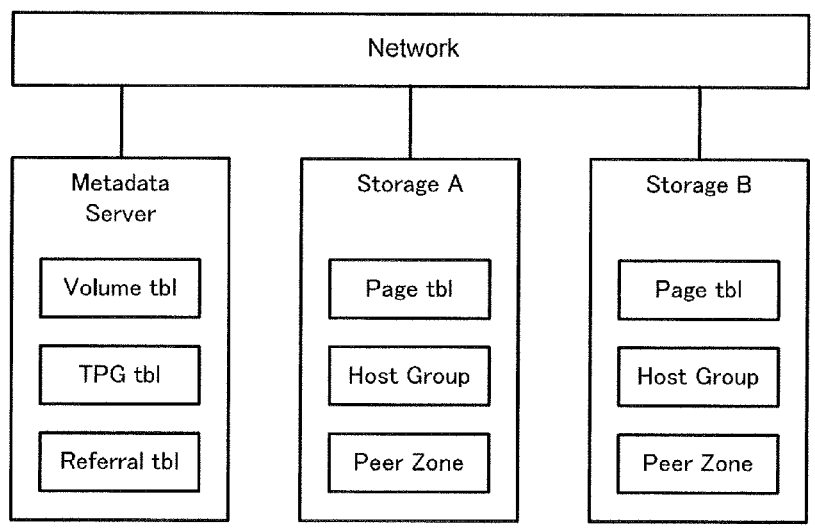
FIG. 64A is a block diagram showing the arrangement of various information stored in the virtual storage device.

FIG. 64A illustrates a configuration in which the metadata management server or the representative physical storage device stores the shared information of the virtual storage device. In the case of FIG. 64A, each physical storage device must send an inquiry of Referral information to the metadata management server or the representative physical storage device so as to inquire the target port of the associated physical storage device each time an IO request is received. In this case, when a transaction performance is required, the communication traffic for acquiring shared information becomes the bottleneck. This method is suitable in cases where the shared information is changed frequently or where the capacity is too large that it cannot be retained in the respective storage devices.

Figure 64B:
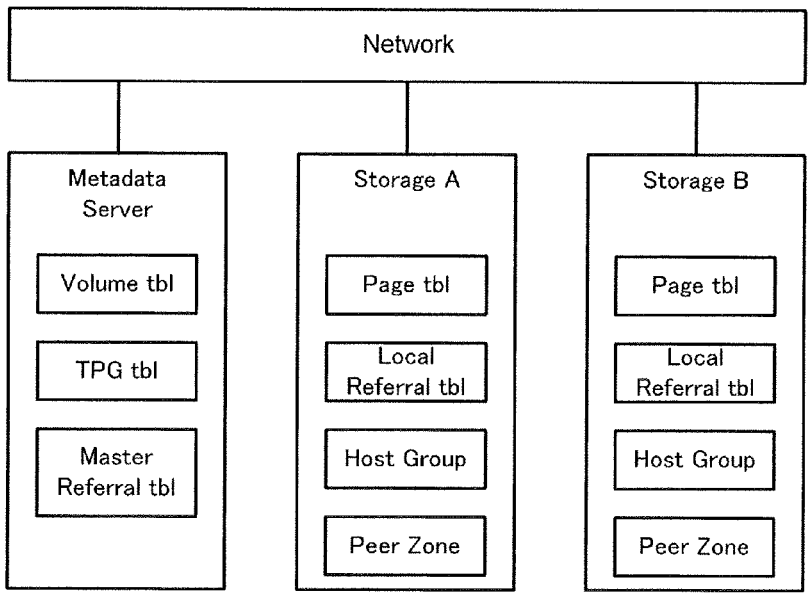
FIG. 64B is a block diagram showing the arrangement of various information stored in the virtual storage device.

FIG. 64B illustrates a configuration in which the metadata management server or the representative physical storage device stores the shared information of the virtual storage device, and each physical storage device locally stores the necessary portion of the shared information. In FIG. 64B, if another physical storage device receives from the host an IO request corresponding to the associated UDS, the physical storage device accesses the master Referral information of the metadata management server or the representative physical storage device, and sends a Referral Sense Data response.

If a configuration is adopted in which the host multipath software retains all the Referral information of the virtual storage device via the SCSI Report Referral command, the host multipath software issues an IO request correctly to the associated physical storage device. Thus, as shown in FIG. 64B, an arrangement is preferred in which the partial volumes store only the associated Referral information with the other information missing.

Further, by locally arranging the Referral information of the associated physical storage device or the other physical storage devices in response to the storage tier required to have high transaction performance or according to the access frequency, it is expected that the traffic of inquiry to the metadata server can be reduced.

Figure 64C:
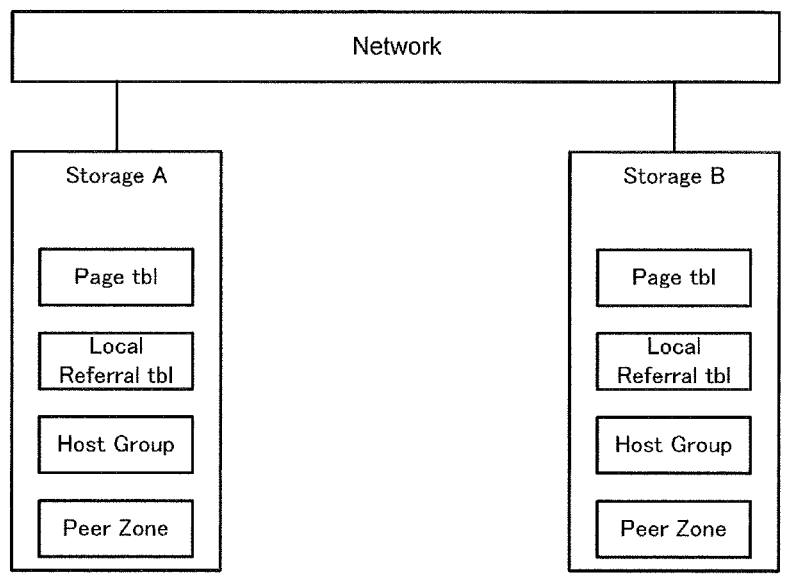
FIG. 64C is a block diagram showing the arrangement of various information stored in the virtual storage device.

FIG. 64C illustrates an arrangement in which the individual physical storage devices store the associated Referral information independently. In the arrangement of FIG. 64C, when a physical storage device receives an IO request corresponding to the UDS associated with another physical storage device from the host, the physical storage device sends an inquiry to all the physical storage devices constituting the distributed virtual volume, acquires the Referral information of the associated storage device, and sends Referral Sense Data response. It is also possible to repeat the Referral Sense Data response in each physical storage device so as to simply resend a response to the next physical storage device and to finally reach the associated physical storage device.

Figure 64D:
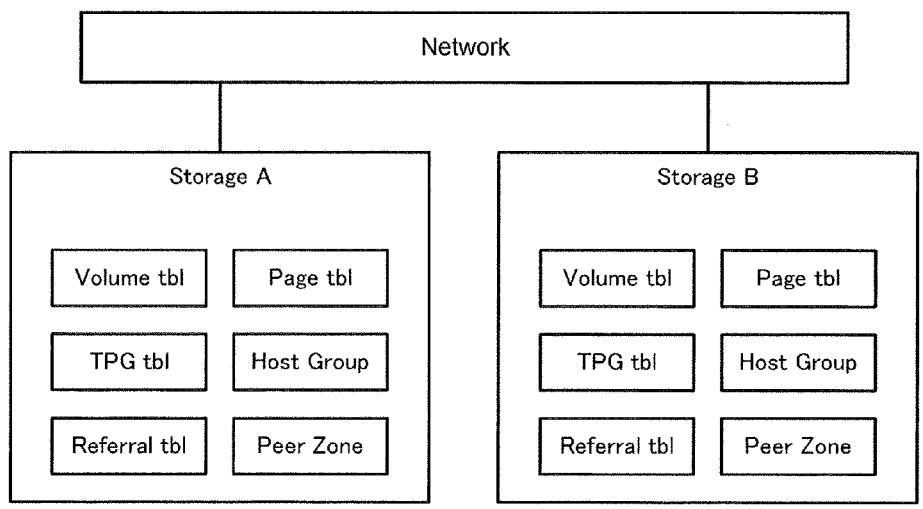
FIG. 64D is a block diagram showing the arrangement of various information stored in the virtual storage device.

FIG. 64D illustrates an arrangement in which the individual physical storage devices store all the shared information of the virtual storage device. Since according to the arrangement of FIG. 64D all the physical storage devices have all the information of the UDS associated to other physical storage devices, it is not necessary to send an inquiry to other storage devices. However, each physical storage device must store an enormous amount of information.

REFERENCE SIGNS LIST

1: Host
2: Storage device
3: SAN
4: Entity volume
5: Virtual volume
6: Distributed virtual volume
7: Partial volume
11: Multipath software
12: Host port
13: ALUA control
14: Storage device port

The invention claimed is:

1. A volume management method of a storage system comprising a host, a first storage device providing a volume to the host, and a second storage device, which are mutually coupled, the method comprising:
   transmitting an order to distribute the volume from the host to the first storage device to form a distributed virtual volume;
   updating an access information for managing the access among coupled storage devices that the first storage device stores by referring to the order;
   transmitting the updated access information from the first storage device to the second storage device;
   creating a first partial volume constituting a portion of the distributed virtual volume in the first storage device by referring to the volume information managing the volume and the updated access information stored in the first storage device;
   migrating the first partial volume from the first storage device to the second storage device;
   creating a second partial volume constituting a portion of the distributed virtual volume in the second storage device by referring to the volume management information and the updated access information stored in the second storage device;
   establishing a coupling between the host, the first storage device and the second storage device by referring to the updated access information;
   when a virtual machine operating in the host and accessing the distributed virtual volume is migrated to a host other than the host in which the virtual machine operates, determining whether or not to migrate the partial volume constituting the distributed virtual volume based on a topology information of a partial volume constituting the distributed virtual volume and the host on which the migrated virtual machine operates; and outputting the determined result;
   migrating the second partial volume to the second storage device and updating the access information if the determined result is to migrate the second partial volume; and
   migrating the first partial volume to the first storage device and updating the access information if the determined result is to migrate the first partial volume.

2. The volume management method according to claim 1, further comprising:
   migrating the second partial volume from the second storage device to the first storage device;

updating a setting of zoning between the host, the first storage device and the second storage device;

updating the volume information of the second storage device;

further updating the updated access information; and deleting a function related to the second partial volume from the function information.

3. The volume management method according to claim 2, further comprising:

updating the volume information of the first storage device; and converting the first partial volume to a real volume.

4. The volume management method according to claim 2, further comprising:

transmitting an IO from the host to the distributed virtual volume referring to the updated access information, wherein the first storage device and the second storage device each further comprise function information related to a storage device function provided to the storage device, the storage device function being provided for processing data to be stored in the storage devices; and updating the function information stored in the second storage device by referring to the function information stored in the first storage device, the function information for managing the storage device function.

5. The volume management method according to claim 4, wherein the storage device function is selected from the group consisting of volume copy, snapshot, remote copy, data compression, data de-duplication, tier arrangement control, capacity allocation, data search, and page-granularity data control; and wherein the page-granularity data control includes at least one of thin provisioning or data location control in tiers of storage media.

6. A storage system comprising a host, a first storage device providing a volume to the host, and a second storage device, which are mutually coupled, wherein the first storage device and the second storage device each store a volume information for managing the volume and an access information for managing the access among said mutually coupled storage devices;

wherein the first storage device receives an order to distribute the volume from the host to form a distributed virtual volume;

updates access information by referring to the order;

transmits the updated access information to the second storage device;

creates a first partial volume constituting a portion of the distributed virtual volume in the first storage device by referring to the volume information and the updated access information;

migrates the first partial volume to the second storage device;

creates a second partial volume constituting a portion of the distributed virtual volume by referring to the volume information and the updated access information;

wherein the second storage device establishes a coupling between the host, the first storage device and the second storage device by referring to the updated access information;

wherein when a virtual machine operating in the host and accessing the distributed virtual volume is migrated to a host other than the host in which the virtual machine operates, the first storage device or the second storage device: determines whether or not to migrate the partial volume constituting the distributed virtual volume based on a topology information of a partial volume constituting the distributed virtual volume and the host on which the migrated virtual machine operates; and outputs the determined result;

wherein the first storage device migrates the second partial volume to the second storage device and updates the access information if the determined result is to migrate the second partial volume;

wherein the second storage device migrates the first partial volume to the first storage device and updates the access information if the determined result is to migrate the first partial volume; and wherein the host issues an IO to any portion of the distributed virtual volume as indicated in the updated access information.

7. The storage system according to claim 6, wherein the second storage device migrates the second partial volume to the first storage device;

updates the setting of the coupling between the host, the first storage device and the second storage device;

updates the volume information of the second storage device;

further updates the updated access information; and deletes a function related to the second partial volume from the function information.

8. The storage system according to claim 7, wherein the first storage device updates the volume information of the first storage device and converts the first partial volume to a real volume prior to distributing the same based on the order.

9. The storage system according to claim 6, wherein the first storage device and the second storage device each further comprise function information related to a storage device function provided to the storage device, the storage function being provided for processing data to be stored in the storage device; and wherein the second storage device refers to the function information stored in the first storage device and updates the function information stored in the second storage device, the function information for managing the storage device function.

10. The storage system according to claim 9, wherein the storage device function is selected from the group consisting of volume copy, snapshot, remote copy, data compression, data de-duplication, tier arrangement control, capacity allocation, data search, and page-granularity data control; and wherein the page-granularity data control includes at least one of thin provisioning or data location control in tiers of storage media.

11. The storage system according to claim 6, wherein the first storage device and the second storage device share a pool including the distributed virtual volume;

if the capacity of the first storage device is not sufficient to write data into the first partial volume, update the coupling relationship of the host, the first storage device and the second storage device; and write data into the second partial volume.

12. The storage system according to claim 6, wherein the first storage device and the second storage device share a plurality of pools including the distributed virtual volume and divided via an access frequency to a page of the volume, and if the page of the volume exceeds a range of the access frequency of the pool in which the page belongs, migrate the page to another pool, wherein the storage device having the page belongs to said another pool; update the coupling relationship of the host, the first storage device and second storage device; and update the volume information.

13. The storage system according to claim 12, wherein if the page of the volume exceeds the access frequency of the pool in which the page belongs, the storage system
migrates the page to a pool in which the storage device other than the storage device having the page belongs;
updates the volume information;
further updates the updated access information; and
while migrating the page, turns off a mechanism related to the page regarding a cache of the page migration source storage device and the migration destination storage device.

14. The storage system according to claim 12, wherein if the page of the volume exceeds the access frequency of the pool in which the page belongs, the storage system
migrates the page to a pool in which the storage device other than the storage device having the page belongs;
updates the volume information;
further updates the updated access information; and
while migrating the page, stops the writing of data to the page from the host.

15. The storage system according to claim 6, wherein the access information includes a Referral information.

16. The storage system according to claim 15, wherein the first partial volume and the second partial volume includes a virtual HDD mounted on a virtual machine operating in the host.

17. A storage system comprising a host, a first storage device providing a volume to the host, and a second storage device, which are mutually coupled,
wherein the first storage device and the second storage device each store a volume information for managing the volume and an access information for managing the access among said mutually coupled storage devices;
wherein the first storage device
receives an order to distribute the volume from the host to form a distributed virtual volume;
updates access information by referring to the order;
transmits the updated access information to the second storage;
creates a first partial volume constituting a portion of the distributed virtual volume in the first storage device by referring to the volume information and the updated access information;
migrates the first partial volume to the second storage device;
creates a second partial volume constituting a portion of the distributed virtual volume by referring to the volume information and the updated access information;
wherein the second storage device establishes a coupling between the host, the first storage device and the second storage device by referring to the updated access information;
wherein the host issues an IO to any portion of the distributed virtual volume as indicated in the updated access information; and
wherein the host stores hit/miss information of IO hit indicating successful IO and IO miss indicating failed IO for IO issue destinations, wherein the host updates the hit/miss information based on the IO hit and IO miss of issued IOs, and wherein the host issues the IO to the distributed virtual volume based on the updated hit/miss information.

18. The storage system according to claim 17,
wherein the host selects the IO issue destinations for the IO issued to the distributed virtual volume which have a high success hit rate or a youngest number as representative storage device.

19. The storage system according to claim 17,
wherein the hit/miss information includes a frequency of IO split transfer and IO issue destination when the IO issue destination is not correct regarding a segment having a high issue frequency of host IO request.

20. The storage system according to claim 17,
wherein the hit/miss information includes a history of at least the IO hit of issued IOs.

* * * * *